United States Patent
Molyneaux et al.

(10) Patent No.: US 11,587,298 B2
(45) Date of Patent: Feb. 21, 2023

(54) CACHING AND UPDATING OF DENSE 3D RECONSTRUCTION DATA

(71) Applicant: Magic Leap, Inc., Plantation, FL (US)

(72) Inventors: David Geoffrey Molyneaux, San Jose, CA (US); Frank Thomas Steinbruecker, Mountain View, CA (US); Mohan Babu Kandra, San Ramon, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/681,242

(22) Filed: Feb. 25, 2022

(65) Prior Publication Data
US 2022/0277529 A1 Sep. 1, 2022

Related U.S. Application Data

(63) Continuation of application No. 16/880,779, filed on May 21, 2020, now Pat. No. 11,302,081.
(Continued)

(51) Int. Cl.
*G06T 19/00* (2011.01)
*G06T 17/20* (2006.01)
(Continued)

(52) U.S. Cl.
CPC .......... *G06T 19/006* (2013.01); *G06F 9/4418* (2013.01); *G06T 15/40* (2013.01); *G06T 17/20* (2013.01); *H04N 13/204* (2018.05)

(58) Field of Classification Search
CPC ....... G06T 19/006; G06T 15/40; G06T 17/20; H04N 13/204; G06F 9/4418
See application file for complete search history.

(56) References Cited

U.S. PATENT DOCUMENTS 5,886,702 A 3/1999 Migdal et al.
7,280,109 B2 10/2007 Hoppe
(Continued)

FOREIGN PATENT DOCUMENTS

WO WO 2017/105864 A1 6/2017

OTHER PUBLICATIONS

PCT/US2018/067105, filed Mar. 7, 2019, International Search Report and Written Opinion.
(Continued)

*Primary Examiner* — Terrell M Robinson
(74) *Attorney, Agent, or Firm* — Wolf, Greenfield & Sacks, P.C.

(57) ABSTRACT

A method to efficiently update and manage outputs of real time or offline 3D reconstruction and scanning in a mobile device having limited resource and connection to the Internet is provided. The method makes available to a wide variety of mobile XR applications fresh, accurate and comprehensive 3D reconstruction data, in either single user applications or multi-user applications sharing and updating the same 3D reconstruction data. The method includes a block-based 3D data representation that allows local update and maintains neighbor consistency at the same time, and a multi-layer caching mechanism that retrieves, prefetches, and stores 3D data efficiently for XR applications. Between sessions of an XR device, blocks may be persisted on the device or in remote storage in one or more cache layers. The device may, upon starting a new session, selectively use the blocks from one or more layers of the cache.

20 Claims, 53 Drawing Sheets

Related U.S. Application Data

(60) Provisional application No. 62/850,900, filed on May 21, 2019.

(51) Int. Cl.
   *H04N 13/204* (2018.01)
   *G06F 9/4401* (2018.01)
   *G06T 15/40* (2011.01)

(56) References Cited

U.S. PATENT DOCUMENTS

| | | | |
|---|---|---|---|
| 8,547,374 B1 | 10/2013 | Sadjadi et al. | |
| 9,367,959 B2 | 6/2016 | Forstall et al. | |
| 10,713,852 B2 | 7/2020 | Molyneaux et al. | |
| 11,238,659 B2 | 2/2022 | Swaminathan | |
| 11,302,081 B2 | 4/2022 | Molyneaux et al. | |
| 2002/0109684 A1 | 8/2002 | Repin et al. | |
| 2005/0041781 A1* | 2/2005 | Jefferson | G06T 11/006 378/210 |
| 2007/0188490 A1 | 8/2007 | Kanai et al. | |
| 2007/0247459 A1 | 10/2007 | Li | |
| 2009/0225074 A1* | 9/2009 | Bates | G06T 15/20 345/419 |
| 2010/0077197 A1* | 3/2010 | Ergan | G06F 3/0656 714/37 |
| 2010/0208994 A1 | 8/2010 | Yao et al. | |
| 2010/0315412 A1 | 12/2010 | Sinha et al. | |
| 2011/0066405 A1 | 3/2011 | Chartrand et al. | |
| 2011/0170756 A1 | 7/2011 | Schneider | |
| 2012/0154400 A1 | 6/2012 | Steen | |
| 2012/0194516 A1 | 8/2012 | Newcombe et al. | |
| 2012/0270653 A1 | 10/2012 | Kareemi et al. | |
| 2013/0093788 A1 | 4/2013 | Liu et al. | |
| 2013/0342564 A1 | 12/2013 | Kinnebrew et al. | |
| 2014/0044343 A1 | 2/2014 | Bell et al. | |
| 2015/0024337 A1 | 1/2015 | Blassnig et al. | |
| 2015/0062120 A1 | 3/2015 | Reisner-Kollmann et al. | |
| 2015/0109415 A1 | 4/2015 | Son et al. | |
| 2015/0228114 A1 | 8/2015 | Shapira et al. | |
| 2016/0026253 A1 | 1/2016 | Bradski et al. | |
| 2016/0027215 A1 | 1/2016 | Burns et al. | |
| 2016/0102983 A1 | 4/2016 | Javed et al. | |
| 2016/0259050 A1* | 9/2016 | Proctor | G01S 15/89 |
| 2017/0148211 A1 | 5/2017 | Zakhor et al. | |
| 2017/0329706 A1 | 11/2017 | Nemawarkar et al. | |
| 2017/0352192 A1 | 12/2017 | Petrovskaya et al. | |
| 2018/0310113 A1 | 10/2018 | Ray et al. | |
| 2019/0025062 A1 | 1/2019 | Young et al. | |
| 2019/0045207 A1 | 2/2019 | Chen et al. | |
| 2019/0197765 A1 | 6/2019 | Molyneaux et al. | |
| 2019/0197774 A1 | 6/2019 | Molyneaux et al. | |
| 2019/0197777 A1 | 6/2019 | Steinbrucker et al. | |
| 2019/0197786 A1 | 6/2019 | Molyneaux et al. | |
| 2020/0111255 A1 | 4/2020 | Brodsky et al. | |
| 2020/0342656 A1 | 10/2020 | Cichocki et al. | |
| 2020/0372718 A1 | 11/2020 | Molyneaux et al. | |
| 2021/0134064 A1 | 5/2021 | Shahrokni et al. | |

OTHER PUBLICATIONS

PCT/US2018/067134, filed Feb. 7, 2019, Invitation to Pay Additional Fees.
PCT/US2018/067134, filed Apr. 24, 2019, International Search Report and Written Opinion.
PCT/US2018/067146, filed Feb. 14, 2019, Invitation to Pay Additional Fees.
PCT/US2018/067146, filed Apr. 30, 2019, International Search Report and Written Opinion.
PCT/US2018/067156, filed Mar. 8, 2019, International Search Report and Written Opinion.
PCT/US2020/034068, filed Jul. 27, 2020, Invitation to Pay Additional Fees.
PCT/US2020/034068, filed Oct. 1, 2020, International Search Report and Written Opinion.
PCT/US2020/034068, filed Dec. 2, 2021, International Preliminary Report on Patentability.
PCT/US2020/034074, filed Sep. 18, 2020, International Search Report and Written Opinion.
PCT/US2020/034074, filed Jan. 6, 2022, International Preliminary Report on Patentability.
Office Communication dated Apr. 12, 2021 for U.S. Appl. No. 16/880,779.
Office Communication dated Oct. 14, 2021 for U.S. Appl. No. 16/880,779.
Office Communication dated May 25, 2021 for U.S. Appl. No. 16/880,794.
International Preliminary Report on Patentability in connection with International Application No. PCT/US2020/034068, dated Dec. 2, 2021.
International Preliminary Report on Patentability in connection with International Application No. PCT/US2020/034074, dated Jan. 6, 2022.
International Search Report and Written Opinion for International Application No. PCT/US2018/067146 dated Apr. 30, 2019.
International Search Report and Written Opinion for International Application No. PCT/US2018/067134 dated Apr. 24, 2019.
International Search Report and Written Opinion for International Application No. PCT/US2018/067156 dated Mar. 8, 2019.
International Search Report and Written Opinion for International Application No. PCT/US2018/067105 dated Mar. 7, 2019.
International Search Report and Written Opinion in connection with International Application No. PCT/US2020/034074, dated Sep. 18, 2020.
International Search Report and Written Opinion in connection with International Application No. PCT/US2020/034068, dated Oct. 1, 2020.
Invitation to Pay Additional Fees for International Application No. PCT/US2018/067146 dated Feb. 14, 2019.
Invitation to Pay Additional Fees for International Application No. PCT/US2018/067134 dated Feb. 7, 2019.
Invitation to Pay Additional Fees in connection with International Application No. PCT/US2020/034068, dated Jul. 27, 2020.
Elghazi, Building Skins in the Age of Information Technology. Thesis Submitted to Faculty of Engineering at Cairo University in Partial Fulfillment of the Requirements for the Degree of Master of Science in Architectural Engineering Faculty of Engineering. May 2009. 99 pages. https://www.academia.edu/10664577/Building_Skins_in_the_Age_of_Information_Technology [last retrieved on Apr. 7, 2019].
Hoiem et al., Representations and Techniques for 3D Object Recognition and Scene Interpretation. Synthesis Lectures on Artificial Intelligence and Machine Learning. Morgan and Claypool Publishers. Aug. 2011. 31 pages. http://dhoiem.cs.illinois.edu/publications/HoiemSavareseFinal.pdf [retrieved date Apr. 13, 2019].
Kaufman, Volume Graphics. Computer. Jul. 1993;26(7):51-64.
Poranne, Topics in Shape Optimization and Exploration. Research Thesis. Jul. 2013. Submitted to the Senate of the Technion—Isreal Institute of Technology. 50 pages.

\* cited by examiner

| d == 0 | 0 < d < bmin | bmax < d | d < bmin | Result |
|---|---|---|---|---|
| 0 | 0 | 0 | 0 | Reject the brick for further processing |
| 1 | 0 | 0 | 1 | Reject the brick for further processing |
| 0 | 1 | 0 | 1 | Reject the brick for further processing |
| 1 | 1 | 0 | 1 | Reject the brick for further processing |
| 0 | 0 | 1 | 0 | Brick in front of solid background |
| 1 | 0 | 1 | 1 | Brick in front of holey background |
| 0 | 1 | 1 | 1 | Brick in front of holey background |
| 1 | 1 | 1 | 1 | Brick in front of holey background |

FIG. 18

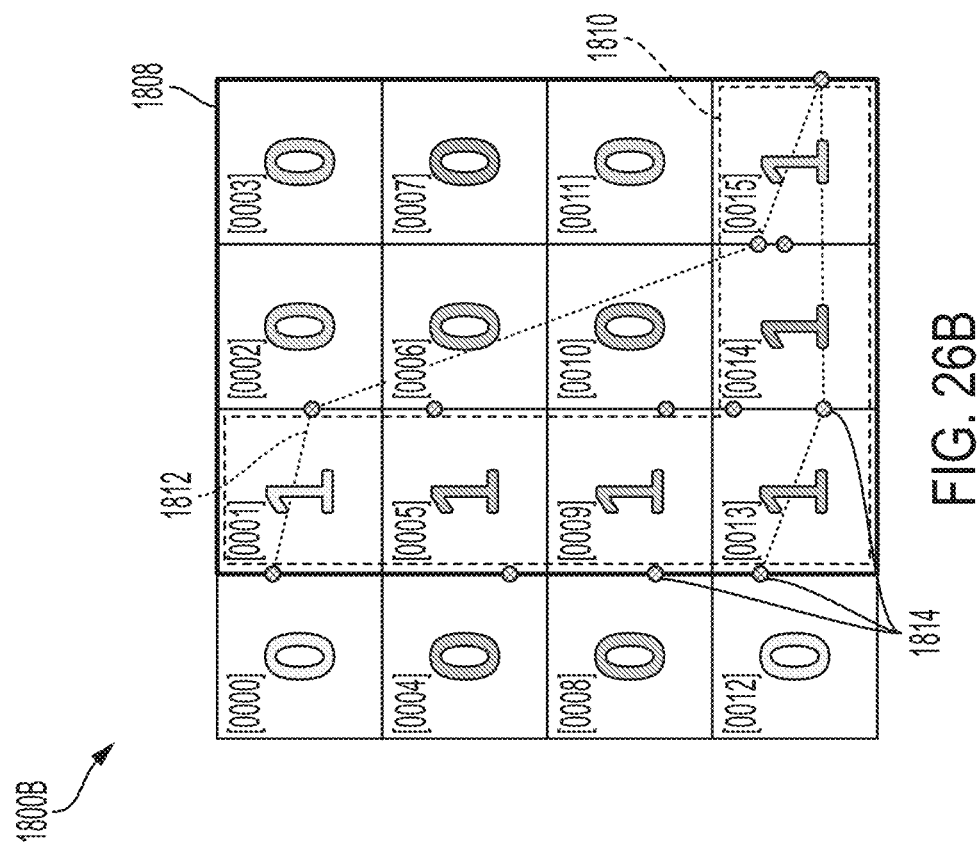
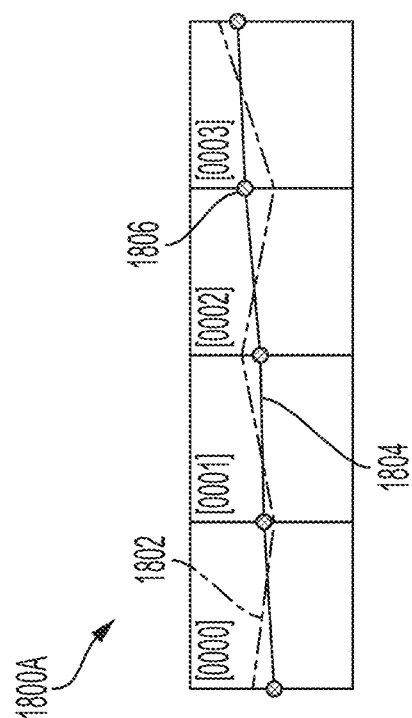
FIG. 26B
FIG. 26A

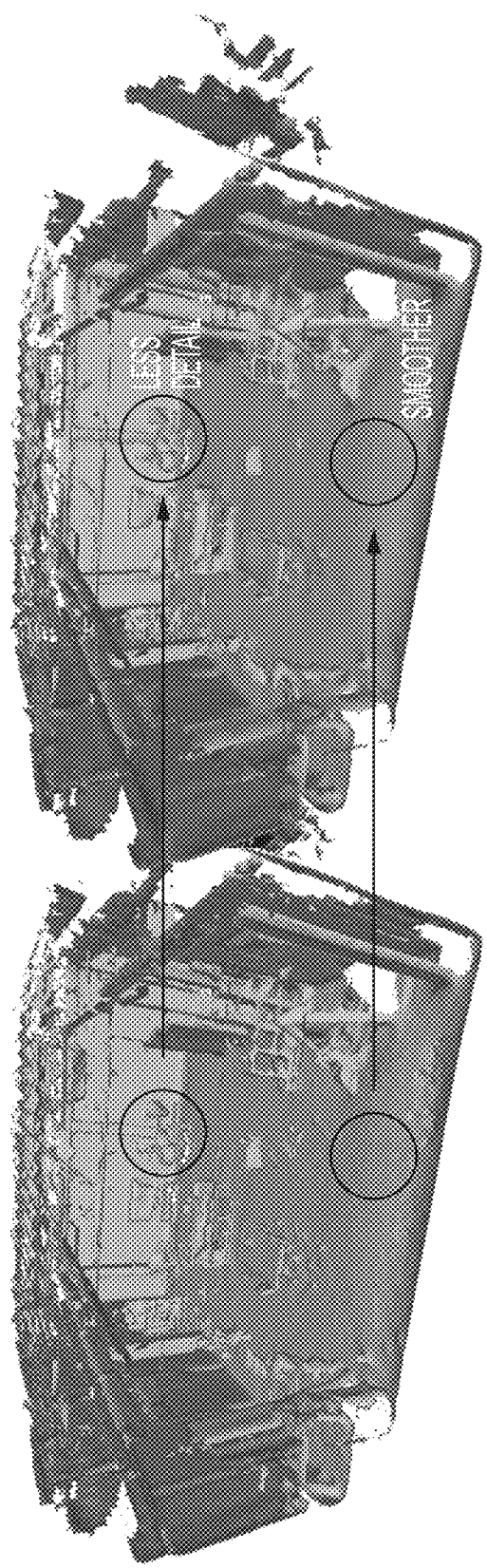

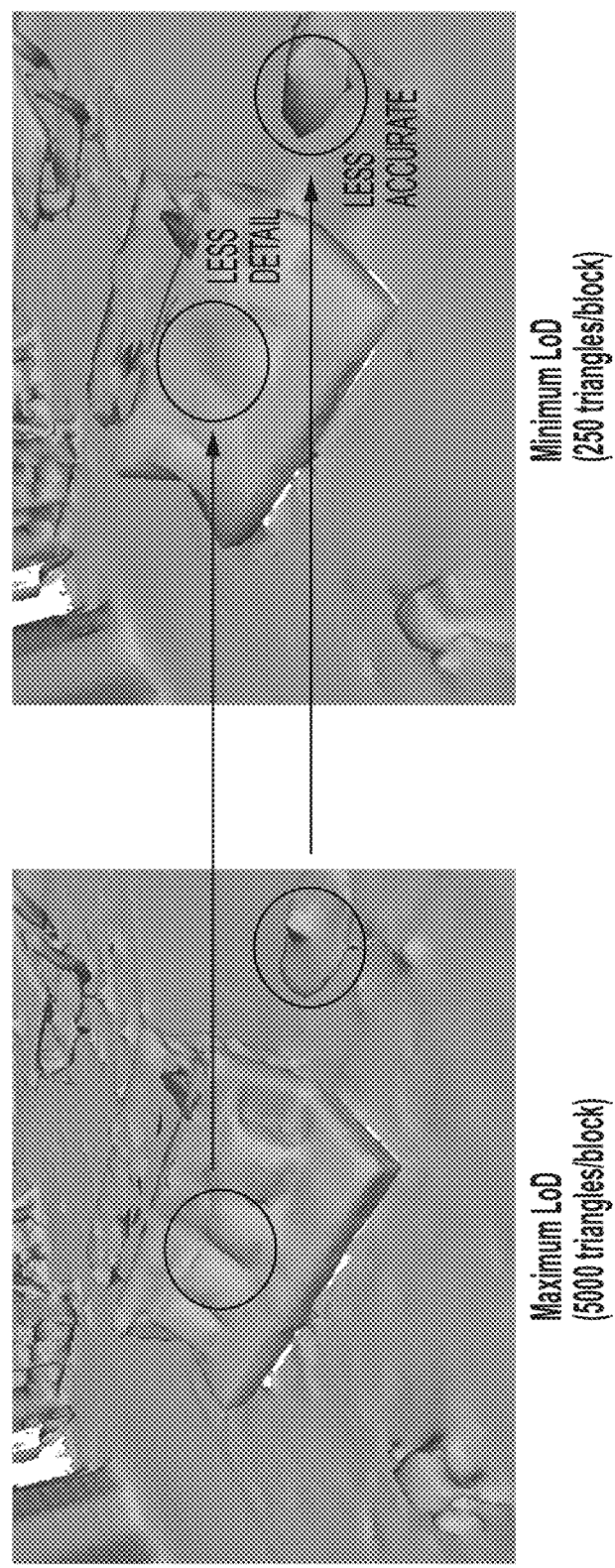
FIG. 34A  Maximum LoD (5000 triangles/block)
FIG. 34B  Minimum LoD (250 triangles/block)

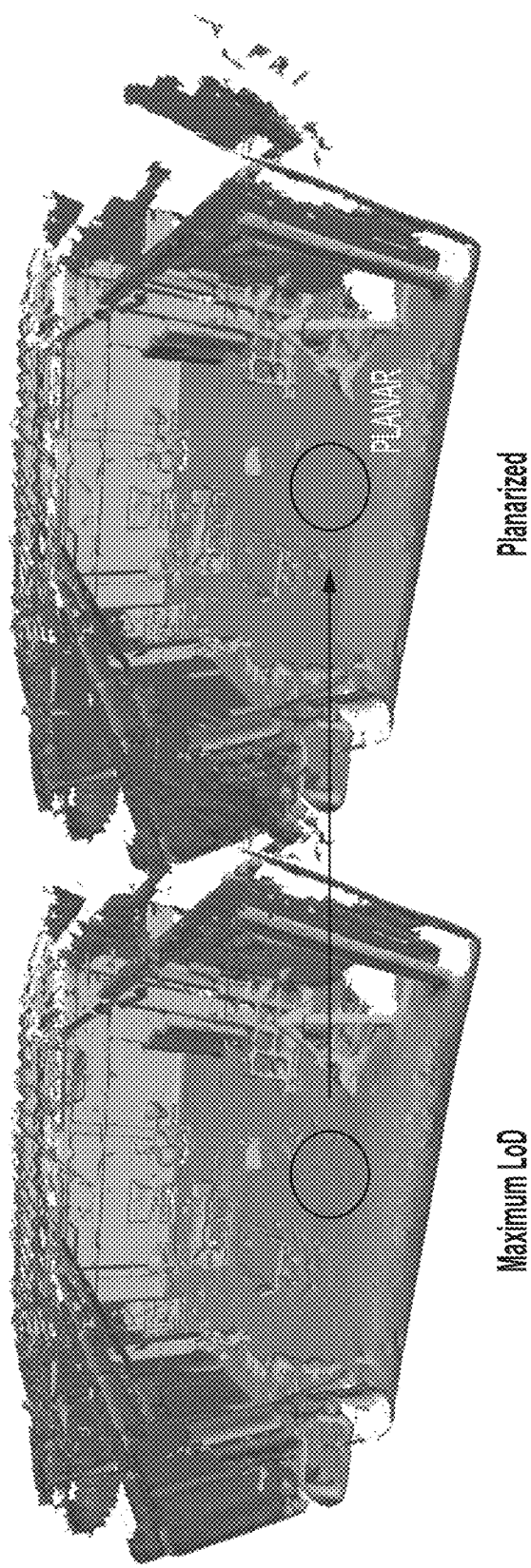
FIG. 35A Maximum LoD
FIG. 35B Planarized

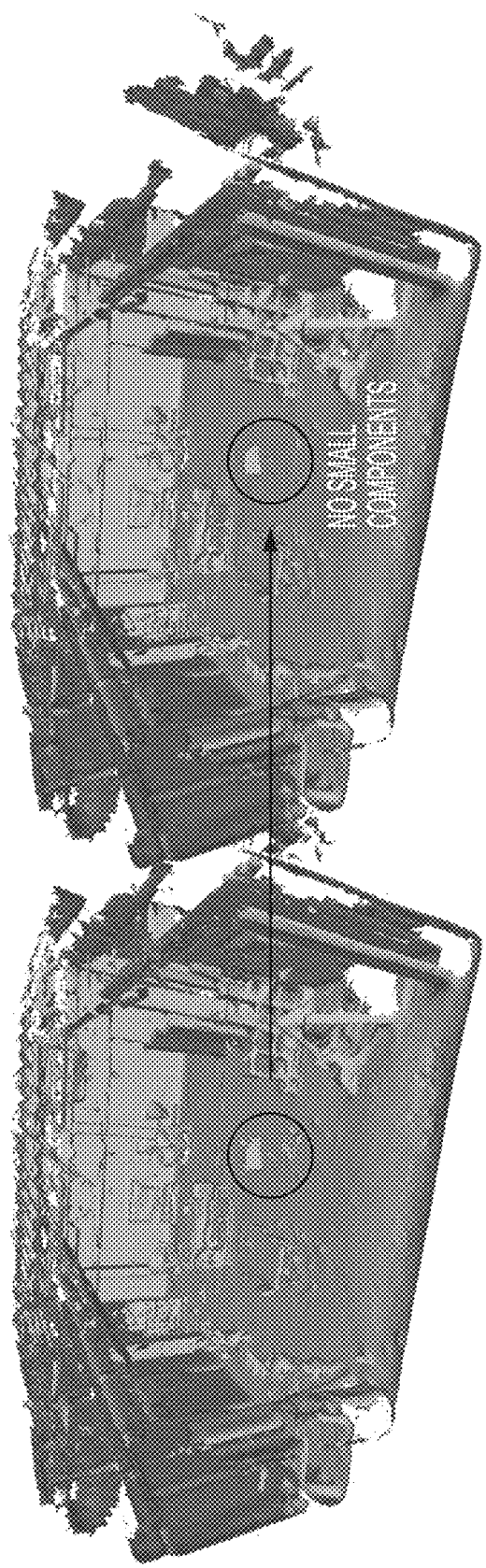
FIG. 36A Maximum LoD
FIG. 36B Disconnected Components Removed

CACHING AND UPDATING OF DENSE 3D RECONSTRUCTION DATA

CROSS REFERENCE TO RELATED APPLICATIONS

This application is a continuation of U.S. patent application Ser. No. 16/880,779, filed on May 21, 2020, entitled "CACHING AND UPDATING OF DENSE 3D RECONSTRUCTION DATA," which claims priority to and the benefit of U.S. Provisional Patent Application Ser. No. 62/850,900, filed on May 21, 2019 and entitled "CACHING AND UPDATING OF DENSE 3D RECONSTRUCTION DATA." The entire contents of these applications are hereby incorporated herein by reference in their entirety.

TECHNICAL FIELD

This application relates generally to cross reality systems that use a 3D world reconstruction to render scenes.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

BRIEF SUMMARY

Aspects of the present application relate to methods and apparatus for caching and updating 3D reconstruction data. The inventors have recognized and appreciated techniques to cache and update dense 3D reconstruction data in real-time on devices with limited computational resource, such as mobile devices. These techniques may be used together, separately, or in any suitable combination.

Some embodiments relate to a portable electronic system. The portable electronic system comprises a sensor configured to capture three-dimensional (3D) information about objects in a physical world; an active memory; a local memory; a transceiver configured for communication over a computer network with remote memory; and a processor communicatively coupled to the sensor, the active memory, the local memory, and the transceiver. The processor is configured to execute computer executable instructions to provide a 3D representation of a portion of the physical world based at least in part on the 3D information about the objects in the physical world. The 3D representation of the portion of the physical world comprises a plurality of blocks, each block having values representing objects in a region of portion of the physical world at a point in time. The computer executable instructions comprise instructions for persisting the plurality of blocks in at least one of the active memory, the local memory and the remote memory when the portable electronic system changes to an inactive operation status.

In some embodiments, the inactive operation status is shutdown or sleep.

In some embodiments, persisting the plurality of blocks in at least one of the active memory, the local memory and the remote memory comprises, when the inactive operation status is sleep, persisting the plurality of blocks in respective memories that the plurality of blocks currently exist such that the plurality of blocks are accessible by the portable electronic system upon the waking of the portable electronic system.

In some embodiments, persisting the plurality of blocks in at least one of the active memory, the local memory and the remote memory comprises, when the inactive operation status is shutdown, persisting at least a portion of blocks in the local memory to the remote memory, and persisting blocks in the active memory to the local memory and/or the remote memory.

In some embodiments, the computer executable instructions comprise instructions for computing one or more new blocks based at least in part on incoming 3D information about objects in the physical world, and selecting, from the persisted blocks, blocks at least in part overlapping with the one or more new blocks such that persisted blocks around the portable electronic system can be retrieved.

In some embodiments, selecting, from the persisted blocks, the blocks at least in part overlapping with the one or more new blocks comprises comparing the one or more new blocks with the persisted blocks.

In some embodiments, comparing the one or more new blocks with the persisted blocks comprises comparing the one or more new blocks to blocks persisted in the active memory.

In some embodiments, comparing the one or more new blocks with the persisted blocks comprises, when the active memory has no block at least in part overlapping with the one or more new blocks, comparing the one or more new blocks to blocks persisted in the local memory.

In some embodiments, comparing the one or more new blocks with the persisted blocks comprises, when the local memory has no block at least in part overlapping with the one or more new blocks, comparing the one or more new blocks to blocks persisted in the remote memory.

In some embodiments, the computer executable instructions comprise instructions for updating the plurality of blocks with the one or more new blocks.

Some embodiments relate to a method of operating a portable electronic system in an augmented reality system. The method comprises, with at least one processor: obtaining a plurality of blocks comprising three-dimensional (3D) information about surfaces in a physical world; storing at least one of the plurality of blocks in an active memory;

using blocks from the active memory for rendering virtual content to a user of the portable electronic system; persisting the blocks in active memory upon transition to an inactive operation status at a first time; and upon a transition to an active operation status at a second time, after the first time, determining whether to use the persisted blocks for rendering virtual content to a user of the portable electronic system.

In some embodiments, the blocks are mesh blocks.

In some embodiments, the method comprises paging blocks between the active memory and a local memory based on current or projected field of view of a user of the portable electronic system.

In some embodiments, the method comprises, upon a transition to an inactive operation status, persisting the blocks in the local memory.

In some embodiments, using blocks from the active memory for rendering virtual content to the user comprises using the blocks for visual occlusion processing, and computing physics-based interactions and/or environmental reasoning.

Some embodiments relate to a non-transitory computer-readable medium with instructions stored thereon, that when executed on a processor, perform the acts comprising obtaining a plurality of blocks comprising three-dimensional (3D) information about surfaces in a physical world; storing at least one of the plurality of blocks in an active memory; using blocks from the active memory for rendering virtual content to a user of the portable electronic system; persisting the blocks in active memory upon transition to an inactive operation status at a first time; and upon a transition to an active operation status at a second time, after the first time, determining whether to use the persisted blocks for rendering virtual content to a user of the portable electronic system.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 18 shows a table that is used by a method of categorizing all the pixels in the rectangular with respect to a minimum brick value (bmin) and a maximum brick value (bmax) in FIG. 17, according to some embodiments.

FIG. 26A is a schematic diagram illustrating generating Plane Coverage Points of FIG. 25, according to some embodiments.

FIG. 26B is a schematic diagram illustrating various exemplary planar geometry representations, which may be extracted from an exemplary rasterized plane mask, according to some embodiments.

FIGS. 33A and 33B show representations of the same environment without simplification and with simplification through triangle reduction, respectively.

FIGS. 34A and 34B show close-up representations of the same environment without simplification and with simplification through triangle reduction, respectively.

FIGS. 35A and 35B show representations of the same environment without planarization and with planarization, respectively.

FIGS. 36A and 36B show representations of the same environment without simplification and with simplification through removal of disconnected components, respectively.

DETAILED DESCRIPTION

Figure 1:
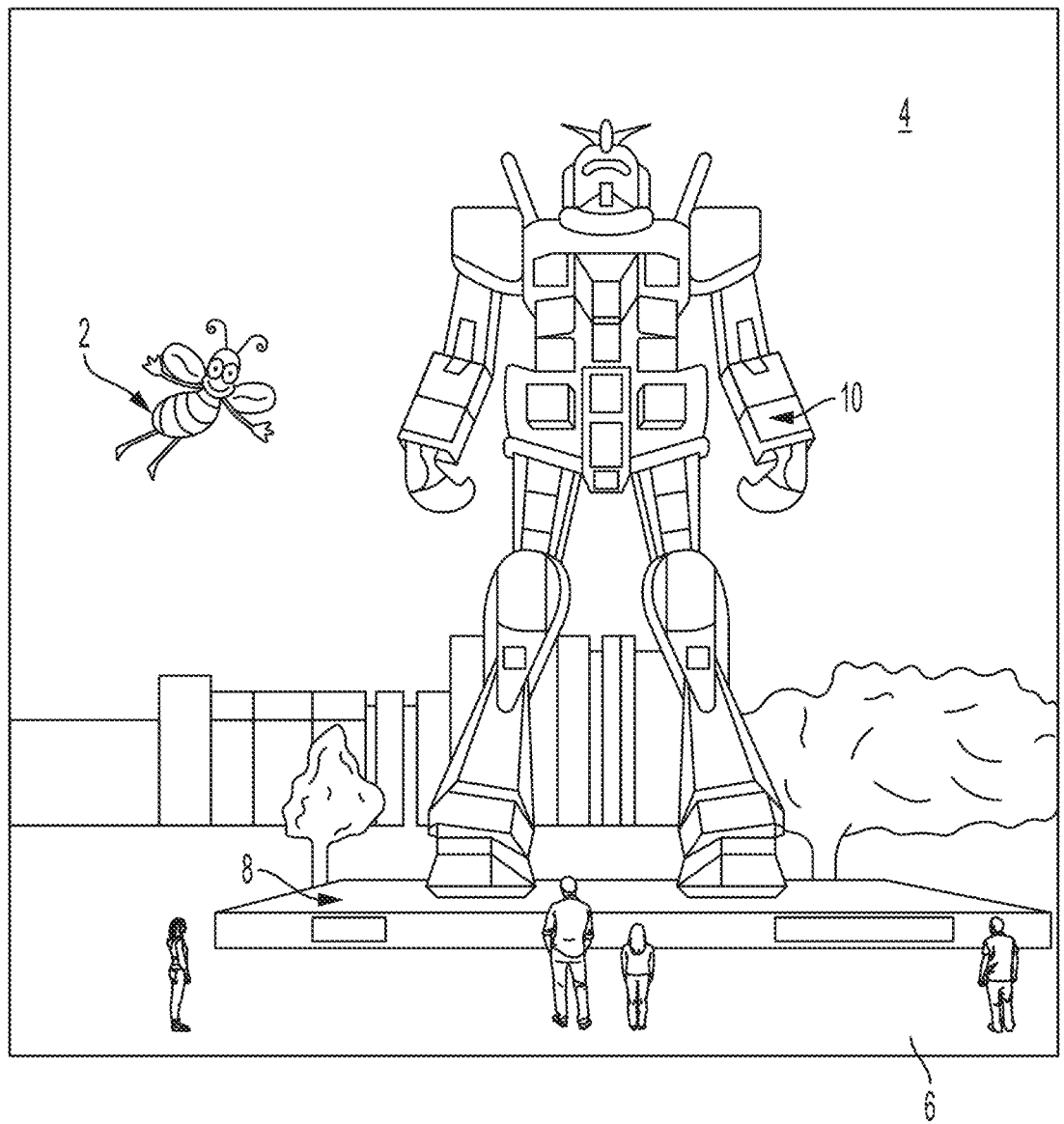
FIG. 1 is a sketch illustrating an example of a simplified augmented reality (AR) scene, according to some embodiments.

Described herein are methods and apparatus for creating and using a three-dimensional (3D) world reconstruction in an augmented reality (AR), mixed reality (MR), or virtual reality (VR) system. To provide realistic AR/MR/VR experiences to users, the AR/MR/VR system must know the user's physical surroundings in order to correctly correlate a location of virtual objects in relation to real objects. The world reconstruction may be constructed from image and depth information about those physical surroundings that are collected with sensors that are part of the AR/MR/VR system. The world reconstruction may then be used by any of multiple components of such a system. For example, the world reconstruction may be used by components that perform visual occlusion processing, compute physics-based interactions or perform environmental reasoning.

Occlusion processing identifies portions of a virtual object that should not be rendered for and/or displayed to a user because there is an object in the physical world blocking that user's view of the location where that virtual object is to be perceived by the user. Physics-based interactions are computed to determine where or how a virtual object appears to the user. For example, a virtual object may be rendered so as to appear to be resting on a physical object, moving through empty space or colliding with a surface of a physical object. The world reconstruction provides a model from which information about objects in the physical world may be obtained for such calculations.

Environmental reasoning may also use the world reconstruction in the course of generating information that can be used in computing how to render virtual objects. For example, environmental reasoning may involve identifying clear surfaces by recognizing that they are window panes or glass table tops. From such an identification, regions that contain physical objects might be classified as not occluding virtual objects but might be classified as interacting with virtual objects. Environmental reasoning may also generate information used in other ways, such as identifying stationary objects that may be tracked relative to a user's field of view to compute motion of the user's field of view.

However, there are significant challenges in providing such a system. Substantial processing may be required to compute the world reconstruction. Further, the AR/MR/VR systems must correctly know how to position virtual objects in relation to the user's head, body, etc. As the user's position in relation to the physical environment changes, the relevant portions of the physical world can also change, which can require further processing. Moreover, the 3D reconstruction data are often required to be updated as objects move in the physical world (e.g., a cup moves on a table). Updates to the data representing the environment that the user is experiencing must be performed quickly without using so much of the computing resources of the computer generating the AR/MR/VR environment because it is unable to perform other functions while performing world reconstruction. Further, the processing of reconstruction data by components that "consume" that data can exacerbate the demands on computer resources.

Known AR/MR/VR systems require high computing power (e.g., a GPU) to run real-time World Reconstruction only within a pre-defined reconstruction volume (e.g., a predefined voxel grid). The inventors have realized and appreciated techniques for operating AR/MR/VR systems to provide accurate 3D reconstruction data in real-time with low usage of computational resources, such as compute power (e.g., a single ARM core), memory (e.g., less than 1 GB), and network bandwidth (e.g., less than 100 Mbps). These techniques relate to reducing processing required to generate and maintain the world reconstruction as well as to providing and consuming data with low computational overhead.

These techniques may include reducing the amount of data that is processed when updating a world reconstruction, such as by identifying portions of sensor data available at any time to use in the creating or updating the world reconstruction. Sensor data may be selected, for example, based on whether it represents a portion of the physical world that is likely near a surface of an object to the represented in the world reconstruction.

In some embodiments, computational resources may be reduced by simplifying the data representing the world reconstruction. A simpler representation may reduce resources for the processing, storage and/or management of that data as well as for its use.

In some embodiments, use of computational resources may be reduced by representing the physical world in blocks that may be stored and retrieved separately, but combined in a way that provides a realistic representation of the physical world. The blocks may be managed in memory to limit computational resources and may, in some embodiments, enable sharing of blocks across AR/MR/VR systems operating in the same physical space such that each AR/MR/VR system does less processing to construct a world reconstruction. Alternatively or additionally, blocks may be persisted across sessions of a portable user system in an AR/MR/VR system. Upon start of a new session for the portable user system, blocks persisted from a prior session may be selectively used, reducing the time for the user system to have an adequate representation of the physical world while nonetheless enabling the system to render virtual content to a user in a realistic way that reflects interaction of the virtual content with the physical world.

In some embodiments, use of computational resources may be reduced by selecting from among different representations of the physical world when accessing information about the physical world. The world reconstruction, for example, may include information about the physical world captured from different sensors and/or stored in different formats. The data that is the simplest to consume or provide may be supplied to a component using the world reconstruction to render virtual objects. Where simpler data is unavailable, data acquired with a different sensor, which may generate a higher computation load, may be accessed. As an example, the world reconstruction may include a depth map collected with a depth sensor and a more fulsome representation of the 3D world, such as may be stored as a mesh computed from image information. Information about the physical world may be supplied to a component doing occlusion processing based on the depth map where it is available. Where there are holes in the depth map, information to fill those holes may be extracted from the mesh. In some embodiments, the depth map may be "live," representing the physical world as captured by the depth sensor at the time the data is accessed.

Techniques as described herein may be used together or separately with many types of devices and for many types of scenes, including wearable or portable devices with limited computations resources that provide an augmented reality scene.

AR System Overview

Figure 2:
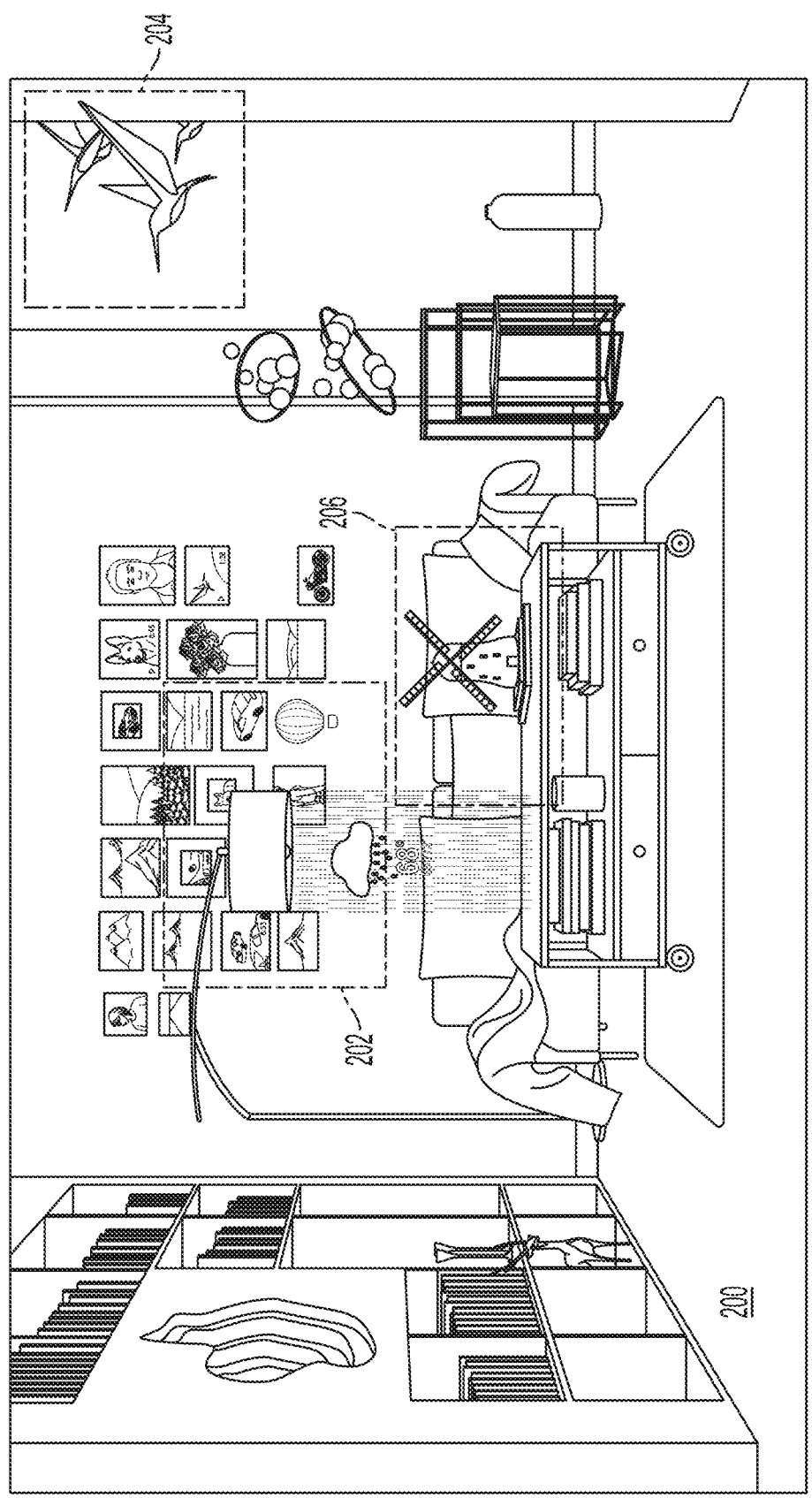
FIG. 2 is a sketch of an exemplary simplified AR scene, showing exemplary World Reconstruction use cases including visual occlusion, physics-based interactions, and environment reasoning, according to some embodiments.

FIGS. 1-2 illustrate such scenes. For purposes of illustration, an AR system is used as an example of an XR system. FIGS. 3-8 illustrate an exemplary AR system, including one or more processors, memory, sensors and user interfaces that may operate according to the techniques described herein.

Referring to Figure (FIG. 1, an AR scene 4 is depicted wherein a user of an AR technology sees a physical world park-like setting 6, featuring people, trees, buildings in the background, and a concrete platform 8. In addition to these items, the user of the AR technology also perceives that they "see" a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that include a world reconstruction component, which may build and update a representation of the physical world surfaces around the user. This representation may be used to occlude rendering, to place virtual objects, in physics based interactions, and for virtual character path planning and navigation, or for other operations in which information about the physical world is used. FIG. 2 depicts another example of an AR scene 200, showing exemplary world reconstruction use cases, including visual occlusion 202, physics-based interactions 204, and environment reasoning 206, according to some embodiments.

The exemplary scene 200 is a living room having walls, a book shelf on one side of a wall, a floor lamp at a corner of the room, a floor, a sofa and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table. For the images on the wall, the AR technology requires information about not only surfaces of the wall but also objects and surfaces in the room such as lamp shape, which are occluding the images to render the virtual objects correctly. For the flying birds flying, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may reason that it is movable, whereas corners of shelves or corners of the wall may be reasoned to be stationary. Such a distinction may be used in reasoning as to which portions of the scene are used or updated in each of various operations.

A scene may be presented to the user via a system that includes multiple components, including a user interface that can stimulate one or more user senses, including sight sound and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments some or all of these components may be integrated into a wearable device.

Figure 3:
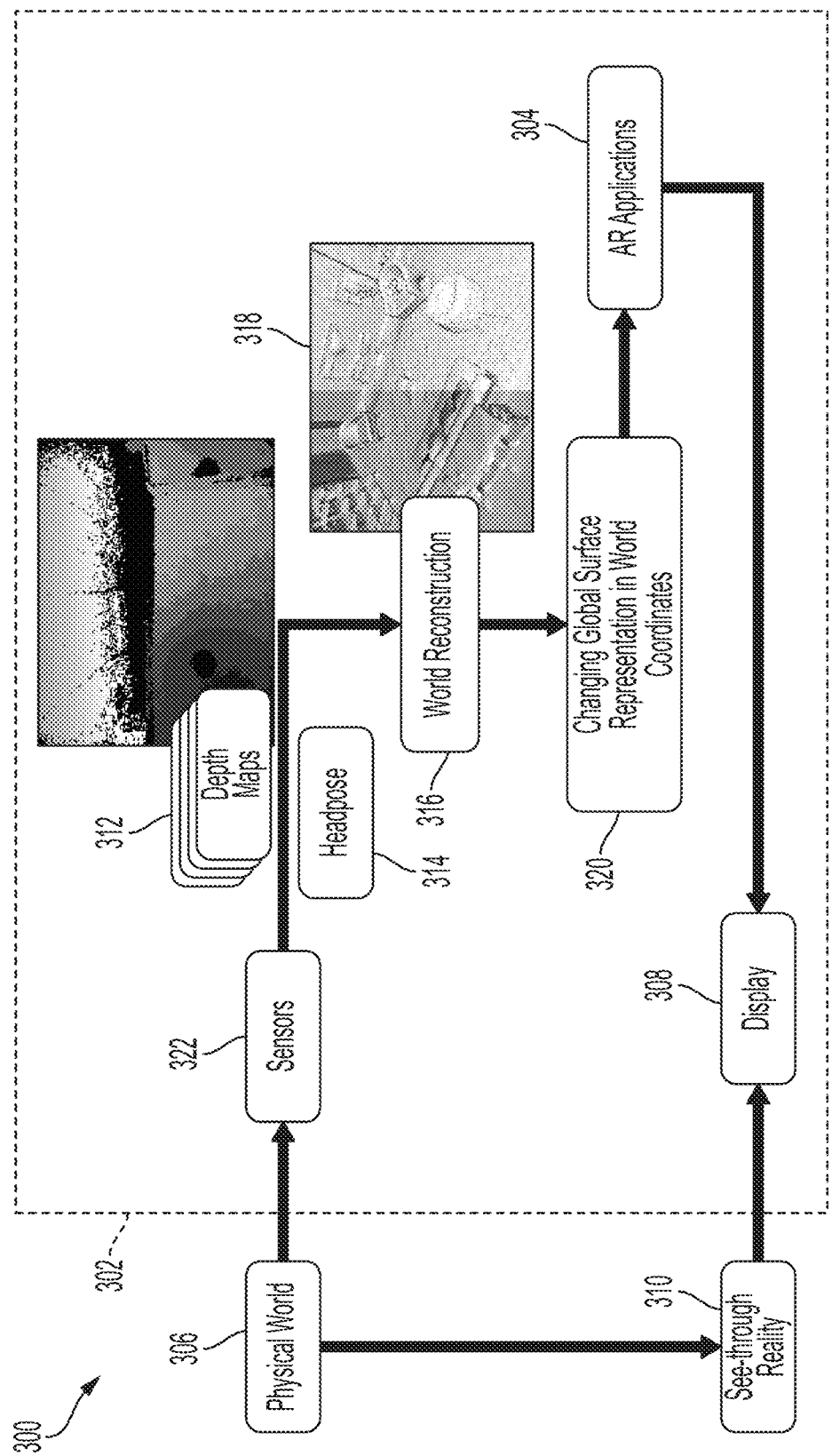
FIG. 3 is a schematic diagram illustrating data flow in an AR system configured to provide an experience of AR contents interacting with a physical world, according to some embodiments.

FIG. 3 depicts an AR system 302 configured to provide an experience of AR contents interacting with a physical world 306, according to some embodiments. The AR system 302 may include a display 308. In the illustrated embodiment, the display 308 may be worn by the user as part of a headset such that a user may wear the display over their eyes like a pair of goggles or glasses. At least a portion of the display may be transparent such that a user may observe a see-through reality 310. The see-through reality 310 may correspond to portions of the physical world 306 that are within a present viewpoint of the AR system 302, which may correspond to the viewpoint of the user in the case that the user is wearing a headset incorporating both the display and sensors of the AR system to acquire information about the physical world.

AR contents may also be presented on the display 308, overlaid on the see-through reality 310. To provide accurate interactions between AR contents and the see-through reality 310 on the display 308, the AR system 302 may include sensors 322 configured to capture information about the physical world 306.

The sensors 322 may include one or more depth sensors that output depth maps 312. Each depth map 312 may have multiple pixels, each of which may represent a distance to a surface in the physical world 306 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire information that may be processed to represent the physical world in other ways. For example, the images may be processed in world reconstruction component 316 to create a mesh, representing connected portions of objects in the physical world. Metadata about such objects, including for example, color and surface texture, may similarly be acquired with the sensors and stored as part of the world reconstruction.

The system may also acquire information about the headpose of the user with respect to the physical world. In some embodiments, sensors 310 may include inertial measurement units that may be used to compute and/or determine a headpose 314. A headpose 314 for a depth map may indicate a present viewpoint of a sensor capturing the depth map with six degrees of freedom (6DoF), for example, but the headpose 314 may be used for other purposes, such as to relate image information to a particular portion of the physical world or to relate the position of the display worn on the user's head to the physical world. In some embodiments, the headpose information may be derived in other ways than from an IMU, such as from analyzing objects in an image.

The world reconstruction component 316 may receive the depth maps 312 and headposes 314, and any other data from the sensors, and integrate that data into a reconstruction 318, which may at least appears to be a single, combined reconstruction. The reconstruction 318 may be more complete and less noisy than the sensor data. The world reconstruction component 316 may update the reconstruction 318 using spatial and temporal averaging of the sensor data from multiple viewpoints over time.

The reconstruction 318 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 318, portions of the physical world are presented as a global surface; on the right side of the reconstruction 318, portions of the physical world are presented as meshes.

The reconstruction 318 may be used for AR functions, such as producing a surface representation of the physical world for occlusion processing or physics-based processing. This surface representation may change as the user moves or objects in the physical world change. Aspects of the reconstruction 318 may be used, for example, by a component 320 that produces a changing global surface representation in world coordinates, which may be used by other components.

The AR contents may be generated based on this information, such as by AR applications 304. An AR application 304 may be a game program, for example, that performs one or more functions based on information about the physical world, such visual occlusion, physics-based interactions, and environment reasoning. It may perform these functions by querying data in different formats from the reconstruction 318 produced by the world reconstruction component 316.

In some embodiments, component 320 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 304 may use this information to generate and update the AR contents. The virtual portion of the AR contents may be presented on the display 308 in combination with the see-through reality 310, creating a realistic user experience.

Figure 4:
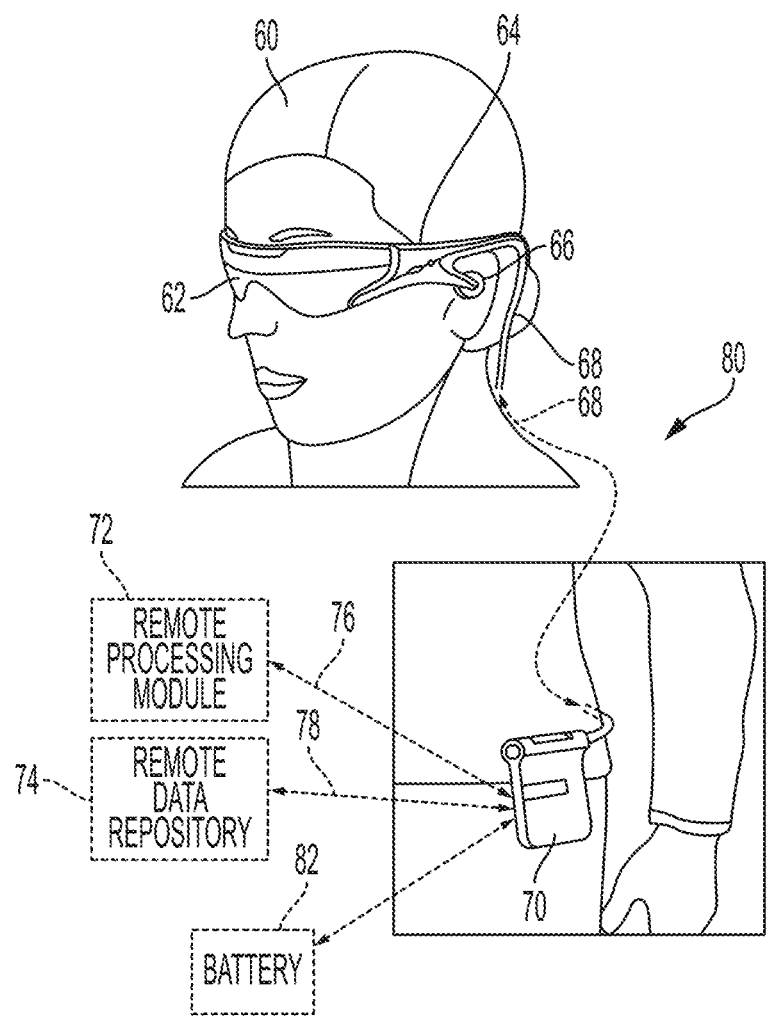
FIG. 4 is a schematic diagram illustrating an example of an AR display system, according to some embodiments.

In some embodiments, an AR experience may be provided to a user through a wearable display system. FIG. 4 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular. In some embodiments, the display device 62 may be an example of the display 308 in FIG. 3.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control. The display device 62 is operatively coupled, such as by a wired lead or wireless connectivity 68, to a local data processing module 70 which may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration).

The local data processing module 70 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70. In some embodiments, the world reconstruction component 316 in FIG. 3 may be at least partially implemented in the local data processing module 70. For example, the local data processing module 70 may be configured to execute computer executable instructions to generate the physical world representations based at least in part on at least a portion of the data.

In some embodiments, the local data processing module 70 may include one or more processors (e.g., a graphics processing unit (GPU)) configured to analyze and process data and/or image information. In some embodiments, the local data processing module 70 may include a single processor (e.g., a single-core or multi-core ARM processor), which would limit the module 70's compute budget but enable a more miniature device. In some embodiments, the world reconstruction component 316 may use a compute budget less than a single ARM core to generate physical world representations in real-time on a non-predefined space such that the remaining compute budget of the single ARM core can be accessed for other uses such as, for example, extracting meshes.

In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module. A world reconstruction, for example, may be stored in whole or in part in this repository 74.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

Figure 5A:
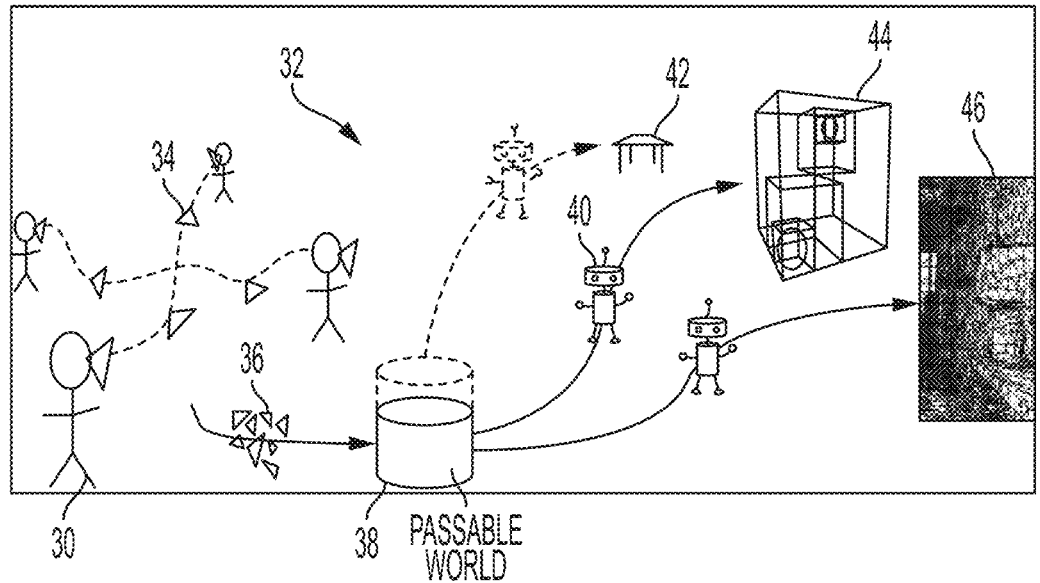
FIG. 5A is a schematic diagram illustrating a user wearing an AR display system rendering AR content as the user moves through a physical world environment, according to some embodiments.

FIG. 5A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34 such as pose relation to mapped features or directional audio inputs. The positions 34 are aggregated to data inputs 36 and processed at least by a passable world module 38, which may be implemented, for example, by processing on a remote processing module 72 of FIG. 3. In some embodiments, the passable world module 38 may include the world reconstruction component 316.

The passable world module 38 determines where and how AR content 40 can be placed in the physical world as determined from the data inputs 36. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 42 (e.g., a table) from a reconstruction (e.g., the reconstruction 318) to determine the shape and position of the AR content 40. As an example, the fixed element may be a table and the virtual content may be positioned such that it appears to be on that table. In some embodiments, the AR content may be placed within structures in a field of view 44, which may be a present field of view or an estimated future field of view. In some embodiments, the AR content may be placed relative to a mapped mesh model 46 of the physical world.

As depicted, the fixed element 42 serves as a proxy for any fixed element within the physical world which may be stored in the passable world module 38 so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

The mapped mesh model 46 of the physical world may be created by the AR display system and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Figure 5B:
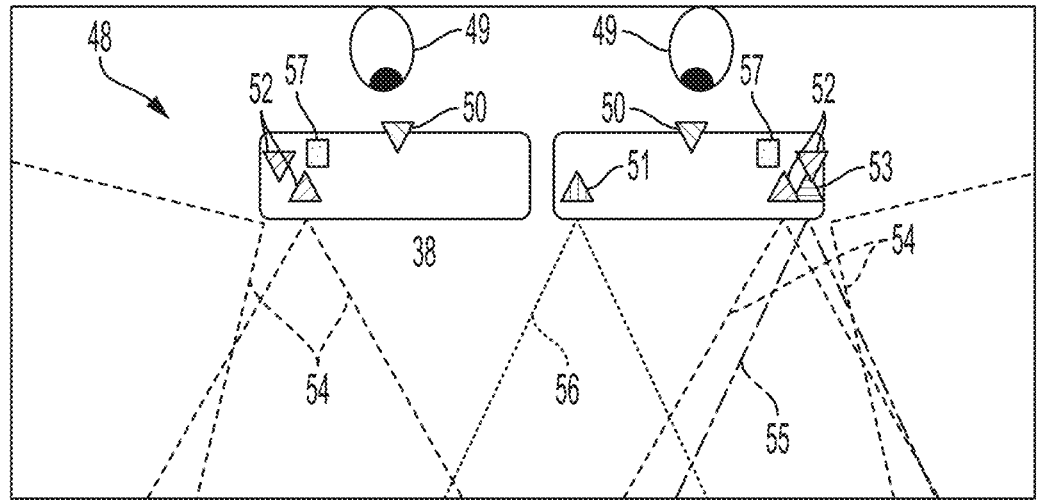
FIG. 5B is a schematic diagram illustrating a viewing optics assembly and attendant components, according to some embodiments.

FIG. 5B illustrates a schematic of a viewing optics assembly 48 and attendant components. Oriented to user eyes 49, in some embodiments, two eye tracking cameras 50 detect metrics of the user eyes 49 such as eye shape, eyelid occlusion, pupil direction and glint on the user eyes 49. In some embodiments, a depth sensor 51, such as a time of flight sensor, emits relay signals to the world to determine distance to given objects. In some embodiments, world cameras 52 record a greater-than-peripheral view to map the environment 32 and detect inputs that may affect AR content. Camera 53 may further capture a specific timestamp of physical world images within a field of view of the user. Each of the world cameras 52, the camera 53 and the depth sensor 51 have respective fields of view of 54, 55, and 56 to collect data from and record a physical world scene, such as physical world environment 32 depicted in FIG. 3A.

Inertial measurement units 57 may determine movement and orientation of the viewing optics assembly 48. In some embodiments, each component is operatively coupled to at least one other component. For example, the depth sensor 51 is operatively coupled to the eye tracking cameras 50 as a confirmation of measured accommodation against actual distance the user eyes 49 are looking at.

Information from these sensors in viewing optics assembly 48 may be coupled to one or more of the processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. Regardless of how content is presented to a user, a model of the physical world is required so that characteristics of the virtual objects, which can be impacted by physical objects, including the shape, position, motion and visibility of the virtual object, can be correctly computed. In some embodiments, the model may include the reconstruction of a physical world, for example, the reconstruction 318.

That model may be created from data collected from sensors on a wearable device of the user. Though, in some embodiments, the model may be created from data collected by multiple users, which may be aggregated in a computing device remote from all of the users (and which may be "in the cloud").

Figure 6:
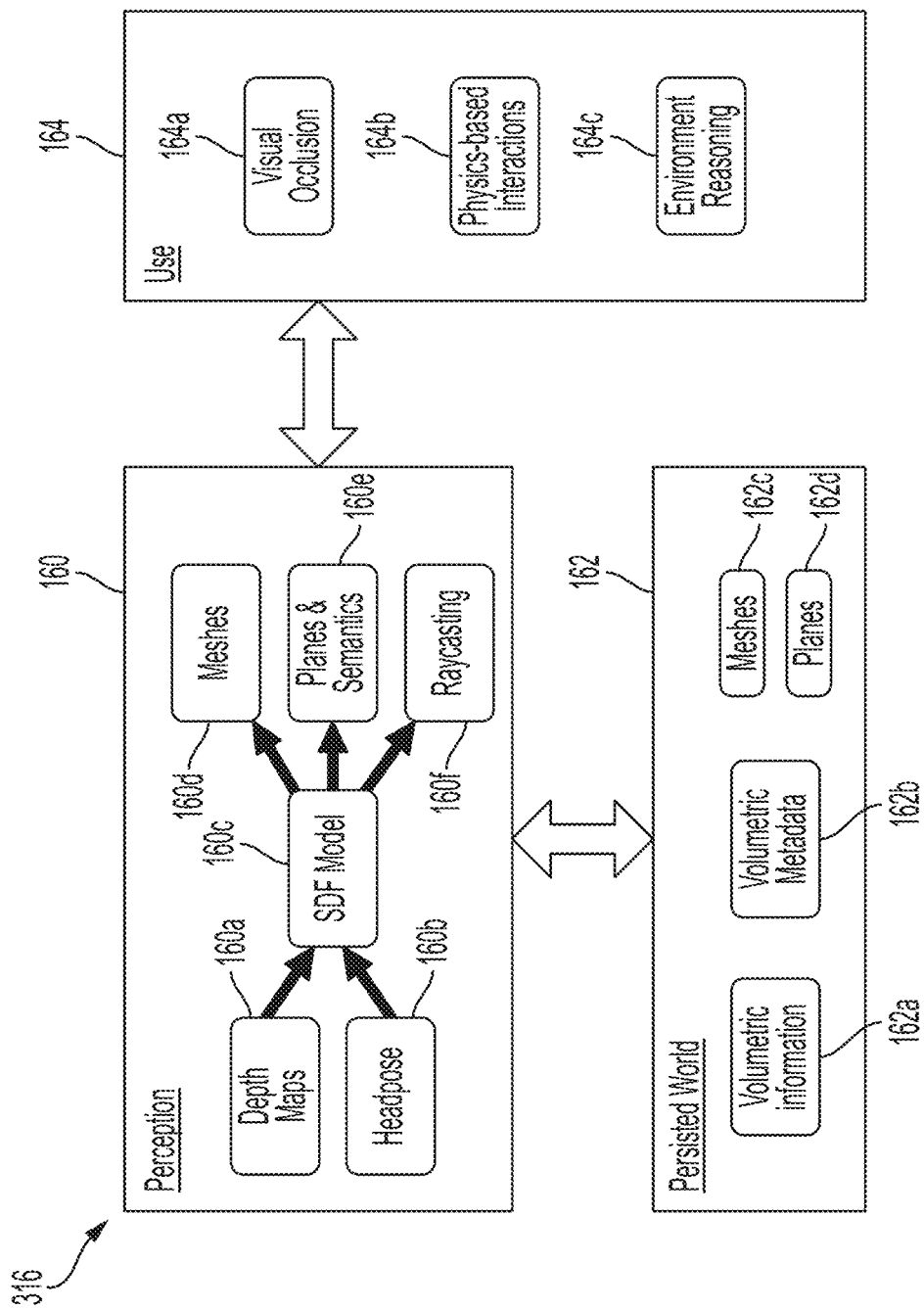
FIG. 6 is a schematic diagram illustrating an AR system using a world reconstruction system, according to some embodiments.

The model may be created, at least in part, by a world reconstruction system, for example, the world reconstruction component 316 of FIG. 3 depicted in more detail in FIG. 6. The world reconstruction component 316 may include a perception module 160 that may generate, update, and store representations for a portion of the physical world. In some embodiments, the perception module 160 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

Figure 7C:
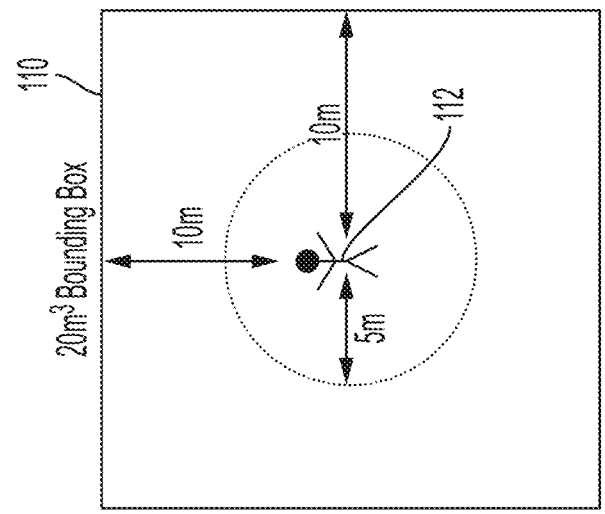
FIG. 7C is a schematic diagram illustrating a perception range with respect to a reconstruction range at a single position, according to some embodiments.
Figure 7B:
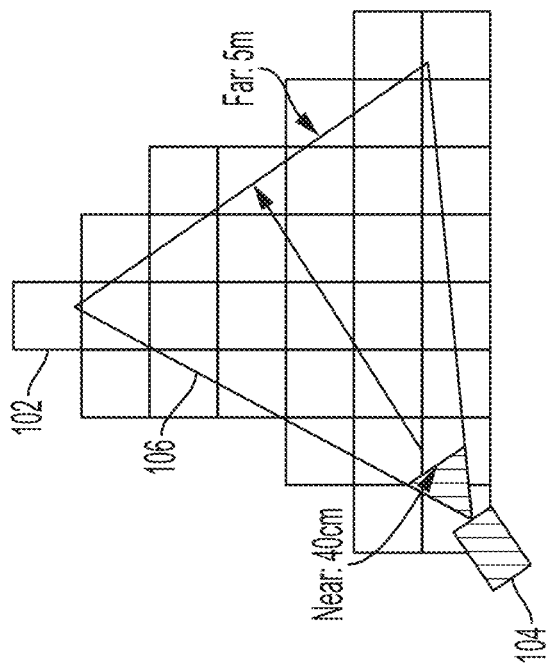
FIG. 7B is a schematic diagram illustrating a reconstruction range with respect to a single viewpoint, according to some embodiments.
Figure 7A:
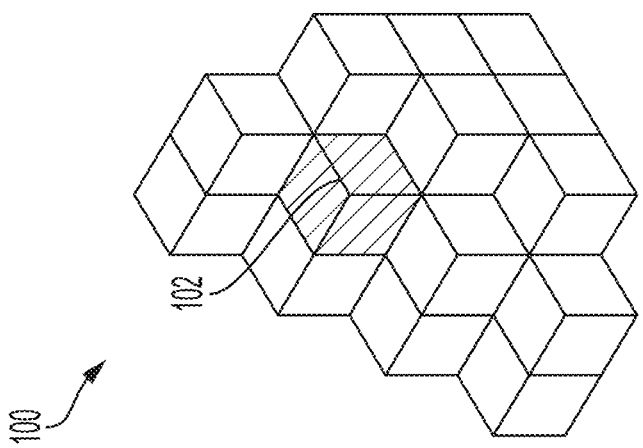
FIG. 7A is a schematic diagram illustrating a 3D space discretized into voxels, according to some embodiments.

FIG. 7A depicts an example of a 3D space 100 discretized into voxels 102. In some embodiments, the perception module 160 may determine objects of interest and set the volume of a voxel in order to capture features of the objects of interest and avoid redundant information. For example, the perception module 160 may be configured to identify larger objects and surfaces, such as walls, ceilings, floors, and large furniture. Accordingly, a volume of a voxel may be set to a relatively large size, for example, a cube of 4 $cm^3$.

Figure 8E:
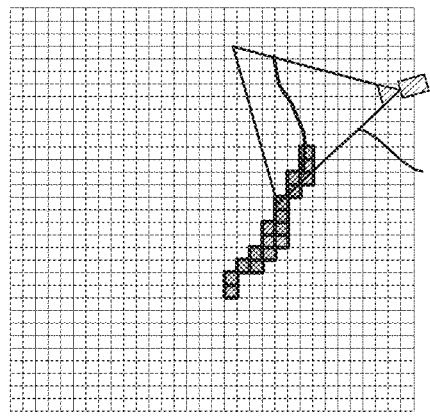
FIGS. 8A-F are schematic diagrams illustrating reconstructing a surface in a physical world into a voxel model by an image sensor viewing the surface from multiple positions and viewpoints, according to some embodiments.
Figure 8F:
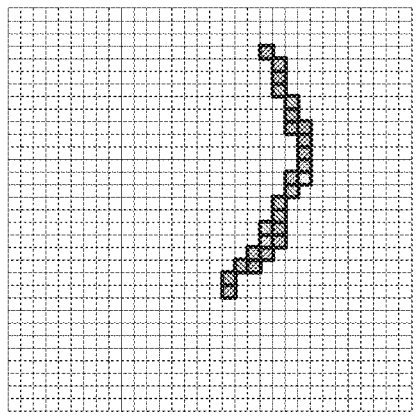

A reconstruction of a physical world including voxels may be referred to as a volumetric model. Information to create a volumetric model may be created over time as the sensors move about the physical world. Such motion may happen as the user of a wearable device including the sensors moves around. FIGS. 8A-F depict an example of reconstructing a physical world into a volumetric model. In the illustrated example, the physical world includes a portion 180 of a surface which is shown in FIG. 8A. In FIG. 8A, a sensor 182 at a first location may have a field of view 184, within which the portion 180 of the surface is visible.

The sensor 182 may be of any suitable type, such as a depth sensor. However, depth data may be derived from an image sensor(s) or in other ways. The perception module 160 may receive data from the sensor 182, and then set the values of multiple voxels 186 as illustrated in FIG. 8B to represent the portion 180 of the surface visible by the sensor 182 in the field of view 184.

Figure 8C:
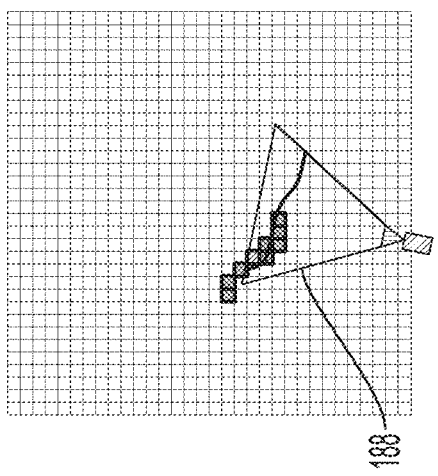
Figure 8D:
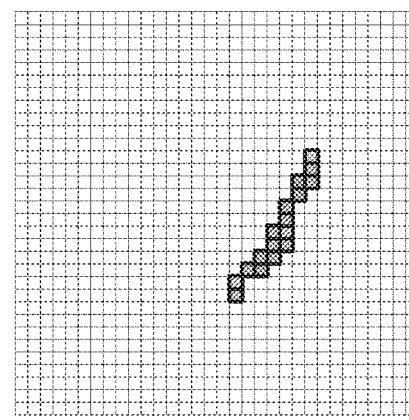
Figure 8A:
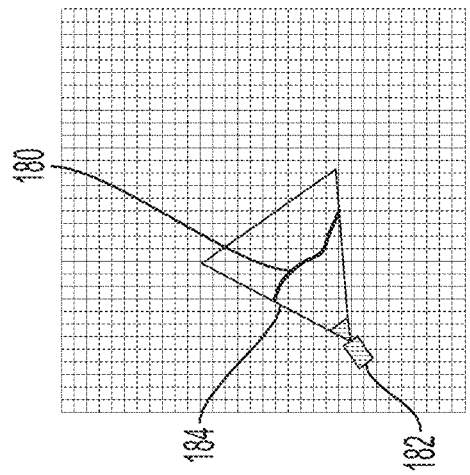
Figure 8B:
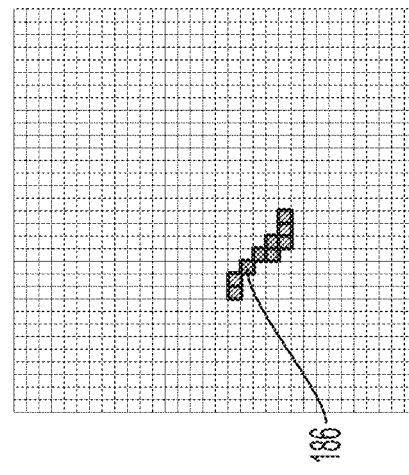

In FIG. 8C, the sensor 182 may move to a second location and have a field of view 188. As shown in FIG. 8D, a further group of voxels become visible, and the values of these voxels may be set to indicate the location of the portion of the surface that has entered the field of view 188 of sensor 182. The values of these voxels may be added to the volumetric model for the surface In FIG. 8E, the sensor 182 may further move to a third location and have a field of view 190. In the illustrated example, additional portions of the surface becomes visible in the field of view 190. As shown in FIG. 8F, a further group of voxels may become visible, and the values of these voxels may be set to indicate the location of the portion of the surface that has entered the field of view 190 of the sensor 182. The values of these voxels may be added to the volumetric model for the surface. As shown in FIG. 6, this information may be stored as part of the persisted world as volumetric information 162a. Information about the surfaces may also be stored, such as color or texture. Such information may be stored, for example, as volumetric metadata 162b.

In addition to generating information for a persisted world representation, the perception module 160 may identify and output indications of changes in a region around a user of a AR system. Indications of such changes may trigger updates to volumetric data stored as part of the persisted world, or trigger other functions, such as triggering components 304 that generate AR content to update the AR content.

In some embodiments, the perception module 160 may identify changes based on a signed distance function (SDF) model. The perception module 160 may be configured to receive sensor data such as, for example, depth maps 160a and headposes 160b, and then fuse the sensor data into a SDF model 160c. Depth maps 160a may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The headposes 160b may enable the SDF information to be related to a voxel in the physical world.

Referring back to FIG. 6, in some embodiments, the perception module 160 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may be operate reliably over a range of distances, creating the observation range of the sensor, which may be from a few centimeters or tens of centimeters to a few meters.

FIG. 7B depicts a reconstruction range with respect to a sensor 104 having a viewpoint 106. A reconstruction of 3D spaces within the viewpoint 106 may be built based on data captured by the sensor 104. In the illustrated example, the sensor 104 has an observation range of 40 cm to 5 m. In some embodiments, a sensor's reconstruction range may be determined to be smaller than the observation range of the sensor because sensor outputs close to its observation limits may be more noisy, incomplete, and inaccurate. For example, in the illustrated example of 40 cm to 5 m, a corresponding reconstruction range may be set to be from 1 to 3 m, and data collected with the sensor indicating surfaces outside this range may not be used.

In some embodiments, the perception range may be larger than a sensor's reconstruction range. If components 164 that use data about the physical world require data about regions within the perception range that are outside the portions of the physical world that are within the current reconstruction range, that information may be provided from the persisted world 162. Accordingly, information about the physical world may be readily accessible by a query. In some embodiments, an API may be provided to respond to such a query, providing information about the current perception range of the user. Such technique may reduce time needed to access an existing reconstruction and provide an improved user experience.

In some embodiments, the perception range may be a 3D space corresponding to a bounding box centered around a user location. As the user moves, the portion of the physical world within the perception range, which may be queriable by the components 164, may move with the user. FIG. 7C depicts a bounding box 110 centered around a location 112. It should be appreciated that the size of the bounding box 110 may be set to enclose a sensor's observation range with reasonable extensions because a user cannot move at an unreasonable speed. In the illustrated example, a sensor worn by the user has an observation limit of 5 m. The bounding box 110 is set as a cube of 20 m$^3$.

Referring back to FIG. 6, the world reconstruction component 316 may include additional modules that may interact with the perception module 160. In some embodiments, a persisted world module 162 may receive representations for the physical world based on data acquired by the perception module 160. The persisted world module 162 also may include various formats of representations of the physical world. For example, volumetric metadata 162b such as voxels may be stored as well as meshes 162c and planes 162d. In some embodiments, other information, such as depth maps could be saved.

In some embodiments, the perception module 160 may include modules that generate representations for the physical world in various formats including, for example, meshes 160d, planes and semantics 160e. These modules may generate representations based on data within the perception range of one or more sensors at the time the representation is generated as well as data captured at prior times and information in the persisted world 162. In some embodiments, these components may operate on depth information captured with a depth sensor. However, the AR system may include vision sensors and may generate such representations by analyzing monocular or binocular vision information.

In some embodiments, these modules may operate on regions of the physical world, such as regions represented by blocks or tiles, as described below. Those modules may be triggered to update a block or tile, or other subregion of the physical world, when the perception module 160 detects a change in the physical world in that subregion. Such a change, for example, may be detected by detecting a new surface in the SDF model 160c or other criteria, such as changing the value of a sufficient number of voxels representing the subregion.

The world reconstruction component 316 may include components 164 that may receive representations of the physical world from the perception module 160. Information about the physical world may be pulled by these components according to, for example, a use request from an application. In some embodiments, information may be pushed to the use components, such as via an indication of a change in a pre-identified region or a change of the physical world representation within the perception range. The components 164, may include, for example, game programs and other components that perform processing for visual occlusion, physics-based interactions, and environment reasoning.

Responding to the queries from the components 164, the perception module 160 may send representations for the physical world in one or more formats. For example, when the component 164 indicates that the use is for visual occlusion or physics-based interactions, the perception module 160 may send a representation of surfaces. When the component 164 indicates that the use is for environmental reasoning, the perception module 160 may send meshes, planes and semantics of the physical world.

In some embodiments, the perception module 160 may include components that format information to provide the component 164. An example of such a component may be raycasting component 160f. A use component (e.g., component 164), for example, may query for information about the physical world from a particular point of view. Raycasting component 160f may select from one or more representations of the physical world data within a field of view from that point of view.

Viewpoint Dependent Brick Selection for Fast Volumetric Reconstruction

As should be appreciated from the foregoing description, the perception module 160, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification.

A world reconstruction system may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction. The reconstruction may be more complete and less noisy than the original sensor data by using spatial and temporal averaging (i.e. averaging data from multiple viewpoints over time).

The reconstruction may contain data of different levels of sophistication including, for example, raw data such as live depth data, fused volumetric data such as voxels, and computed data such as meshes.

In some embodiments, AR and MR systems represent a 3D scene with a regular voxel grid, where each voxel may contain a signed distance field (SDF) value. The SDF value describes whether the voxel lies inside or outside a surface in the scene to be reconstructed and a distance from the voxel to the surface. Computing the 3D reconstruction data, representing the desired volume of the scene, requires a large amount of memory and processing power. These requirements increase for scenes that represents larger spaces as the number of variables required for the 3D reconstruction grows cubically with the number of depth images processed.

Described herein is an efficient way of reducing processing. In accordance with some embodiments, a scene may be represented by one or more bricks. Each brick may include multiple voxels. The bricks processed to generate the 3D reconstruction of the scene may be selected by culling the set of bricks representing the scene based on a frustum derived from the field-of-view (FOV) of an image sensor, and/or a depth image (or "depth map") of the scene created with a depth sensor.

The depth image may have one or more pixels, each representing a distance to a surface in the scene. These distances can be related to a position relative to an image sensor, such that the data output from the image sensor may be selectively processed. Image data may be processed for those bricks representing portions of the 3D scene that contain surfaces that would be visible from the point of view (or "viewpoint") of the image sensor. Processing of some or all of the remaining bricks may be omitted. With such an approach, the selected bricks may be ones that are likely to contain new information, which may be arrived at by culling bricks about which the output of the image sensor is unlikely to provide useful information. The data output from the image sensor is unlikely to provide useful information about bricks that are either closer to or further from the image sensor than a surface indicated by the depth map because those bricks are either empty space or behind a surface and therefore not depicted in images from the image sensor.

In some embodiments, one or more criteria may be applied to efficiently select a set of bricks for processing. An initial set of bricks may be limited to those within a frustum of an image sensor. A great number of bricks outside the frustum may then be culled. More computer-resource intense processing to update the 3D reconstruction may then be performed on the subset of bricks accepted for processing following the culling. Accordingly, a 3D representation of the scene to be updated is more efficiently computed using processing on a reduced number of voxels.

An even greater reduction in processing may be achieved by culling bricks based on the depth image. In accordance with some embodiments, culling and/or acceptance of bricks may be performed by projecting a silhouette of each brick in the initial set into the depth image. Such culling may be based on whether the brick corresponds to a portion of the scene that the depth image indicates is in the vicinity of a surface. Bricks that can be simply identified as entirely in front of or entirely behind a surface may be culled, In some embodiments, such a determination may be efficiently made. For example, a bounding box around the projection of the brick into the depth map may be used to determine a maximum brick value and a minimum brick value along a z-coordinate direction, which may be substantially perpendicular to a 2D plane of the depth image. By comparing these maximum and minimum brick values to the distances represented by pixels in the depth map, bricks may be culled and/or accepted for further processing. Such processing may result in selection of bricks for initial processing that intersect with surfaces, as reflected in the depth image, and/or that are in front of a surface, as reflected in the depth image. In some embodiments, such processing may differentiate between bricks that are in front of solid surfaces and those that are in front of holey surfaces (i.e. bricks representing regions for which the depth sensor was unable to reliably measure a distance to a surface).

In some embodiments, the culling/acceptance criteria may result in classifying some or all of the bricks accepted for further processing such that processing algorithms for the computationally volumetric reconstruction may be tailored for the characteristics of the brick. In some embodiments, different processing may be selected based on whether the brick is classified as intersecting a surface, being in front of a solid surface or being in front of a holey surface.

Figure 9:
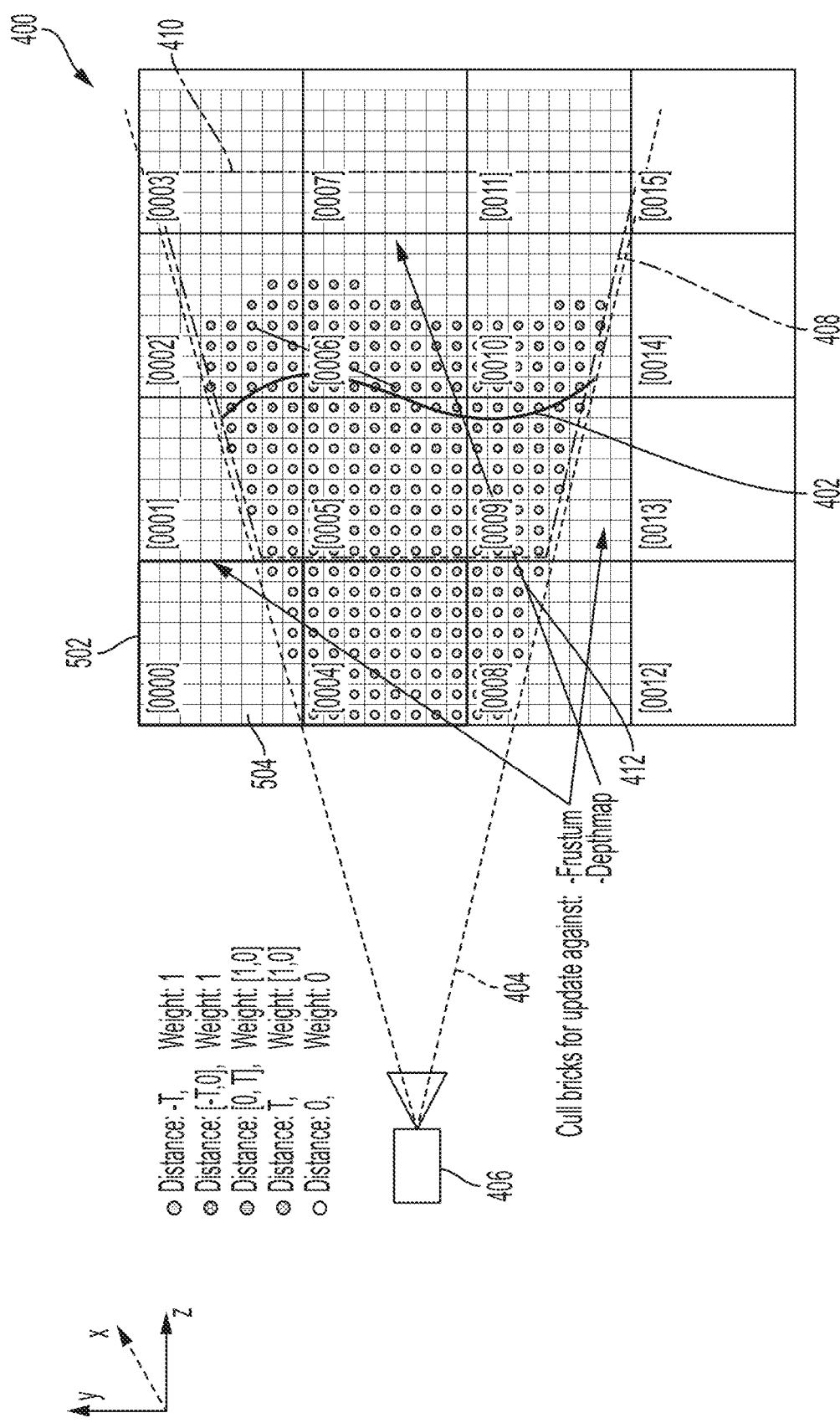
FIG. 9 is a schematic diagram illustrating a scene represented by bricks comprising voxels, a surface in the scene, and a depth sensor capturing the surface in a depth image, according to some embodiments.

FIG. 9 shows a cross-sectional view of a scene 400 along a plane parallel to y-coordinate and z-coordinate. An XR system may represent the scene 400 by a grid of voxels 504. Conventional XR systems may update each voxel of the grid of voxels based on every new depth image captured by a sensor 406, which may be an image sensor or depth sensor, such that a 3D reconstruction generated from the grid of voxels can reflect changes in the scene. Updating in this fashion may consume significant computing resources and also cause artifacts at the output of an XR system due to, for example, time latency caused by heavy computing.

Described herein are techniques of providing accurate 3D reconstructed data with low usage of computational resources, for example, by culling parts of the grid of voxels 504 based at last in part on a camera frustum 404 of an image sensor 406 and/or depth image captured by the image sensor.

In the illustrated example, the image sensor 406 captures a depth image (not shown) including a surface 402 of the scene 400. The depth image may be stored in computer memory in any convenient way that captures distance between some reference point and surfaces in the scene 400. In some embodiments, the depth image may be represented as values in a plane parallel to an x-axis and y-axis, as illustrated in FIG. 9, with the reference point being the origin of the coordinate system. Locations in the X-Y plane may correspond to directions relative to the reference point and values at those pixel locations may indicate distance from the reference point to the nearest surface in the direction indicated by the coordinate in the plane. Such a depth image may include a grid of pixels (not shown) in the plane parallel to the x-axis and y-axis. Each pixel may indicate a distance, in a particular direction, from the image sensor 406 to the surface 402. In some embodiments, a depth sensor may be unable to measure a distance to a surface in a particular direction. Such a condition, for example, may result if the surface is out of range of the image sensor 406. In some embodiments, the depth sensor may be an active depth sensor, that measures distance based on reflected energy, but a surface may not reflect sufficient energy for an accurate measurement. Accordingly, in some embodiments, the depth image may have "holes," where there are pixels to which no value is assigned.

In some embodiments, the reference point of the depth image may change. Such a configuration may allow the depth image to represent surfaces throughout an entire 3D scene, not limited to the portions having a predetermined and limited range of angles with respect to a particular point of reference. In such embodiments, the depth image may indicate distance to surfaces as the image sensor 406 moves through six degree-of-freedom (6DOF). In these embodiments, the depth image may include a set of pixels for each of multiple reference points. In these embodiments, a portion of the depth image may be selected based on a "camera pose," representing the direction and/or orientation in which the image sensor 406 is pointing at the time image data is captured.

The image sensor 406 may have a field-of-view (FOV), which may be represented by the camera frustum 404. In some embodiments, the infinite camera frustum depicted may be reduced to a finite 3D trapezoidal prism 408 by assuming a maximum depth 410 that the image sensor 406 can provide, and/or a minimum depth 412 that the image sensor 406 can provide. The 3D trapezoidal prism 408 may be a convex polyhedron delimited by at six planes.

Figure 10B:
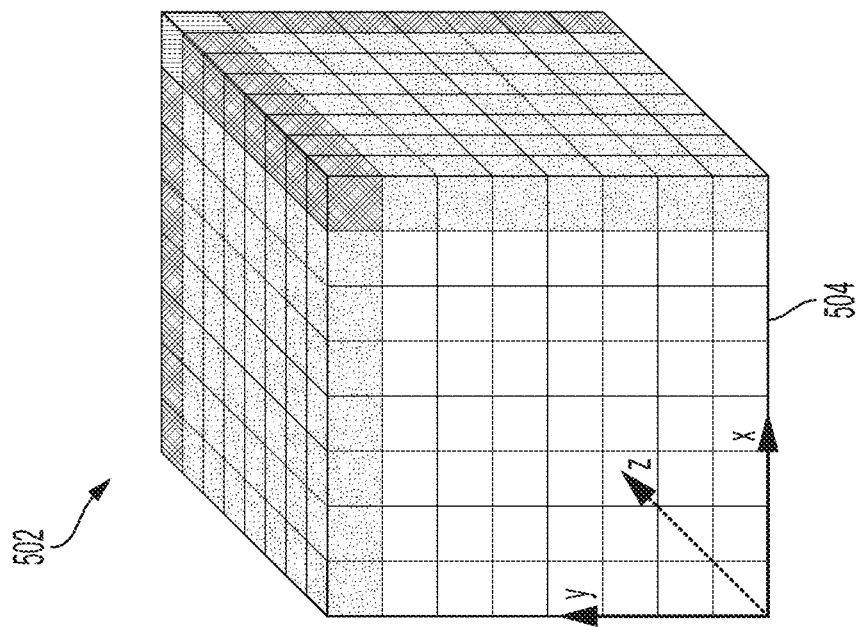
FIG. 10B is a schematic diagram illustrating a voxel grid in a brick of FIG. 10A.
Figure 10A:
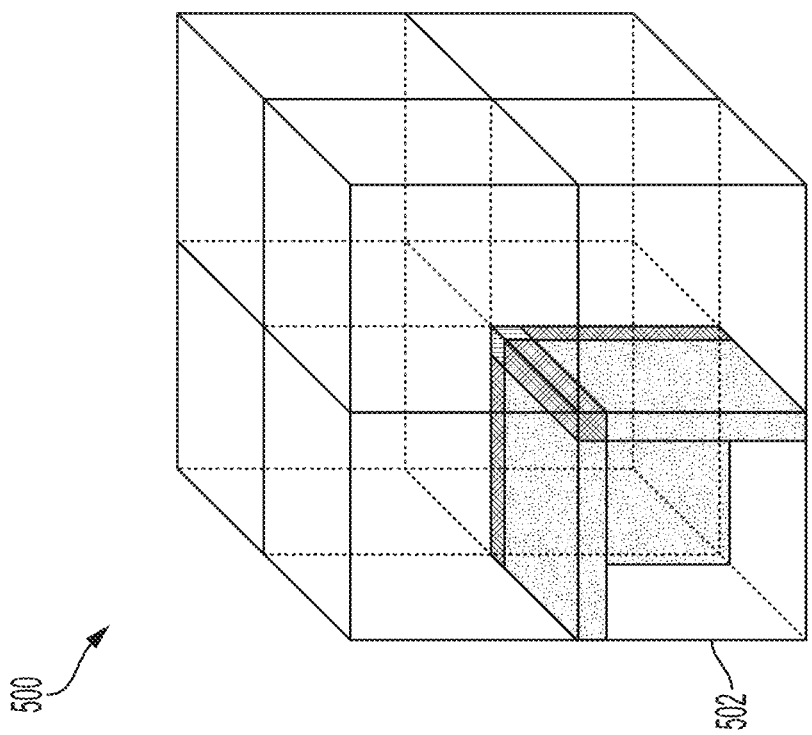
FIG. 10A is a schematic diagram illustrating a 3D space represented by eight bricks.

In some embodiments, one or more voxels 504 may be grouped into a brick 502. FIG. 10A illustrates a portion 500 of the scene 400, which includes eight bricks 502. FIG. 10B illustrates an exemplary brick 502 comprising $8^3$ voxels 504. Referring back to FIG. 9, the scene 400 may include one or more bricks, sixteen of which are illustrated in the view depicted in FIG. 4. Each brick may be identifiable by a brick identity, for example, [0000]-[0015].

Figure 11:
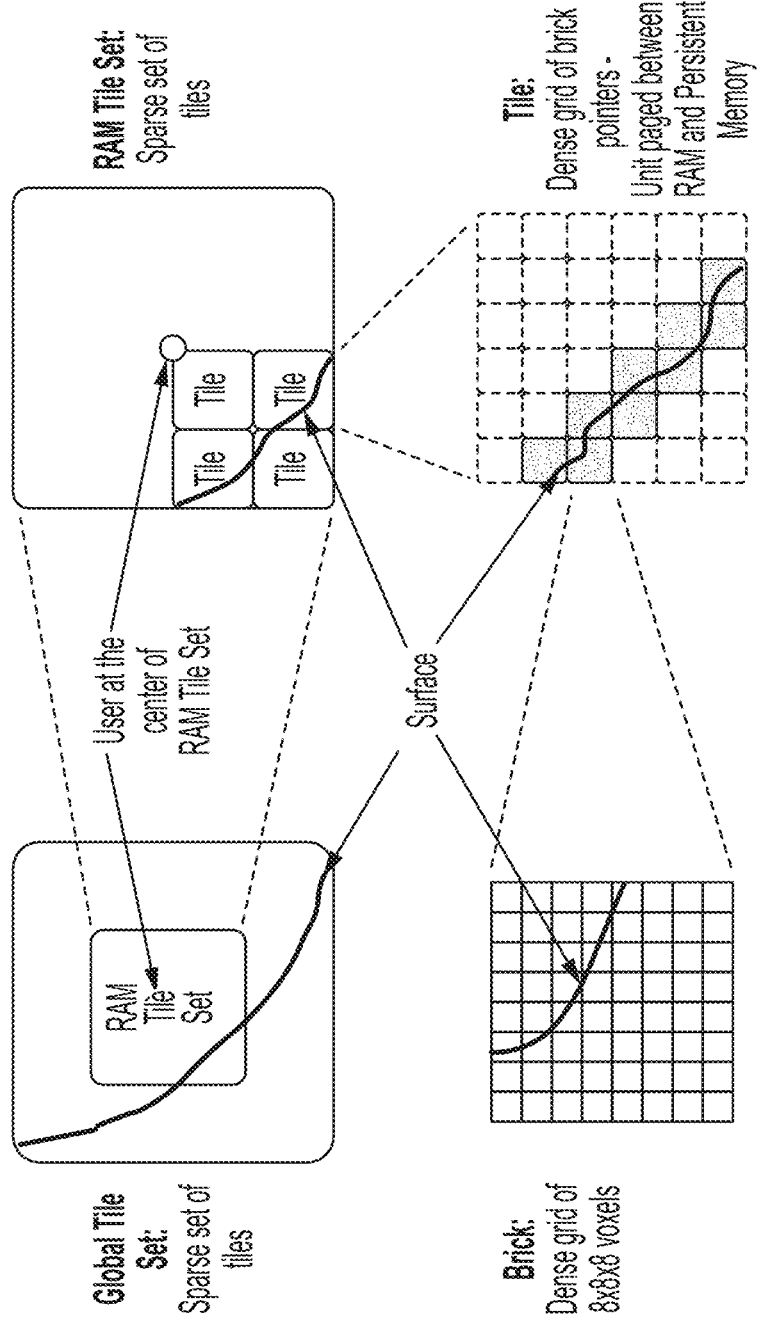
FIG. 11 is a schematic diagram illustrating a volumetric representation hierarchy, according to some embodiments.

FIG. 11 depicts a volumetric representation hierarchy, which may be implemented in some embodiments. In some embodiments, such volumetric representation hierarchy may reduce latency for data transferring. In some embodiments, a voxel grid of a physical world may be mapped to conform to a structure of a storage architecture for a processor computing AR content, such as the processor on which component 304 executes. One or more voxels may be grouped into a "brick." One or more bricks may be grouped into a "tile." The size of a tile may correspond to a memory page of the storage medium that is local to the processor. Tiles may be moved between the local memory to remote memory, such as over a wireless connection, based on usage or anticipated usage in accordance with a memory management algorithm.

In some embodiments, the uploading and/or downloading between the perception module 160 and the persisted world module 162 may be performed on multiples of tiles in one operation. One or more tiles may be grouped into a "RAM tile set." The size of a RAM tile set may correspond to regions within a reconstruction range of a sensor worn by a user. One or more RAM tile sets may be grouped into a "global tile set." The size of a global tile set may correspond to a perception range of a world reconstruction system (e.g., the perception range for the Perception module 160).

Figure 12:
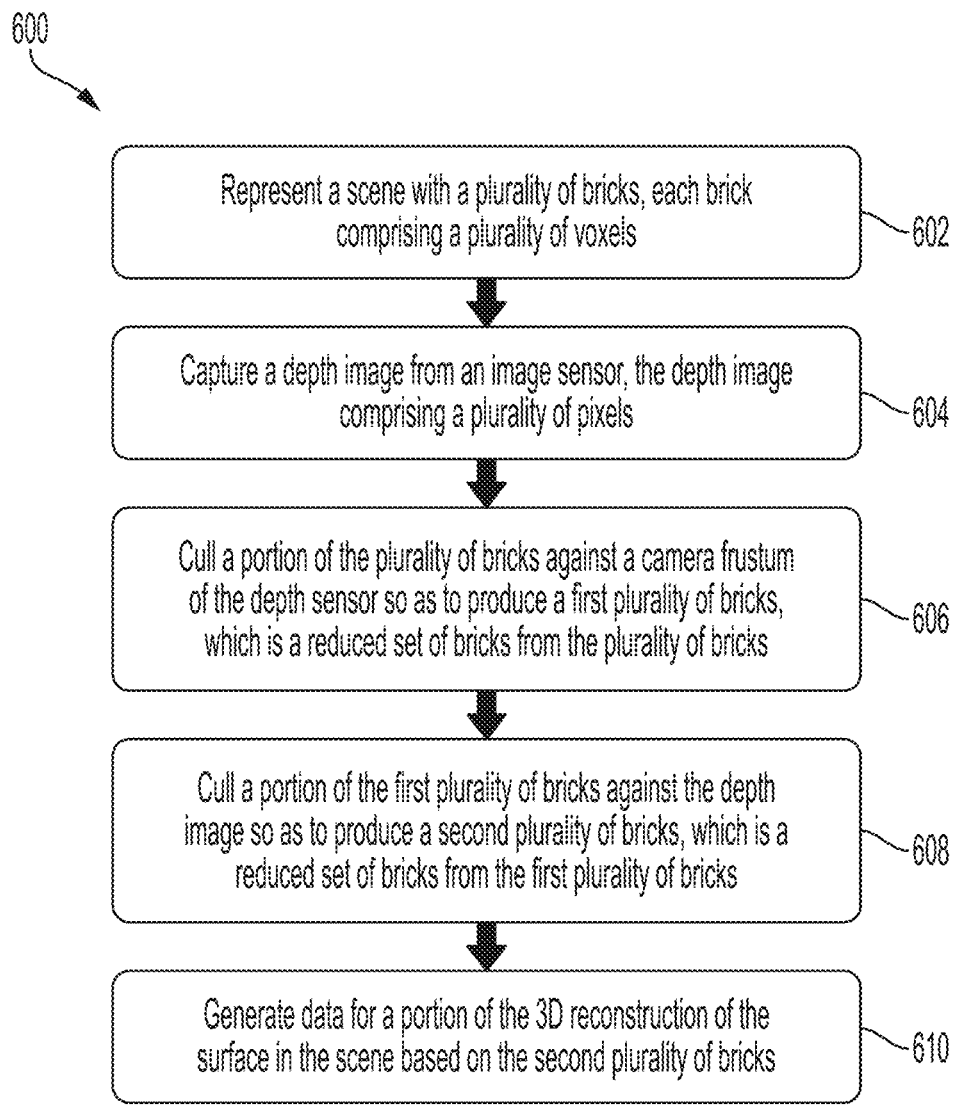
FIG. 12 is a flow chart, illustrating a method of operating a computing system to generate a 3D reconstruction of a scene, according to some embodiments.

FIG. 12 is a flow chart, illustrating a method 600 of operating a computing system to generate a 3D reconstruction of a scene, according to some embodiments. The method 600 may start with representing a scene (e.g., the scene 400) with one or more bricks (e.g., the brick 502), each brick including one or more voxels (e.g., the voxel 504). Each brick may represent a portion of the scene. The bricks may be identifiable relative to a persistent coordinate system such that, even as a pose of an image sensor (e.g., the image sensor 406) changes, the same bricks represent the same volume in the scene.

At act 604, the method 600 may capture a depth image (e.g., the depth image including the surface 402) from a depth sensor (e.g., the depth sensor 406). The depth sensor may be an active depth sensor, transmitting, for example, IR radiation and measuring time of flight for a reflection. Each such measurement represents distance to a surface from the depth sensor in a particular direction. That depth information may represent the same volume as is represented by the bricks.

At act 606, the method 600 may cull a portion of the one or more bricks against a camera frustum (e.g., the finite 3D trapezoidal prism 408 derived from the camera frustum 404) so as to produce a first one or more bricks, which is a reduced set of bricks from the one or more bricks. Such culling may eliminate bricks representing portions of the scene outside the field of view of the image sensor at the time image data being processed was acquired. That image data, therefore, is unlikely to contain information useful in creating or updating a brick.

At act 608, the method 600 may cull a portion of the first one or more bricks against the depth image so as to produce a second one or more bricks, which is a reduced set of bricks from the first one or more bricks. At act 610, the method 600 may generate a 3D reconstruction of the scene based on the second one or more bricks.

Referring back to FIG. 9, given the surface 402 captured by the depth image and the corresponding camera pose, voxels between the image sensor 406 and the surface 402 may be empty. The farther away a voxel is behind the surface 402 from the image sensor 406, it may be less certain that the voxel represents the inside of an object or empty space. The degree of certainty may be represented by weight function, which weighs voxel updates based on the distance to the surface 402. When a voxel lying behind the surface 402 (farther away from the image sensor 402) has a weight function above a threshold, the voxel may get no update or a zero update (e.g., an update with zero changes). Also, all voxels not falling into the camera frustum 404 may not be updated or investigated for this depth image.

The method 600 may not only improve processing speed of volumetric depth image fusion, but also consume less memory storage, which allows the method 600 to run on wearable hardware. For example, a small reconstruction volume of 5 m*5 m*3 m with 1 cm$^3$ voxel size and 8 bytes per voxel (4 bytes for the distance value and 4 bytes for the weight value) would already require about 600 MB. The method 600 can categorize bricks by their distance to a surface with respect to a truncated threshold. For example, the method 600 can identify empty bricks (e.g., the bricks that are culled, or the bricks that are away from the surface beyond the truncated threshold) so as to not allocate memory space for the empty bricks. The method 600 can also identify bricks that are away from the surface by the truncated threshold so as to store these bricks by a constant distance value of a negative truncation threshold and weight 1. The method 600 can also identify bricks that have a distance to the surface between zero and the truncated threshold so as to store these bricks with a constant SDF value of the positive truncation threshold, but varying weight. Storing the distance or weight values, which are constant for a brick with a single value, may be an entropy-based compression for a zero-entropy field.

The method 600 may allow flagging a brick during the voxel update as "does not contain any part of the surface," which can significantly speed up processing of a brick. That processing may include, for example, converting the image of the portion of the scene represented by a brick into a mesh.

Figure 13:
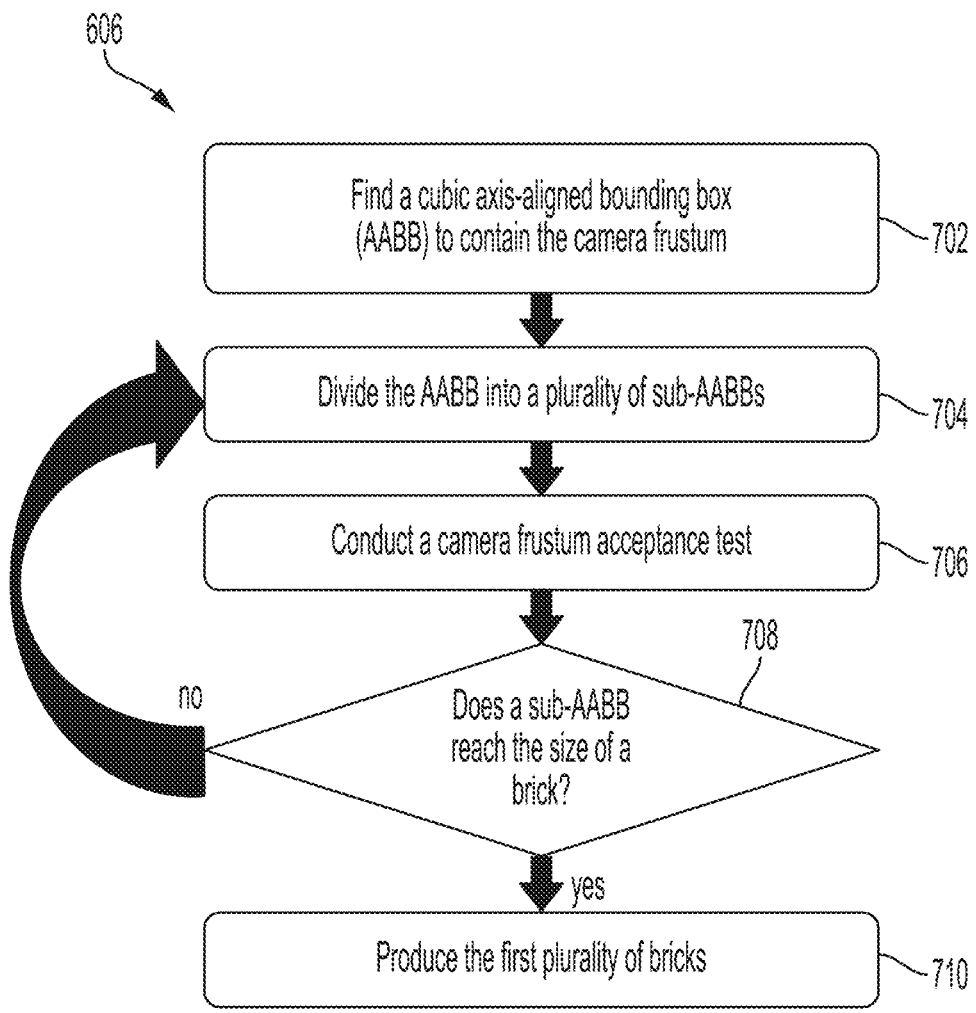
FIG. 13 is a flow chart, illustrating a method of culling a portion of the plurality of bricks against a camera frustum of the depth sensor in FIG. 12, according to some embodiments.

FIG. 13 shows an exemplary method 606 of culling a portion of the one or more bricks against the camera frustum 404 of the image sensor 406, according to some embodiments. The method 606 may start with finding a cubic axis-aligned bounding box (AABB) to contain the camera frustum 404. The AABB may contains one or more bricks in a scene. The method 606 may include dividing (act 704) the AABB into one or more sub-AABBs, and conducting (act 706) a camera frustum acceptance test. If the method 606 determines at act 708 that a sub-AABB reaches the size of a brick, the method 606 may produce (act 710) the first one or more bricks. If the method 606 determines at act 708 that a sub-AABB is larger than the size of a brick, the method 606 may repeat acts 704-708 until a sub-AABB reaches the size of a brick.

For example, given the 3D trapezoidal prism 408 corresponding to the camera frustum 404, an AABB may be found in constant time with a side length of a power of two that contains the 3D trapezoidal prism 408. The AABB may be divided into eight sub-AABBs. Each of the eight sub-AABBs may be tested for intersection with the camera frustum 404. When a sub-AABB is determined as not intersecting the camera frustum 404, bricks corresponding this sub-AABB may be culled. A culled brick may be rejected for further processing. When a sub-AABB is determined as intersecting the camera frustum 404, the sub-AABB may be further divided into eight sub-AABBs of the sub-AABB. Then each of the eight sub-AABBs of the sub-AABB may be tested for intersection with the camera frustum 404. The iteration of dividing and testing continues until a sub-AABB corresponds to a single brick. To determine whether a camera frustum 404 intersects an AABB, a two-step test may be conducted. First, it may be tested that whether at least one corner point of an AABB lies inside each of the planes delimiting the camera frustum 404. Second, it may be tested that whether every corner point of the camera frustum 404 lies inside the AABB such that some cases of AABBs, which do not intersect the camera frustum 404, but are incorrectly classified as partially inside (e.g., having only one corner point on an edge of the frustum), may be captured.

A desirable byproduct of this two-step test is that it may be known for each brick intersecting the camera frustum 404 whether it is completely or only partially inside the camera frustum 404. For the bricks completely inside the camera frustum 404, the test may be skipped for every voxel whether it lies inside the camera frustum 404 later at the individual voxel update.

Figure 14:
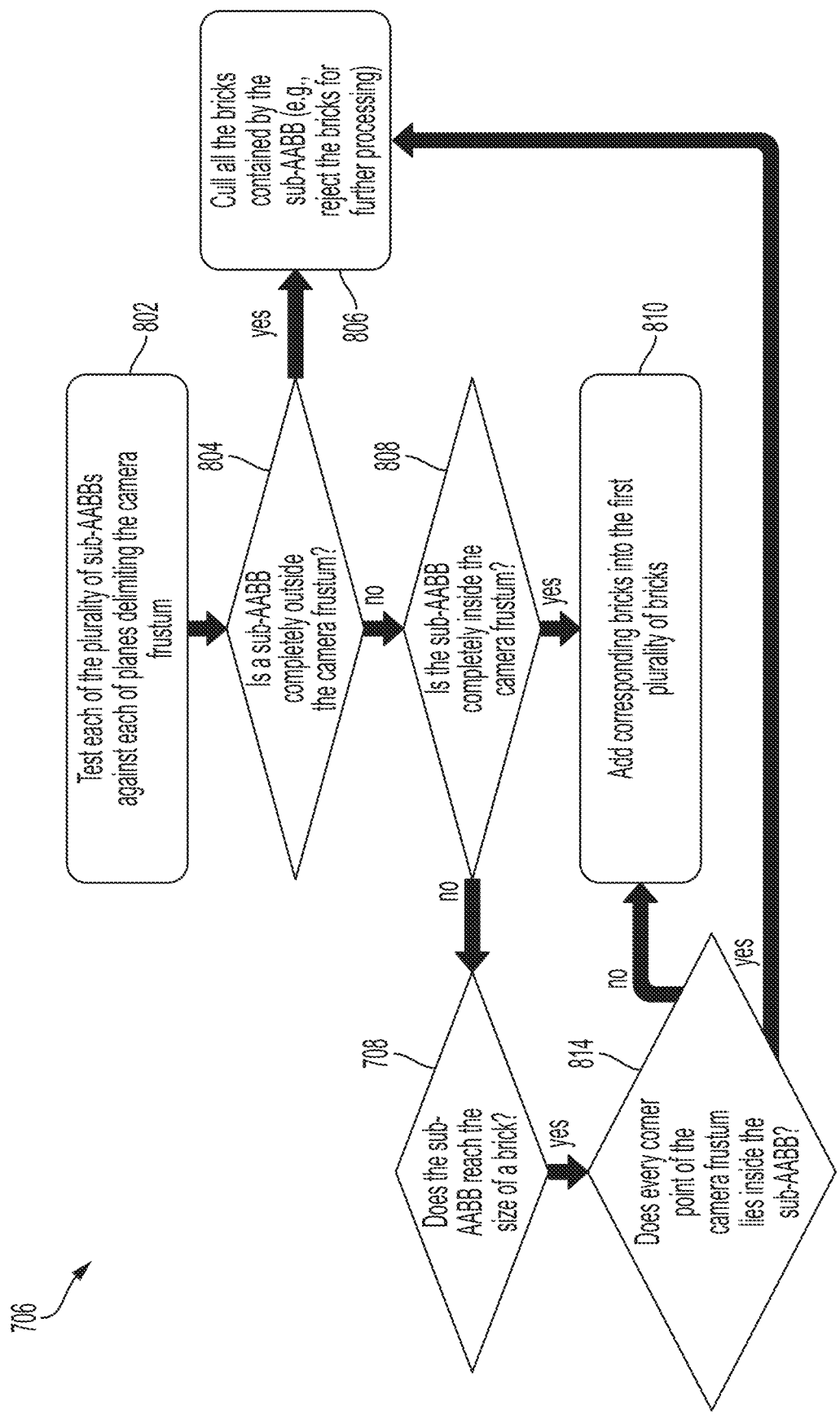
FIG. 14 is a flow chart, illustrating a method of conducting a camera frustum acceptance test in FIG. 13, according to some embodiments.

FIG. 14 shows an exemplary method 706 of conducting a camera frustum acceptance test, according to some embodiments. The method 706 may start by testing (act 802) each of the one or more sub-AABBs against each of planes delimiting the camera frustum 404. At act 804, the method 706 may determine whether the tested sub-AABB is completely outside the camera frustum 404. At act 806, if it is determined that the tested sub-AABB is completely outside the camera frustum 404, the method 706 may cull all the bricks contained by this tested sub-AABB. At act 808, if it is determined that the tested sub-AABB is not completely outside the camera frustum 404, the method 706 may determine whether the tested sub-AABB is completely inside the camera frustum 404.

At act 810, if it is determined that the tested sub-AABB is completely inside the camera frustum 404, the method 706 may add all the bricks contained by the tested sub-AABB into the first one or more bricks. At act 708, if it is determined that the tested sub-AABB is not completely inside the camera frustum 404, which may indicate the tested sub-AABB intersects with the camera frustum 404, the method 706 may determine whether the tested sub-AABB reaches the size of a brick.

At act 814, if it is determined that the tested sub-AABB equals to the size of a brick, the method 706 may further determine whether every corner point of the camera frustum 404 lies inside the tested sub-AABB. If it is determined that every corner point of the camera frustum 404 lies inside the brick of the tested sub-AABB, the method 706 may cull (act 806) the brick of the tested sub-AABB. If it is determined that not every corner point of the camera frustum lies inside the brick of the tested sub-AABB, the method 706 may add (act 810) the brick of the tested sub-AABB into the first one or more bricks.

Figure 15:
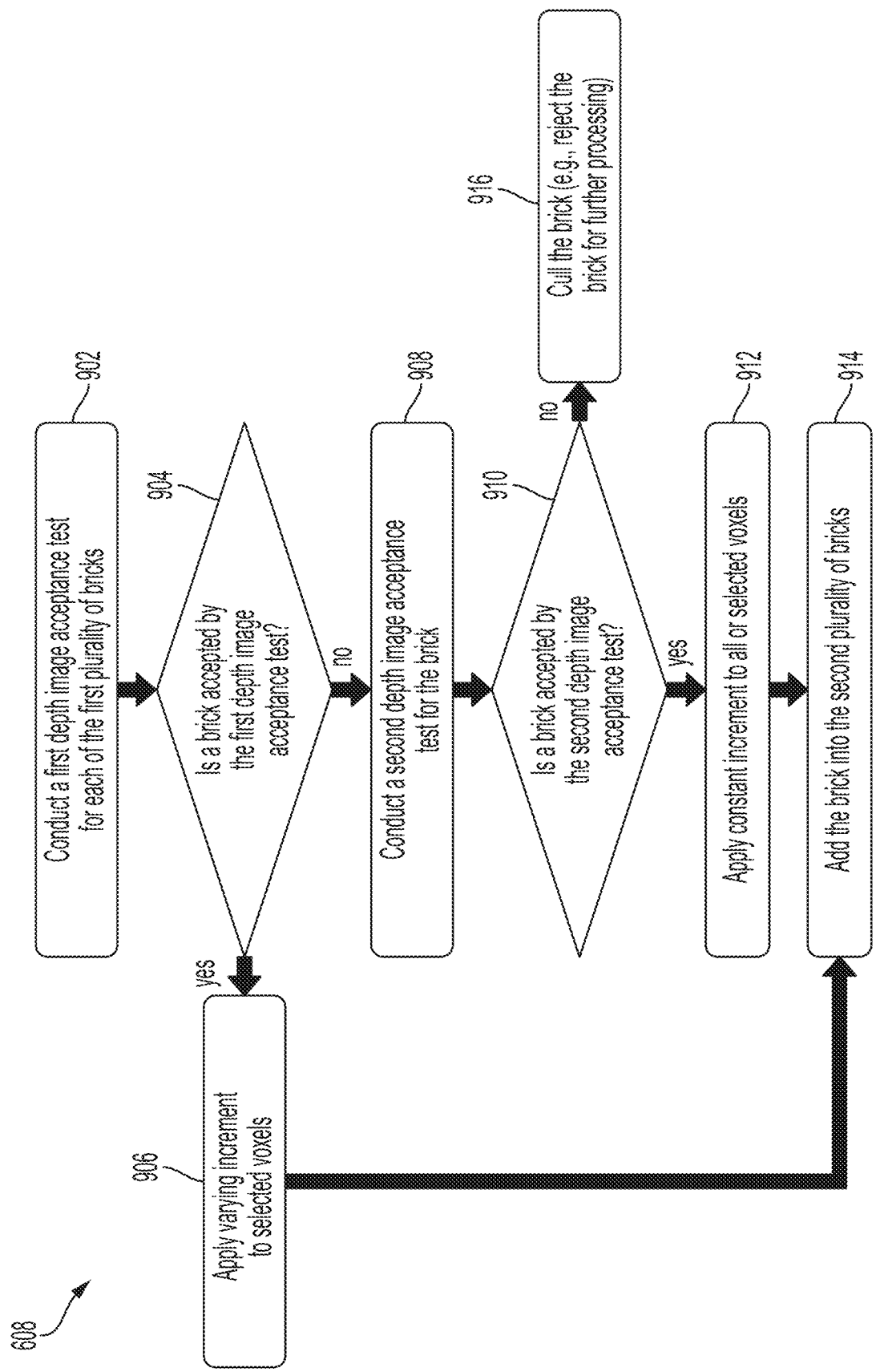
FIG. 15 is a flow chart, illustrating a method of culling a portion of the first plurality of bricks against the depth image in FIG. 12, according to some embodiments.

FIG. 15 shows an exemplary method 608 of culling a portion of the first one or more bricks against a depth image, according to some embodiments. The method 608 may start by conducting (act 902) a first depth image acceptance test for each of the first one or more bricks. At act 904, the method 808 may determine whether a tested brick accepted by the first depth image acceptance test. If it is determined that the tested brick is accepted by the first depth image acceptance test, which may indicate the tested brick intersects with a surface in a scene, the method 608 may apply (act 906) varying increment to selected voxels, and add (act 914) the tested brick into the second one or more bricks.

At act 908, if it is determined that the tested brick is not accepted by the first depth image acceptance test, the method 608 may conduct (act 908) a second depth image acceptance test for the tested brick. At act 910, it is determined whether the tested brick is accepted by the second depth image acceptance test. If it is determined that the tested brick is accepted by the second depth image acceptance test, which may indicate the tested brick is in front of a solid or holey background in the scene, the method 608 may apply (act 912) constant increment to all or selected voxels, and add (act 914) the tested brick into the second one or more bricks. If it is determined that the tested brick is not accepted by the second depth image acceptance test either, the method 608 may cull (act 916) the tested brick.

Figure 16:
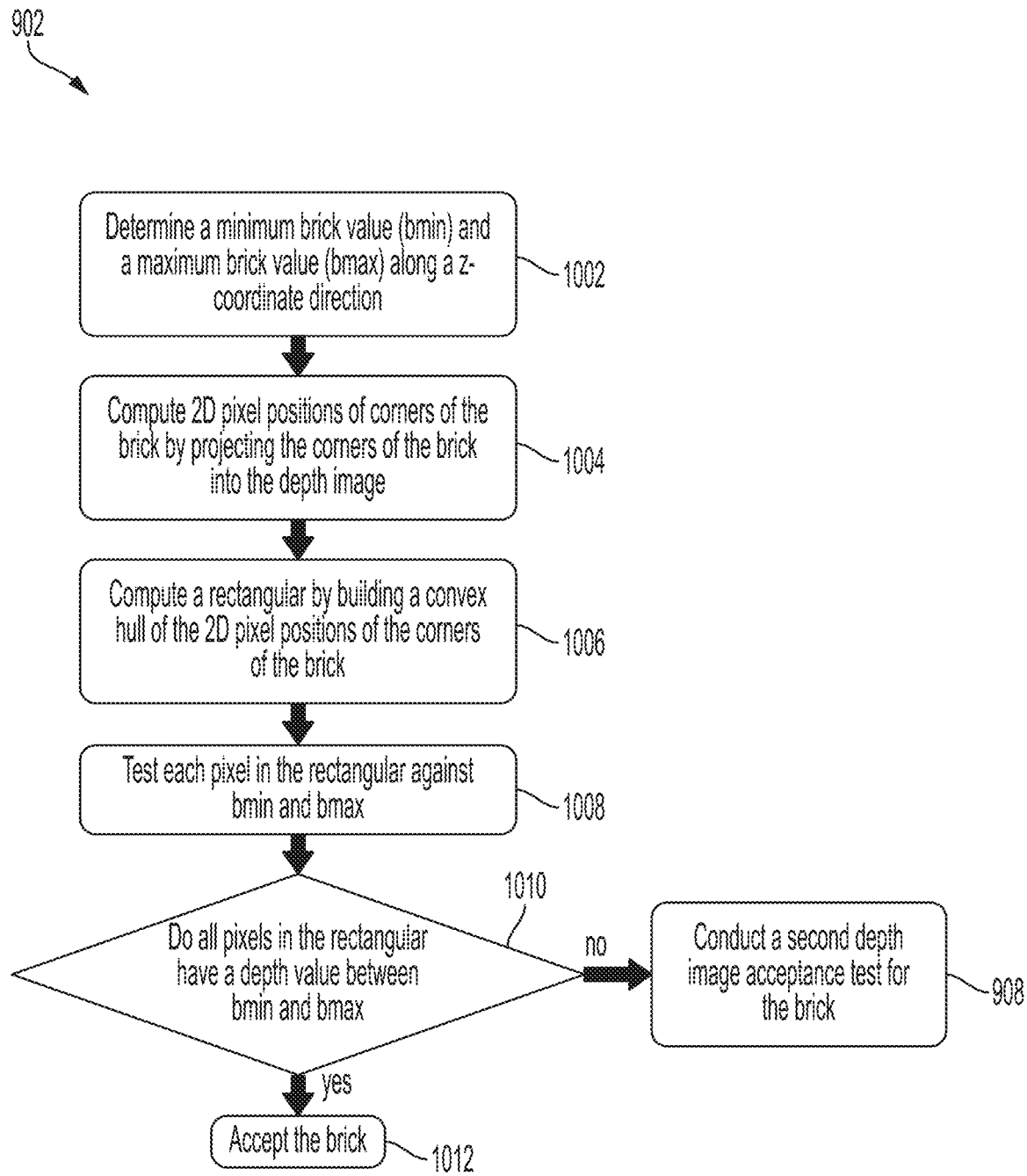
FIG. 16 is a flow chart, illustrating a method of conducting a first depth image acceptance test in FIG. 15, according to some embodiments.

FIG. 16 shows an exemplary method 902 of conducting a first depth image acceptance test, according to some embodiments. For each brick to be tested, the method 902 may start by determining (act 1002) a minimum brick value (bmin) and a maximum brick value (bmax) along a direction parallel to the z-coordinate. The bmin value and bmax value may be padded to account for an integration threshold, depth values beyond which indicate constant updates to voxels in a brick. At act 1004, the method 902 may compute 2D pixel positions of corners of the tested brick by projecting the corners of the brick into the depth image. At act 1006, the method 902 may compute a rectangle by building a convex hull of the 2D pixel positions of the corners of the brick. At act 1008, the method 902 may test each pixel in the rectangle against the bmin value and the bmax value. At act 1010, the method 902 may determine whether all pixels in the rectangle have a depth value between the bmin value and the bmax value. If it is determined that all the pixels in the rectangle have a depth value between the bmin value and the bmax value, the method 902 may accept (act 1012) the brick. If it is determined that not all the pixels in the rectangle have a depth value between the bmin value and the bmax value, the method 902 may conduct (act 908) a second depth image acceptance test for the brick.

Figure 17:
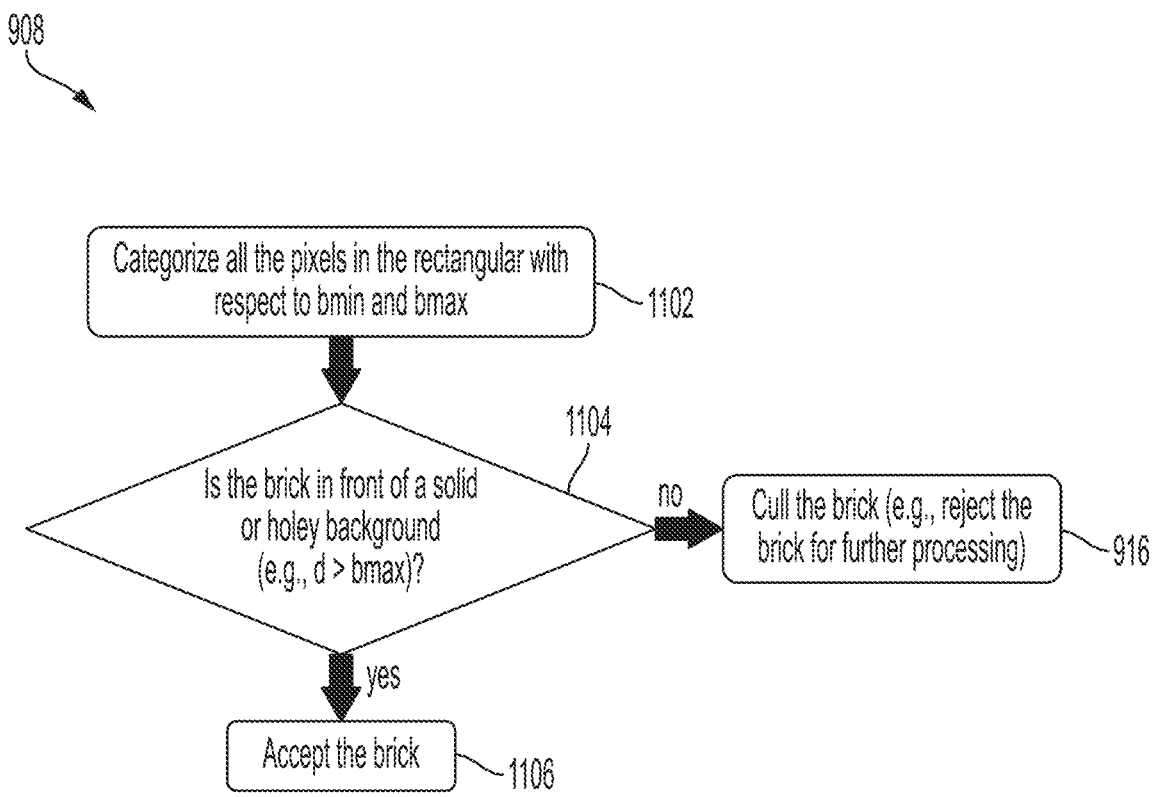
FIG. 17 is a flow chart, illustrating a method of conducting a second depth image acceptance test in FIG. 15, according to some embodiments.

FIG. 17 shows an exemplary method 908 of conducting a second depth image acceptance test, according to some embodiments. The method 908 may start at act 1102 by categorizing all the pixels in the rectangle with respect to the bmin value and the bmax value. At act 1104, the method 908 may determine whether the tested brick is in front of a solid or holey background, for example, by using a table shown in FIG. 18. If it is determined that the tested brick is in front of a solid or holey background, the method 908 may accept (act 1106) the brick. If it is determined that the tested brick is not in front of a solid or holey background, at act 916 the method 908 may cull the brick.

Figure 19A:
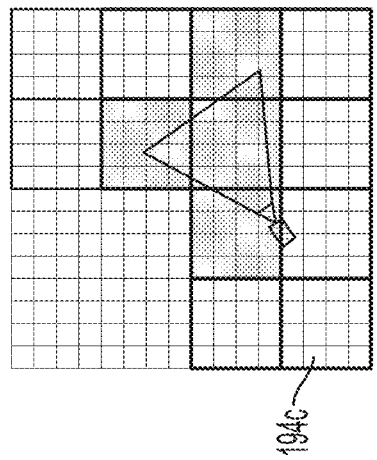
FIGS. 19A-F are schematic diagrams illustrating culling bricks against a camera frustum, according to some embodiments.
Figure 19B:
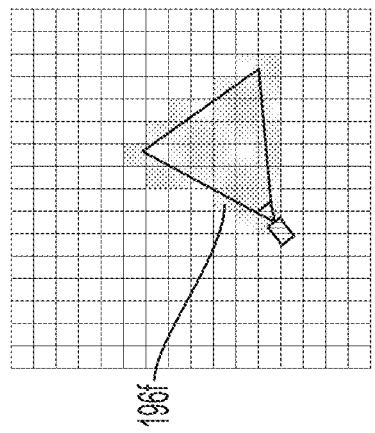
Figure 19C:
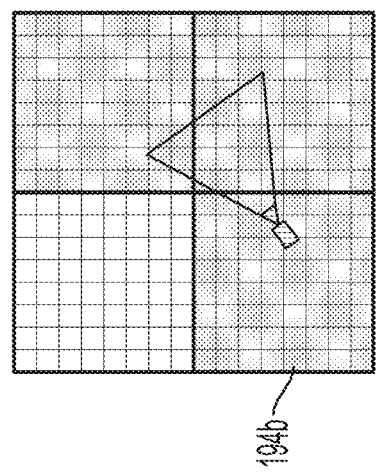
Figure 19D:
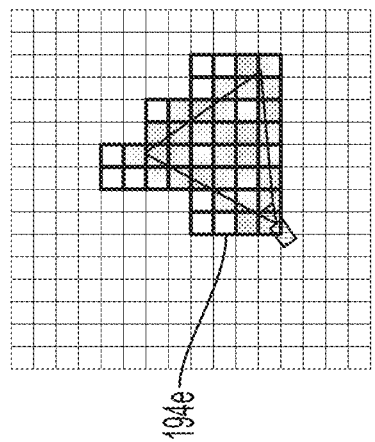
Figure 19E:
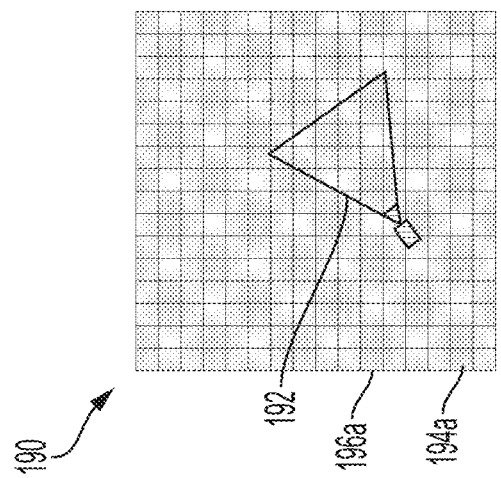
Figure 19F:
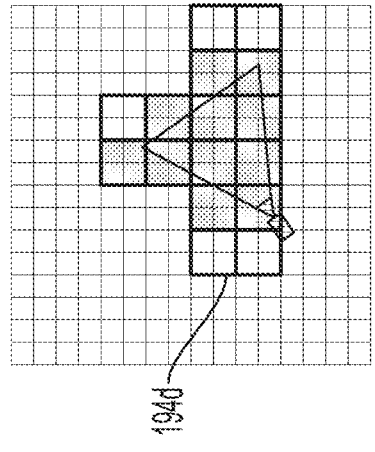

FIGS. 19A-F depict an example of culling bricks representing a scene 190 against a camera frustum 192. In FIG. 19A, the scene 190 is represented by a single AABB 194a, which includes 16×16 bricks in the illustrated example. In FIG. 19B, the single AABB 194a is divided into four sub-AABBs 194b, each of which includes 8×8 bricks. After conducting a camera frustum acceptance test (e.g., the method 706), one of the four sub-AABBs 194b failed camera frustum acceptance test and thus the 8×8 bricks in the failed sub-AABB 194b are culled and illustrated as white bricks. In FIG. 19C, each of the three sub-AABBs 194 that passed the camera frustum acceptance test is further divided into four sub-AABBs 194c, each of which includes 4×4 bricks. After conducting a camera frustum acceptance test (e.g., method 706), eight of the sixteen sub-AABBs 194c failed the camera frustum acceptance test and thus the bricks in the failed sub-AABBs 194c are culled and illustrated as white bricks. Similarly, in FIG. 19D, a sub-AABB 194d includes 2×2 bricks. In FIG. 19E, a sub-AABB 194e includes a single brick and thus the sub-AABBs 194e that passed the camera frustum test and respective bricks are produced as the first plurality of bricks and illustrated as grey bricks 196f in FIG. 19F. In the illustrated example, if no culling is performed, a world reconstruction component would compute all of the 256 bricks. With the brick culling against the camera frustum, a world reconstruction component only needs to compute the first plurality of bricks, i.e. 34 bricks, and thus would render a result much faster.

Figure 20B:
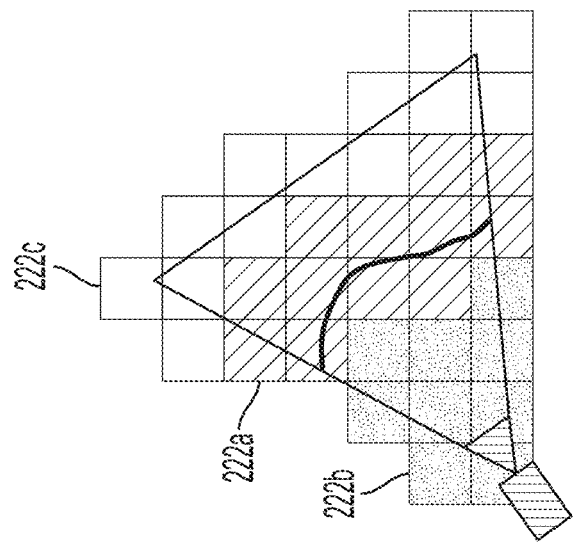
FIGS. 20A-B are schematic diagrams illustrating culling bricks against a depth image including a surface, according to some embodiments.
Figure 20A:
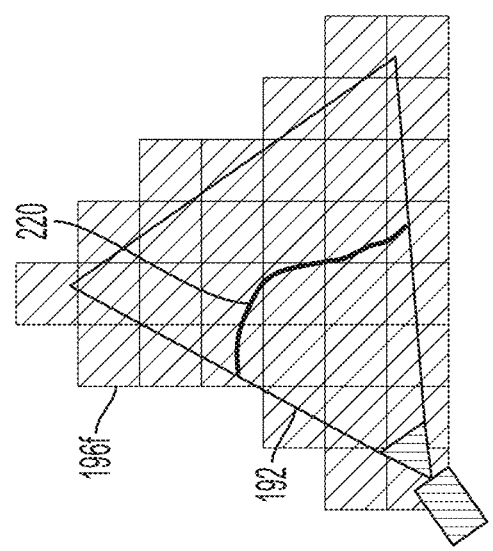

FIG. 20A depicts an example of further culling the 34 bricks 196f against a depth image including a surface 220 by conducting, for example, the method 608. FIG. 20B depicts the result of culling against the depth image, showing that 12 bricks 222a of the 34 bricks 196f passed the first depth image acceptance test (e.g., the method 904), 9 bricks 222b of the 34 bricks 196f passed the second depth image acceptance test (e.g., the method 910), and finally 13 bricks 222c of the 34 bricks 196f are culled after culling against the depth image comprising the surface 220. As a result, in the illustrated example, with the brick culling against the depth image, the number of bricks computed by a world reconstruction component is further reduced to 21 bricks. It also should be appreciated that computing speed of a would reconstruction component may be accelerated not only by the reduced number of bricks but also by the classification of the bricks as a result of the first and second depth image acceptance tests. For example, as discussed with respect to FIG. 15, a constant increment may be applied to the 9 bricks 222b that failed the first depth image acceptance test but passed the second depth image acceptance test. Applying the constant increment in bulk may further improve computing speed compared to applying varying increment to each voxel. Geometries (e.g., planes) in a scene may be obtained in XR systems to support applications, for example, a wall to place a virtual screen, and/or a floor to navigate a virtual robot. A common representation of a scene's geometry is a mesh, which may comprise groups of connected triangles having vertices and edges. Conventionally, a geometry in a scene is obtained by generating a mesh for the scene and searching the geometry in the mesh, which takes time to process, e.g., a few seconds, and doesn't indicate relationships among geometries requested by different queries. For example, a first query may be for a table plane. In response to the first query, a system may find a table plane and leave a watch on the table plane. Then a second query may be for a watch. In response to the second query, a system may find all possible table planes and check whether there is a watch on the each table plane until it finds the watch because there is no indication whether a table plane is the table plane from the response to the first query.

Described herein is a geometry extraction system. In some embodiments, a geometry extraction system may extract geometries while scanning a scene with cameras and/or sensors, which allows a fast, efficient extraction that can accommodate dynamic environment changes. In some embodiments, a geometry extraction system may persist extracted geometries in local and/or remote memories. The persisted geometries may be with unique identifications such that different queries, for example, at different timestamps and/or from different applications, can share the persisted geometries. In some embodiments, a geometry extraction system may support different representations of a geometry according to individual queries. Planes are used as an exemplary geometry in the following descriptions of FIGS. 21-29. It should be appreciated that a geometry extraction system may detect other geometries to use in subsequent processing instead of or in addition to planes, including, for example, cylinders, cubes, lines, corners, or semantics such as glass surfaces or holes. In some embodiments, the principles described herein with respect to geometry extraction may be applicable to object extraction and the like.

Figure 21:
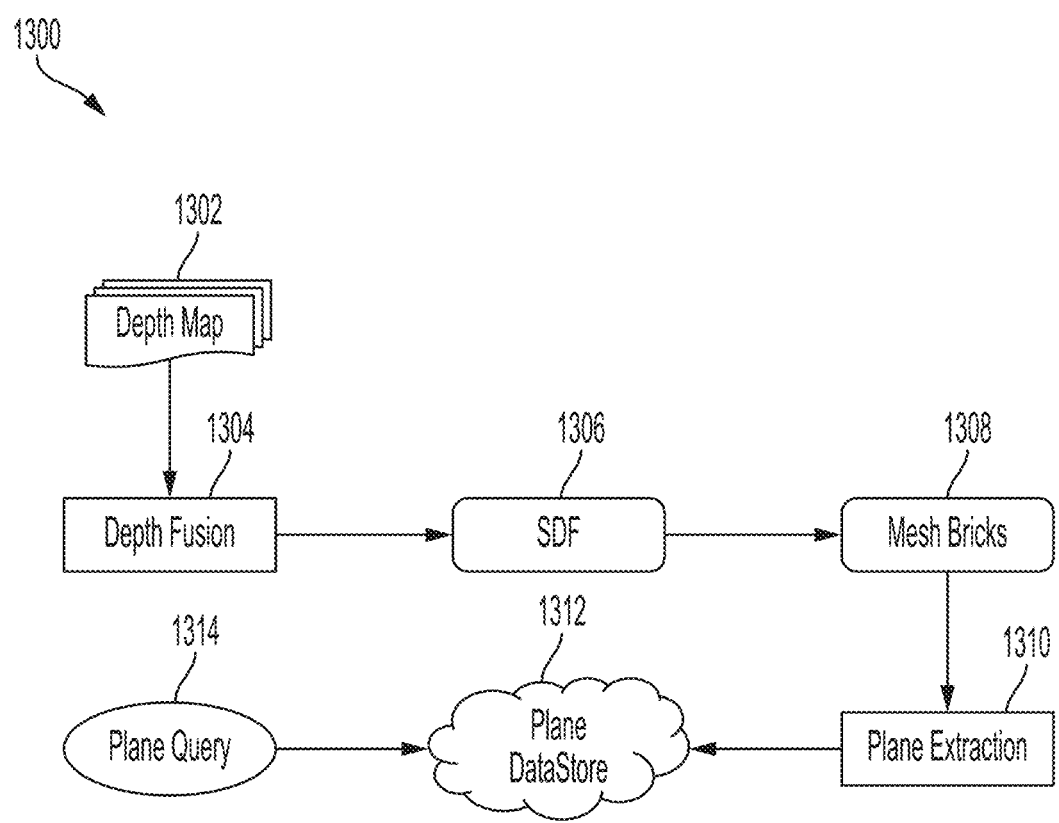
FIG. 21 is a schematic diagram illustrating a plane extraction system, according to some embodiments.

FIG. 21 shows a plane extraction system 1300, according to some embodiments. The plane extraction system 1300 may include depth fusion 1304, which may receive multiple depth maps 1302. The multiple depth maps 1302 may be created by one or more users wearing depth sensors, and/or downloaded from local/remote memories. The multiple depth maps 1302 may represent multiple views of a same surface. There may be differences between the multiple depth maps, which may be reconciled by the depth fusion 1304.

In some embodiments, the depth fusion 1304 may generate SDFs 1306 based, at least in part, on the method 600. Mesh bricks 1308 may be extracted from the SDFs 1306 by, for example, applying a marching cube algorithm over corresponding bricks (e.g., bricks [0000]-[0015] in FIG. 23). Plane extraction 1310 may detect planar surfaces in the mesh bricks 1308 and extract planes based at least in part on the mesh bricks 1308. The plane extraction 1310 may also extract surfels for each brick based, at least in part, on corresponding mesh bricks. Surfels may include vertices in a mesh but not the edges connecting neighboring vertices such that storing surfels consumes less memory space than a mesh. A plane data store 1312 may persist the extracted planes and surfels.

In some embodiments, XR applications may request and obtain planes from the plane data store 1312 by plane query 1314, which may be sent by application programming interfaces (APIs). For example, an application may send to a plane extraction system 1300 information about its position, and ask for all planes near it (e.g., within five meters radius). The plane extraction system 1300 may then searches its plane data store 1312, and send the selected planes to the application. The plane query 1314 may include information such as where the application needs a plane, what kind of plane the application needs, and/or how the plane should look like (e.g., horizontal or vertical or angled, which may be determined by checking primitive normals of the planes in the plane data store).

Figure 22:
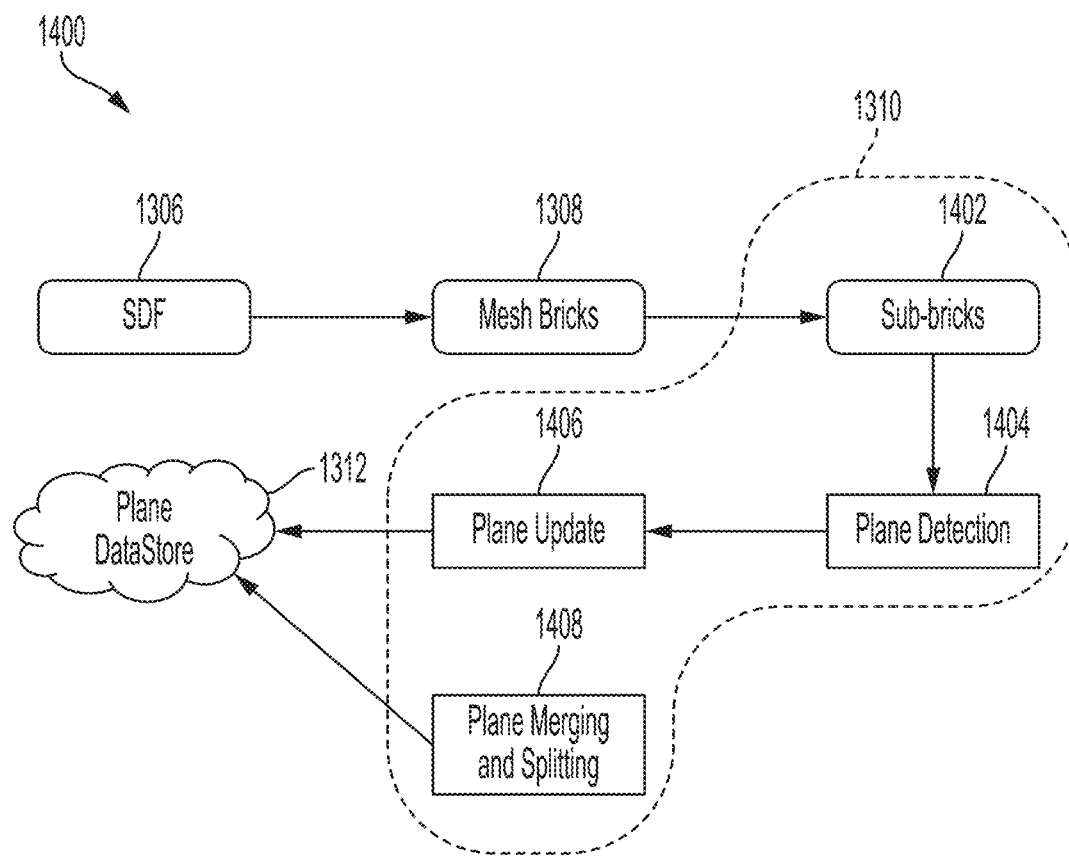
FIG. 22 is a schematic diagram illustrating portions of the plane extraction system of FIG. 21 with details on Plane Extraction, according to some embodiments.

FIG. 22 shows portions 1400 of the plane extraction system 1300, illustrating details on plane extraction 1310, according to some embodiments. The plane extraction 1310 may include dividing each of the mesh bricks 1308 into sub-bricks 1402. Plane detection 1404 may be conducted for each of the sub-bricks 1402. For example, plane detection 1404 may compare primitive normals of each mesh triangle in a sub-brick; merge those mesh triangles, with primitive normal differences smaller than a predetermined threshold value, into one mesh triangle; and identify a mesh triangle with an area larger than a predetermined area value as a plane.

Figure 23:
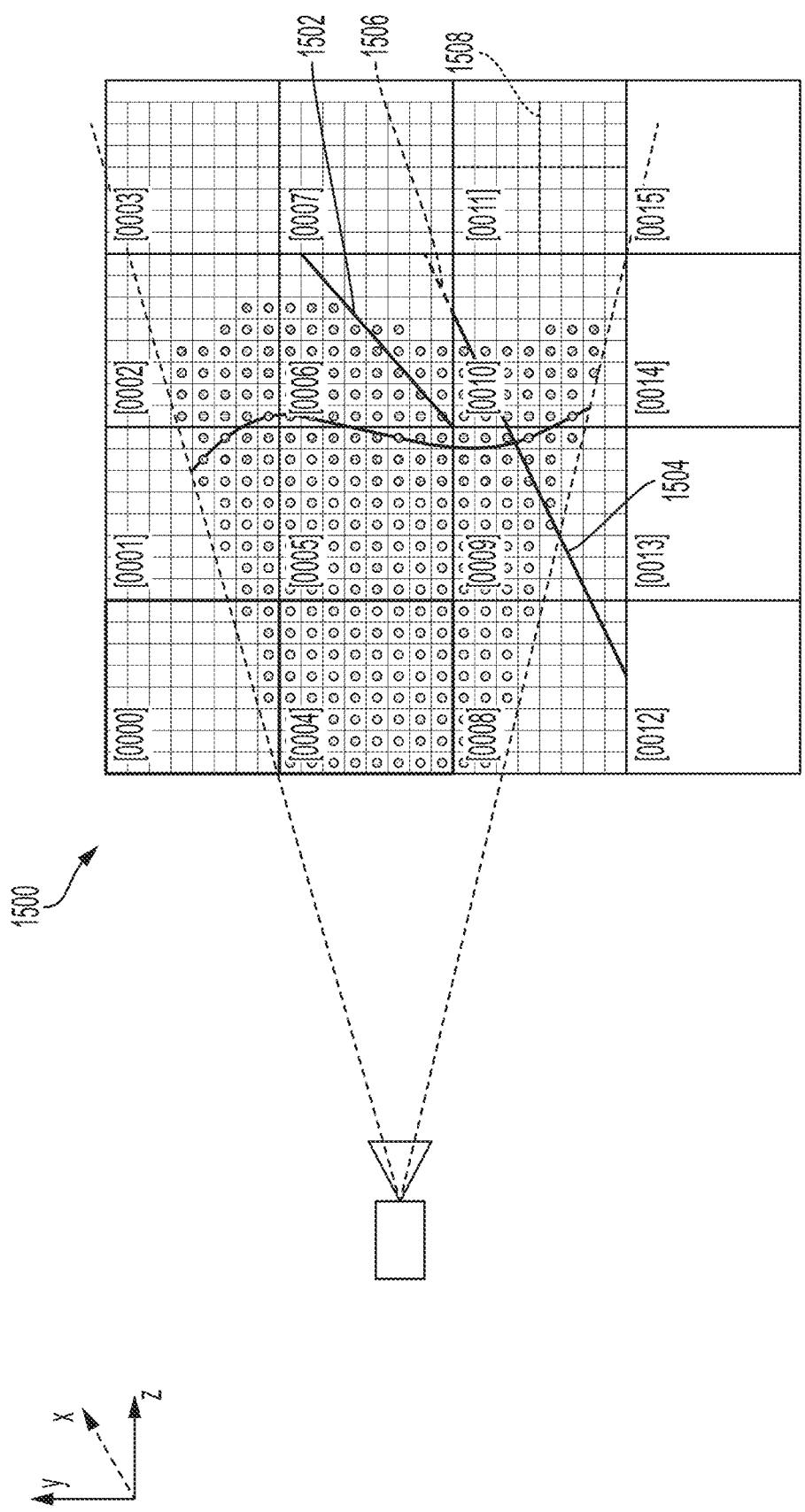
FIG. 23 is a schematic diagram illustrating a scene represented by bricks comprising voxels, and exemplary plane data in the scene, according to some embodiments.

FIG. 23 is a schematic diagram illustrating a scene 1500 represented by bricks [0000]-[0015] including voxels, and exemplary plane data including a brick plane 1502, global plane 1504, and surfel 1506 in the scene, according to some embodiments. FIG. 23 illustrates a brick [0011] being divided into four sub-brick 1508. It should be appreciated that a mesh brick may be divided into any suitable number of sub-bricks. The granularity of a plane detected by plane detection 1404 may be determined by the size of a sub-brick, while the size of a brick may be determined by the granularity of local/remote memories that stores the volumetric 3D reconstruction data.

Referring back to FIG. 22, the plane detection 1404 may determine a brick plane (e.g., brick plane 1502) for each mesh brick based, at least in part, on the detected planes for each sub-bricks in the mesh brick. The plane detection 1404 may also determine global planes that extend more than one bricks (e.g., global plane 1504).

In some embodiments, the plane extraction 1310 may include plane update 1406, which may update existing brick planes and/or global planes stored in the plane data store 1312 based, at least in part, on the planes detected by plane detection 1404. The plane update 1406 may include adding additional brick planes, removing some of the existing brick planes, and/or replacing some of the existing brick planes with brick planes detected by the plane detection 1404 and corresponding to the same bricks such that real-time changes in the scene are persisted in the plane data store 1312. The plane update 1406 may also include aggregating a brick plane detected by the plane detection 1404 to an existing global plane, for example, when a brick plane is detected adjacent to an existing global plane.

In some embodiments, plane extraction 1310 may further include plane merging and splitting 1408. The plane merging may merge multiple global planes into one big global plane, for example, when a brick plane is added and connects two global planes. Plane splitting may split one global plane into multiple global planes, for example, when a brick plane in the middle of a global plane is removed.

Figure 24:
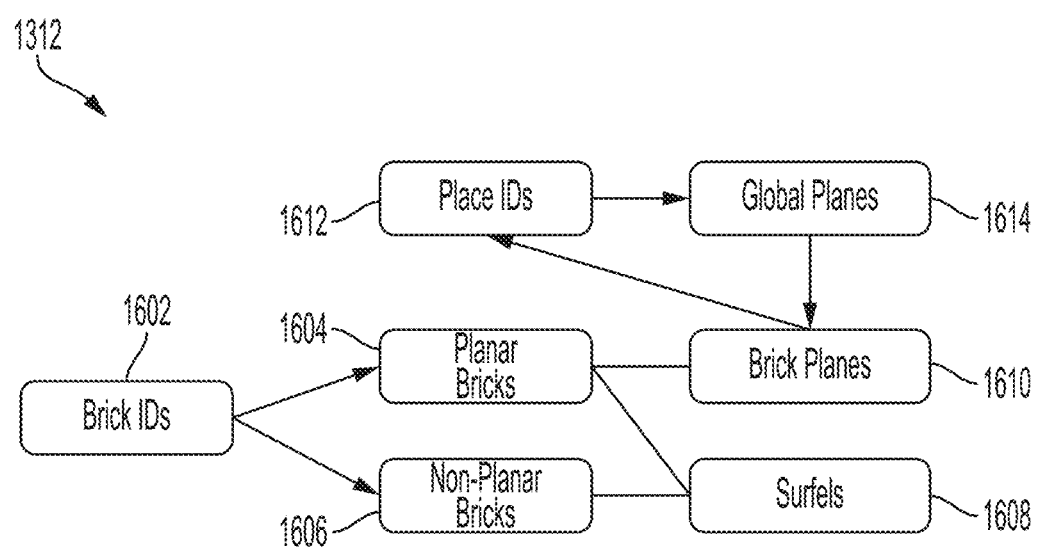
FIG. 24 is a schematic diagram illustrating Plane Data Store of FIG. 21, according to some embodiments.

FIG. 24 shows data structure in a plane data store 1312, according to some embodiments. Global planes 1614 indexed by plane IDs 1612 may be at the highest level of the data structure. Each global plane 1614 may include multiple brick planes and surfels of bricks adjacent to corresponding global planes, such that one brick plane may be persisted for each brick while a global plane can be accurately presented when edges of the global plane is not qualified as brick planes for corresponding bricks. In some embodiments, surfels of bricks adjacent to a global plane are persisted instead of surfels of all bricks in a scene since it would be sufficient for accurately presenting a global plane. For example, as illustrated in FIG. 23, the global plane 1504 extends across brick [0008]-[0010] and [0006]. The brick [0006] has the brick plane 1502, which is not part of the global plane 1504. With the data structure in the plane data store 1312, when a plane query requests the global plane 1504, surfels of bricks [0006] and [0012] are checked to determine whether the global plane 1504 extends into the bricks [0006] and [0012]. In the illustrated example, surfels 1506 indicates that the global plane 1504 extends into the brick [0006].

Referring back to FIG. 24, the global planes 1614 may be bi-directionally associated with corresponding brick planes 1610. Bricks may be identifiable by brick IDs 1602. Bricks may be divided into planar bricks 1604, which include at least one plane, and non-planar bricks 1606, which include no planes. Surfels for both planar bricks and non-planar bricks may be persisted, depending on whether a brick is adjacent a global plane but not whether the brick includes planes. It should be appreciated that planes may be continuously persisted in the plane data store 1312 while an XR system is observing a scene, regardless whether or not there is a plane query 1314.

Figure 25:
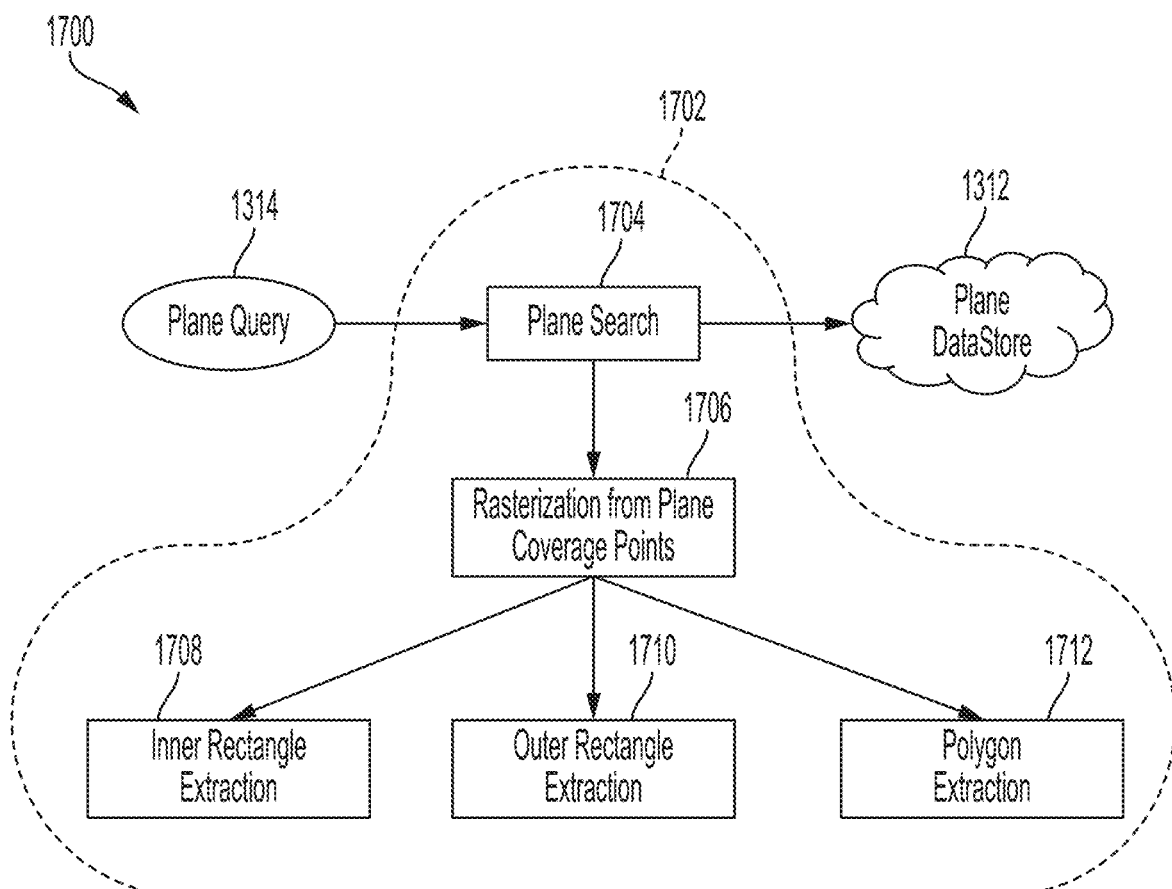
FIG. 25 is a schematic diagram illustrating Planar Geometry Extraction when a Plane Query is sent to a Plane Data Store of FIG. 21, according to some embodiments.

FIG. 25 shows planar geometry extraction 1702, which may extract planes for an application's usage, when the application sends the plane query 1314 to a plane data store 1312, according to some embodiments. The planar geometry extraction 1702 may be implemented as an API. The plane query 1314 may indicate requested planar geometry representation, for example, outer rectangular planes, inner rectangular planes, or polygon planes. According to the plane query 1314, plane search 1704 may search and obtain plane data in the plane data store 1312.

In some embodiments, rasterization from plane coverage points 1706 may generate plane coverage points. An example is illustrated in FIG. 26A. There are four bricks [0000]-[0003], each has a brick plane 1802. Plane coverage points 1806 (or "rasterized points") are generated by projecting boundary points of the brick planes onto a global plane 1804.

Referring back to FIG. 25, rasterization from plane coverage points 1706 may also generate a rasterized plane mask from the plane coverage points. According to the requested planar geometry representation by the plane query 1314, inner rectangular plane representation, outer rectangular plane representation, and polygon plane representation may be extracted by inner rectangle extraction 1708, outer rectangle extraction 1710, and polygon extraction 1712, respectively. In some embodiments, an application can receive the requested planar geometry representation within milliseconds from sending a plane query.

An exemplary rasterized plane mask 1814 is illustrated in FIG. 26B. From a rasterized plane mask, various planar geometry representations may be generated. In the illustrated example, a polygon 1812 is generated by connecting some of the plane coverage points of the rasterized plane mask such that none of the plane coverage pints in the mask is outside the polygon. An outer rectangle 1808 is generated such that the outer rectangle 1808 is the smallest rectangle surrounding the rasterized plane mask 1814. Inner rectangles 1810 are generated by assigning "1"s to bricks with two plane coverage points and "0"s to bricks without two plane coverage points to form a rasterized grid, determining groups of brick that are marked as "1" and aligned in a line parallel to an edge of a brick (e.g., bricks [0001], [0005], [0009], and [00013] as a group, bricks [0013]-[0015] as a group), and generating one inner rectangle for each determined group such that the inner rectangle is the smallest rectangle surrounding the respective group.

Figure 27:
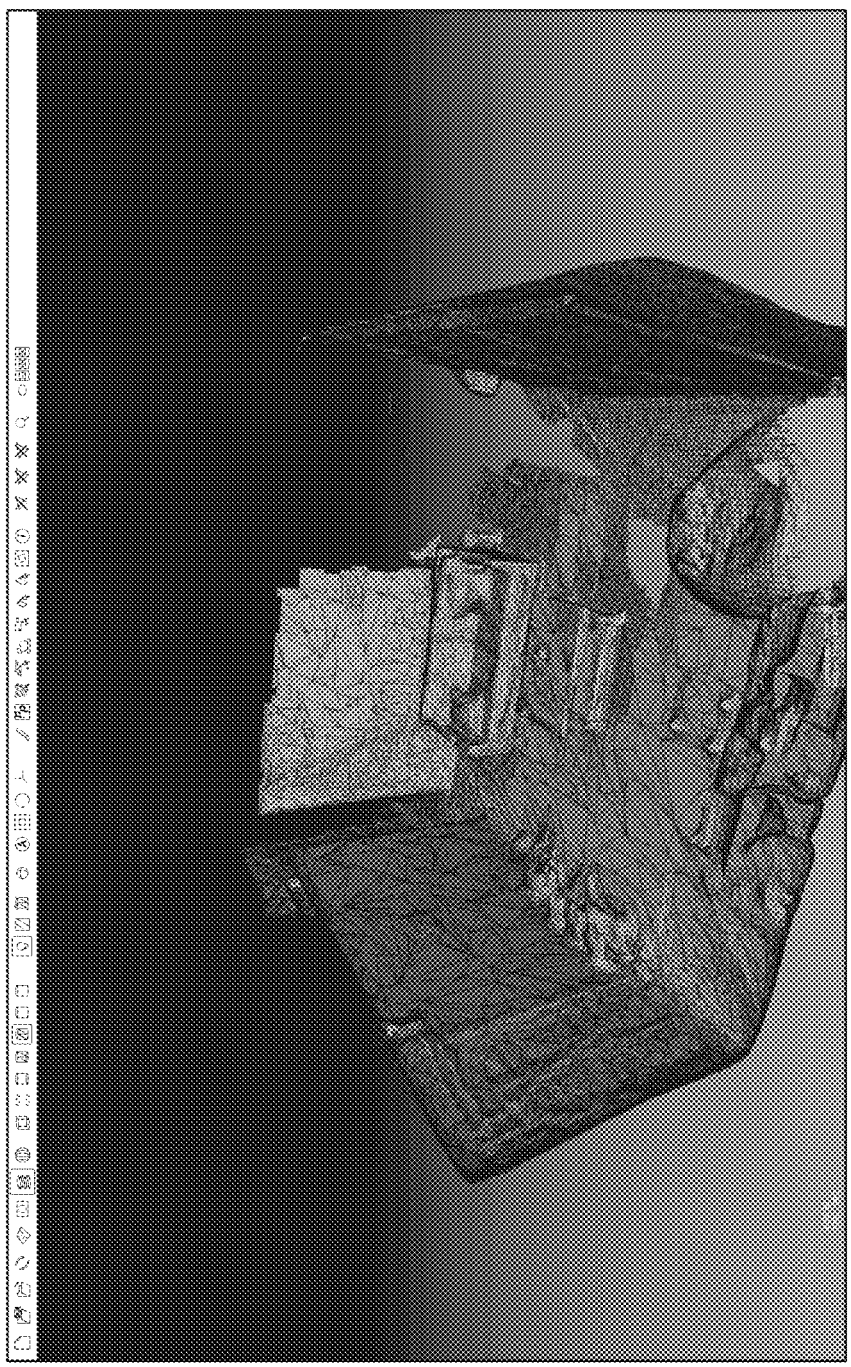
FIG. 27 shows a mesh for a scene, according to some embodiments.
Figure 28A:
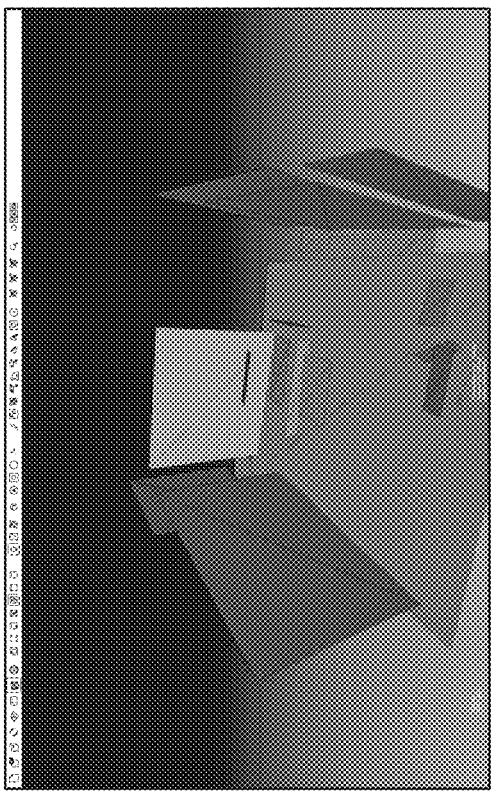
FIG. 28A shows the scene of FIG. 27 represented by outer rectangular planes, according to some embodiments.
Figure 28B:
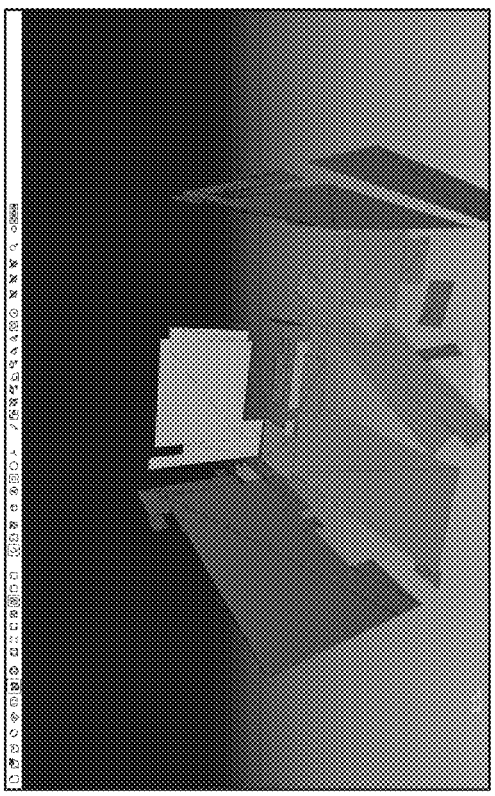
FIG. 28B shows the scene of FIG. 27 represented by inner rectangular planes, according to some embodiments.
Figure 28C:
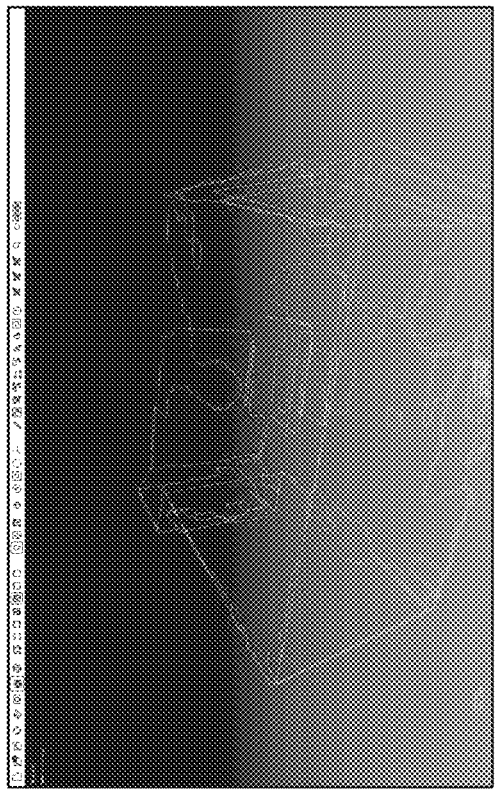
FIG. 28C shows the scene of FIG. 27 represented by polygon planes, according to some embodiments.

FIG. 27 shows a mesh for a scene 1900, according to some embodiments. FIGS. 28A-C show the scene 1900 represented by outer rectangular planes, inner rectangular planes, and polygon planes, respectively, according to some embodiments.

Figure 29:
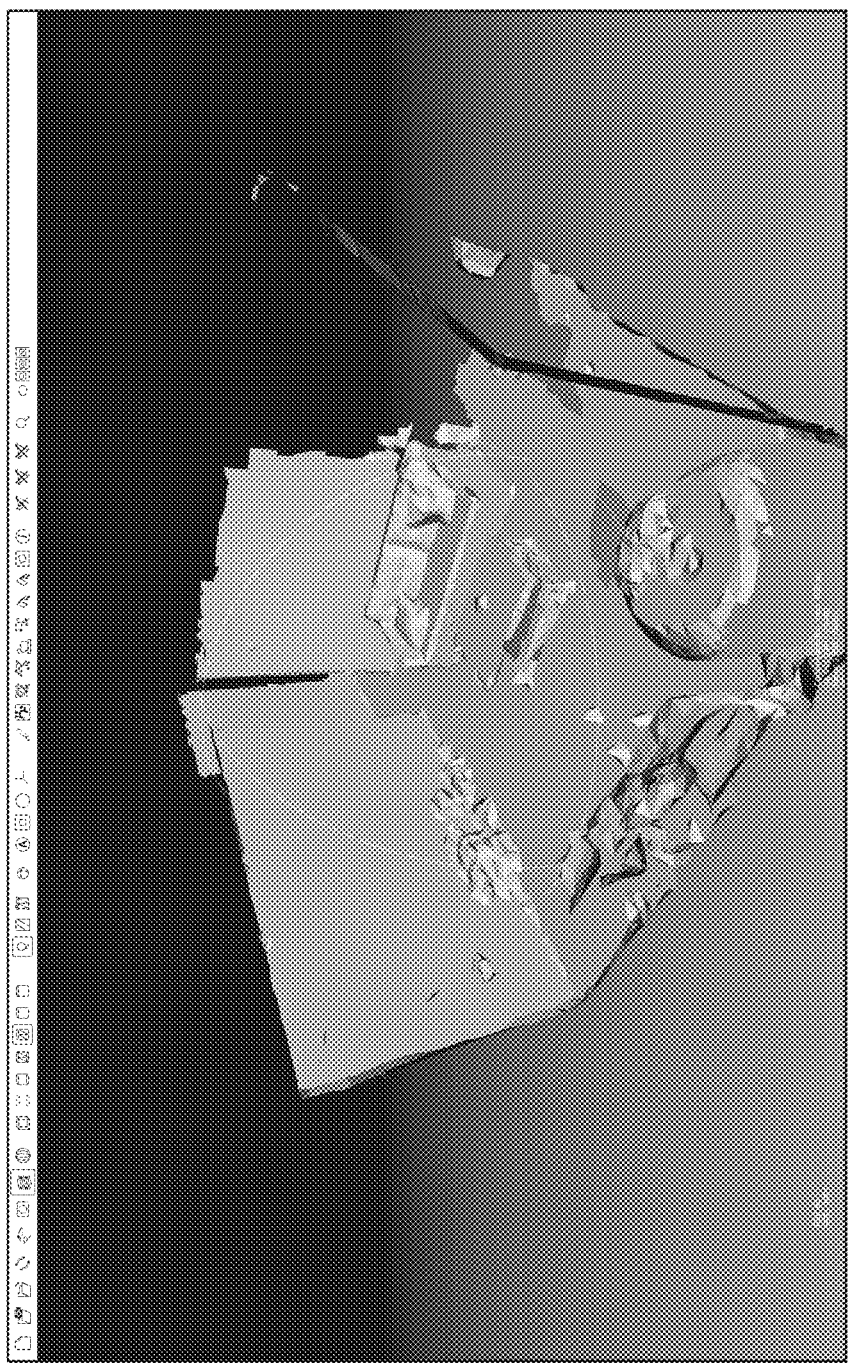
FIG. 29 shows the scene of FIG. 27 with denoised mesh by planarizing the mesh shown in FIG. 27, according to some embodiments.

FIG. 29 illustrated a less noisy 3D representation of the scene 1900, which is obtained by planarizing the mesh shown in FIG. 27 based on extracted plane data, for example, planes illustrated in FIGS. 28A-C.

Multi-Stage Block Mesh Simplification

In some embodiments, processing may be employed to reduce the complexity of a representation of an XR environment before that representation is stored or used in rendering functions, such as occlusion processing or computing physics of interactions among objects in the XR environment. For example, meshing component 160d may simplify a mesh, or portion of a mesh, before storing it in persisted world 162 as a mesh 162c.

Such processing may entail performing operations in stages on a representation of an XR environment. Those stages may include simplification operations that precede and follow a region-based operation. The region-based operation may, like the simplification operation, reduce the complexity of the representation of the XR environment. By staging the operations in this fashion, the total processing to produce a simplified representation of the XR environment may be reduced while maintaining the quality of the representation of the XR environment. As a result, a simplified high-quality representation may be updated frequently such that an XR environment may be frequently updated, improving the performance of the XR system, such as by presenting a more realistic environment to a user.

The XR environment may represent a physical world and data representing the XR environment may be captured by one or more sensors. However, techniques as described herein may be applied to XR environments regardless of the source of data representing the environment. In some embodiments, an XR environment may be represented by a mesh, including one or more points and polygons, such as triangles, defined by subsets of the points. A first simplification operation that precedes the region-based operation may reduce the complexity of the representation of the environment. A mesh, for example, may be simplified by reducing the number of such polygons in the mesh. As a specific example, the first simplification operation may employ a triangle reduction algorithm, which may reduce the number of triangles used to represent the XR environment.

The region-based operation may be a shape detection operation that may detect one or more shapes. A common shape detection operation is a planarization operation in which the shapes that are detected are planes. The detected planes may represent objects or portions of objects. Detection of planes may simplify processing to render an XR environment. A moving object being rendered in an XR environment, for example, may move in a readily computable way upon colliding with a plane. Accordingly, identifying planes, may simplify subsequent rendering of moving objects in comparison to performing the computation based on multiple polygons representing the same portion of the environment. Other shapes may be detected and used in subsequent processing instead of or in addition to planes, including cylinders, cubes, lines, corners, or semantics such as glass surfaces or holes. Such an operation may group polygons that represent a surface of a detected shape.

A second simplification operation that follows the region-based operation may further simplify the representation of the environment, such as by further reducing the number of polygons in the representation. The second simplification operation may focus on reducing the number of polygons within each region detected by the region-based operation.

Such processing may enable a meshing service that processes sensor data collected in a physical environment and provides a mesh to an application generating content. In some embodiments, the processing may provide simplified representations of virtual objects in a virtual environment.

In XR systems, such as virtual reality (VR), augmented reality (AR) and mixed reality (MR) systems, three-dimensional (3D) mesh data is often used for multiple purposes including, for example, occluding virtual content in a graphics/game engine based on physical objects in the environment, or computing the effect rigid body collisions for virtual objects in a physics engine of a game engine. In some embodiments, requirements for the mesh may differ for different uses of the mesh, and a simplified mesh may be suitable for many such uses, with some simplification techniques being better suited for some uses than others.

Accordingly, processing as described herein may be implemented with any of multiple simplification techniques and/or simplification techniques that may be configured based on intended use of a simplified mesh. The utility of a meshing service that provides a simplified mesh to multiple client applications, which may use the mesh in different ways, may be improved using processing as described herein. Each client application may require a mesh with a different level of simplification. In some embodiments, an application accessing a meshing service may specify a target simplification or the mesh to be provided to it. Mesh simplification methods as described herein may serve for multiple client applications including, for example, those that perform virtual content occlusion, physics simulation, or environmental geometry visualization. The mesh processing described herein may have low latency and may be flexible in that it may optimize/bias the operation for different uses (e.g., flatten surfaces, varying triangle counts).

Mesh simplification methods as described herein may provide real-time performance (e.g., low latency to support on the fly (real-time) environment changes), local update capability (e.g., renewing parts of a mesh that changed since last update), and planarized surfaces (e.g., flattened planar surfaces to support robust physics simulation).

In some embodiments, a representation of an XR environment may be segmented into multiple blocks, some or all of which may be processed in parallel. In some embodiments, the resulting blocks may then be recombined. In some embodiments, the blocks may be defined with "skirts" that overlap adjacent blocks. The skirts enable recombination of the blocks with fewer and/or less noticeable discontinuities at the interfaces of the reassembled blocks.

Accordingly, in some embodiments, a mesh simplification method may include mesh block segmentation, pre-simplification, mesh planarization, and post-simplification. To speed up the process, a global mesh may first be segmented into blocks of component meshes such that mesh blocks could be handled (e.g., processed) parallel. Then mesh blocks may be extended with skirts over boundaries between adjacent blocks. With skirted mesh blocks, simplification may be conducted on individual mesh block, while the global mesh may be visually seamless although topologically disconnected.

In some embodiments, a mesh simplification method may be suited for use by an application that uses the simplified mesh to represent interactions of objects in the XR environment, such as by making the simplification processing plane-aware. To simplify a mesh, a three-step simplification process may be implemented. A mesh may be first pre-simplified moderately using a relatively high target triangle count. Then plane areas may be detected by a region growing algorithm. The mesh may be planarized by projecting corresponding triangles to the detected planes. In some embodiments, the mesh may be regularized by adjusting plane (or primitive) normals to substantially vertical and parallel to the detected planes. Afterwards, a post-simplification process may be run over the planarized mesh. The post-simplification processing may focus more on the detected plane areas, for example, simplify the mesh of each detected plane area to reach a desired level of complexity (e.g., metric complexity), such as might be indicated by a target value of one or more metrics.

Figure 30:
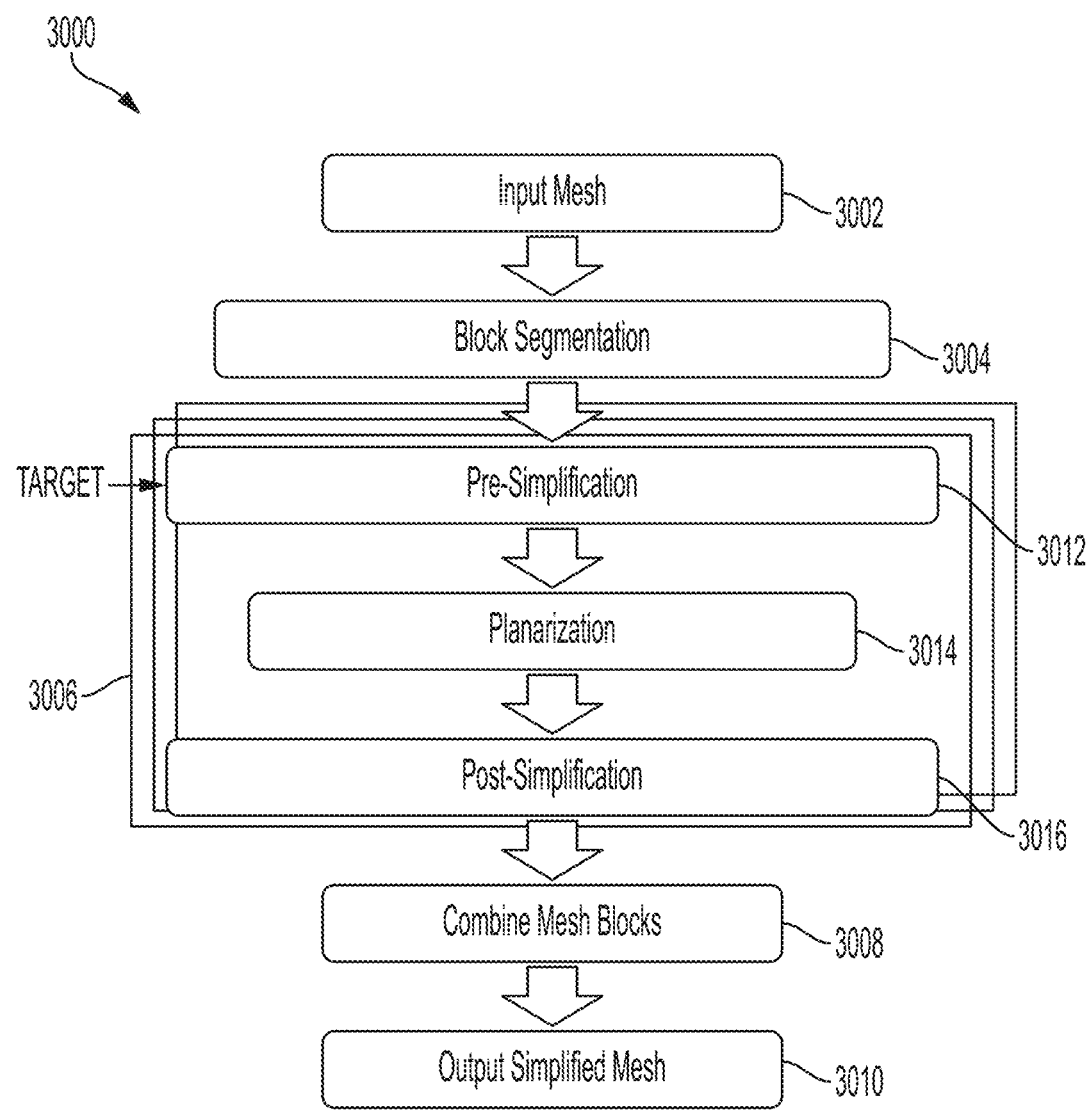
FIG. 30 is a flow chart illustrating a method of generating a model of an environment represented by a mesh, according to some embodiments.

FIG. 30 illustrates a method 3000 of generating a model of an environment represented by a mesh, according to some embodiments. In some embodiments, the method 3000 may be performed on a meshing service on an XR platform. The method 3000 may start from an input mesh representing the environment at act 3002. In some embodiments, the input mesh may have a high resolution, which may be indicated by the number of triangles. The input mesh may be generated by a reconstruction system (e.g., a volumetric 3D reconstruction system) and the input mesh may include 3D reconstruction data.

In some embodiments, the reconstruction system may generate a volumetric 3D representation of the environment, which may create a data hierarchy of 3D information of the environment captured by one or more sensors. For example, a sensor may be a depth camera, which may capture 3D information of the environment, for example, a stream of depth images with respective poses of the depth camera (i.e. camera poses). The 3D information of the environment may be processed into a voxel grid. Each voxel may contain one or more signed distance functions (SDFs) that describe whether the voxel lies inside or outside the geometries of objects in the environment. The voxels may be grouped into "bricks." Each brick may include multiple voxels, for example, in cubic volumes such as $8^3$ voxels. The bricks may be further grouped into "tiles." Each tile may include multiple bricks.

The size of a tile may be selected to facilitate memory operations in a computing device. The size, for example, may be selected based on the amount of information about the environment that is maintained in active memory of a device that is processing such data. The system, for example, may pass tiles between active memory, which is usually local to the device, and other memory that has more latency, such as non-volatile memory or remote memory in a cloud. One or more whole or partial tiles may contain information representing a "block" in a mesh or other representation of an environment.

In some embodiments, the volumetric 3D reconstruction system may generate the input mesh 3002 as a topologically-connected global mesh. In some embodiments, the volumetric 3D reconstruction system may generate the input mesh 3002 as a global mesh that is visually seamless although topologically-disconnected. For example, a topologically-disconnected global mesh may be comprised of multiple mesh blocks, each of which is generated from a block.

A reconstruction system may be configured to capture substantial detail of an environment, which enables the system to distinguish between adjacent portions of the representation that have relatively small differences in their characteristics. Adjacent regions of different properties may be identified as different surfaces, resulting in the system identifying a large number of surfaces in the environment. However, such a system may capture details that are unnecessary for many applications, but are nonetheless processed. For example, a reconstruction system may unnecessarily present bumps on a wall with many triangles when two triangles making a rectangle would be a sufficient representation of the wall for a client application requesting meshes from the meshing service. In some embodiments, an application, when requesting a mesh from the meshing service, may specify a target simplification level of the requested mesh. That target simplification level may be expressed as a degree of compression, a number of triangles per unit area, or in any other suitable way.

The method 3000 may efficiently generate a model of the environment, which is sufficient for the client application, from the input mesh. At act 3004, the input mesh may be segmented into one or more first mesh blocks, each of which may correspond to a block in the data hierarchy of the volumetric 3D representation of the environment.

Each first mesh block may represent a portion of the environment and may have a first value of a metric of complexity (e.g., mesh resolution). In some embodiments, a metric of complexity of a mesh block indicates a number of triangles in the mesh block. In some embodiments, processing may be performed on mesh blocks sequentially and/or in parallel. However, simplification processing as described herein may be applied to the entire mesh or any suitable portion (e.g., one or more mesh blocks).

Act 3006 represents a sub-process that is performed on each of multiple mesh blocks. The sub-processing may be performed on multiple mesh blocks independently, such that the processing may be readily performed in parallel for some or all of the mesh blocks. The sub-process may be performed on all mesh blocks or a subset of the mesh blocks selected for further processing. The subset of the mesh blocks may be selected based, at least in part, on a field-of-view of a device on which an application requesting the simplified mesh is executing.

At act 3006, some of the first mesh blocks may be selected based on, for example, objects described in the first mesh blocks or locations of the first mesh blocks. For each of the selected first mesh blocks, a multi-stage simplification may be performed. In some embodiments, the multi-stage simplifications on the selected first mesh blocks may be performed in parallel and, as a result, the simplifications on the selected first mesh blocks may be completed approximately at a same point of time, though this may depend on the metric of complexity of each mesh block of the selected first mesh blocks.

The multi-stage simplification may include a pre-simplification operation, a region-based operation (e.g., a planarization operation), and a post-simplification operation. In some embodiments, the multi-stage simplification may be performed based on an input value from the client application. The input value may indicate required mesh complexity by the client application (e.g., mesh resolution). The input value from the client application may be the same or different for each of the selected first mesh blocks.

At act 3012, a pre-simplification operation may be performed on a selected first mesh block to generate a second mesh block. The pre-simplification operation may reduce the complexity of the block. For a mesh block, the pre-simplification may reduce the number of polygons in the mesh block. In some embodiments, the amount of pre-simplification at act 3012 may be configurable. A target value, for example, may be provided as an input to the processing at act 3012, for example, by the client application. The target value may be a single value or multiple values of one or more specified or predetermined metrics. The one or more metrics may include, for example, absolute triangle count, a percentage of the initial triangle counts, and/or a quadric error metric, which may measure an average squared distance between a simplified mesh and an original mesh (e.g., the input mesh 3002).

The target value may be provided in any suitable way. An instance of the method 3000, for example, may be pre-configured with a target value. In some embodiments, the target value may be supplied through an API by an application requesting a mesh from the meshing service performing the method 3000. For example, the target value for act 3012 may be a final target requested by a rendering function (e.g., the requesting application). In some embodiments, the target value provided as an input may be adjusted or overridden to ensure that sufficient data remains in the mesh for subsequent processing. For example, processing in act 3014 may require a minimum number of triangles and a target value provided by an application may be replaced by that minimum value if the target value is below the minimum number of triangles.

In such embodiments, the pre-simplified mesh may have values of one or more metrics such that the pre-simplified mesh can be processed faster during the region-based operation than the original block segmented input mesh, while still containing all or most of the regions of the original block segmented input mesh.

Without controlling the values of the one or more metrics, the simplified mesh may be too coarse, unevenly distributed, and/or lose many regions of the original block segmented input mesh that are required in the following region-based operation.

The second mesh block produced in act 3012 may have a second value of the metric of complexity, which may be less than the first value of the metric complexity. In some embodiments, the pre-simplification operation of act 3012 may be performed using a triangle reduction algorithm.

At act 3014, a shape detection operation may be performed on the second mesh block to generate a third mesh block. A planarization operation is illustrated as an example. The third mesh block may have a third value of the metric of complexity. In some embodiments, the third value of metric complexity may be the same as the second value of the metric complexity. In some embodiments, the third value of metric complexity may be less than the second value of metric complexity. The planarization operation may include detecting planar areas in the second mesh block, for example, using a region growing algorithm, projecting meshes of the detected planar areas to corresponding planes, adjusting plane normals of the detected planar areas to be substantially perpendicular to the corresponding planes, and simplifying the projected meshes on each of the corresponding planes based on, for example, a target triangle count. In some embodiments, plane normals of the detected planar areas may be adjusted before projecting meshes of the detected planar areas to the corresponding planes.

At act 3016, a post-simplification operation may be performed on the third mesh block to generate a fourth mesh block. In some embodiments, processing at act 3014 may desirably be performed on a mesh with more resolution than is required in the simplified mesh that is to be output from method 3000. In some embodiments, processing at act 3016 may simplify the entire mesh block to reach a desired level of complexity (e.g., metric complexity), such as might be indicated by a target value of one or more metrics, which may be the same or different target than was supplied to act 3012. In some embodiments, the post-simplification operation at act 3016 may focus on reducing the number of polygons within each plane detected by the planarization operation at act 3014.

The fourth mesh block may have a fourth value of the metric of complexity, which may be less than the third value of the metric complexity. In some embodiments, a percentage reduction between the third value of the metric complexity and the fourth value of the metric complexity may be greater than a percentage reduction between the first value of the metric complexity and the second value of the metric complexity. In some embodiments, the percentage reduction between the third value of the metric complexity and the fourth value of the metric complexity may be at least two times greater than the percentage reduction between the first value of the metric complexity and the second value of the metric complexity. In some embodiments, the post-simplification operation of act 3016 may be performed using a triangle reduction algorithm. In some embodiments, the post-simplification operation of act 3016 may be performed using the same simplification algorithm as the pre-simplification operation of act 3012.

At act 3008, the simplified selected blocks may be combined with other selected mesh blocks similarly processed as in act 3006 and/or may be combined with unselected blocks into a new mesh of the environment. At act 3010, the new mesh of the environment may be provided to a client application. In some embodiments, the new mesh of the environment may be referred to as a simplified mesh.

In some embodiments, act 3008 may be skipped. The simplified mesh blocks may be sent directly to a client application, in which the mesh blocks may be visually seamless although topographically disconnected.

Figure 31:
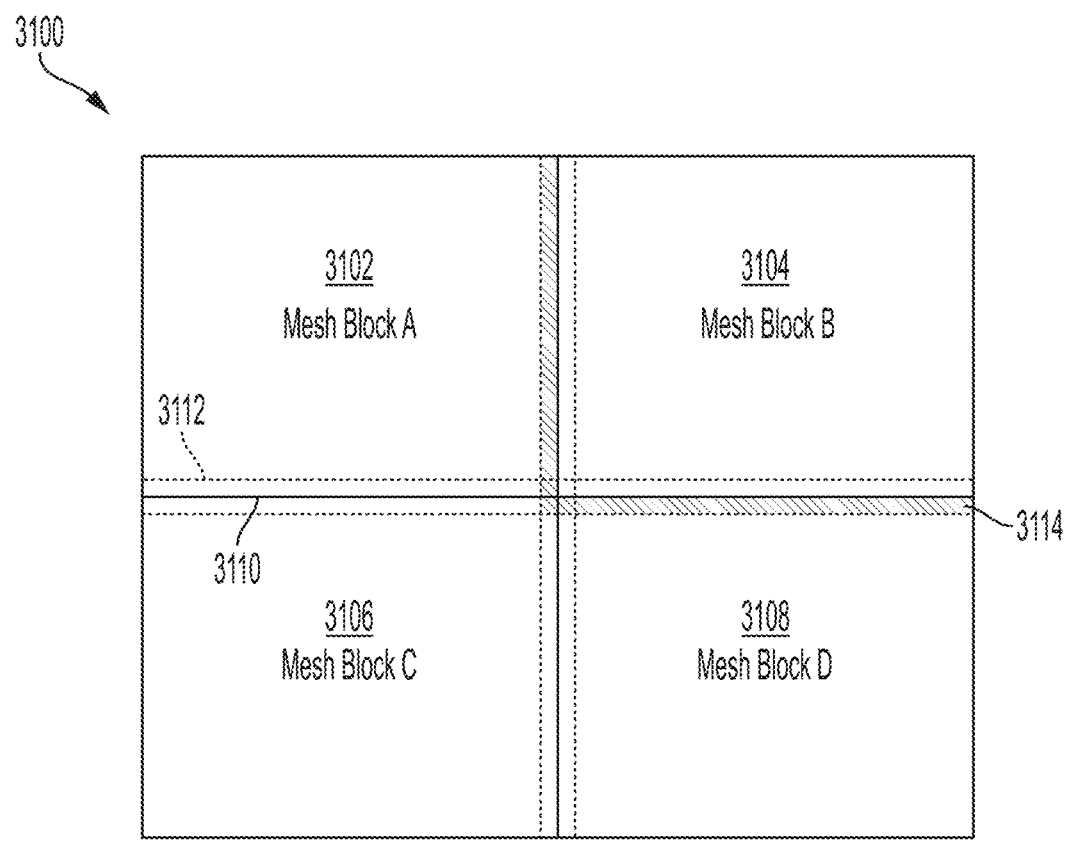
FIG. 31 is a schematic diagram illustrating a 2D representation of a portion of a physical world by four blocks, according to some embodiments.
Figure 32B:
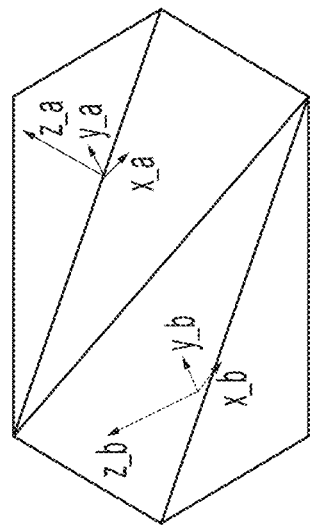
FIGS. 32A-32D are schematic diagrams illustrating a mesh evolution of an exemplary mesh block during a multi-stage simplification, according to some embodiments.
Figure 32D:
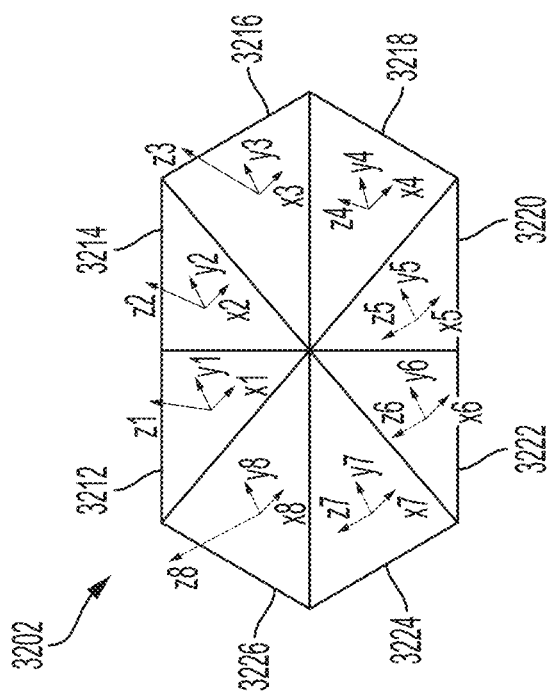
Figure 32A:
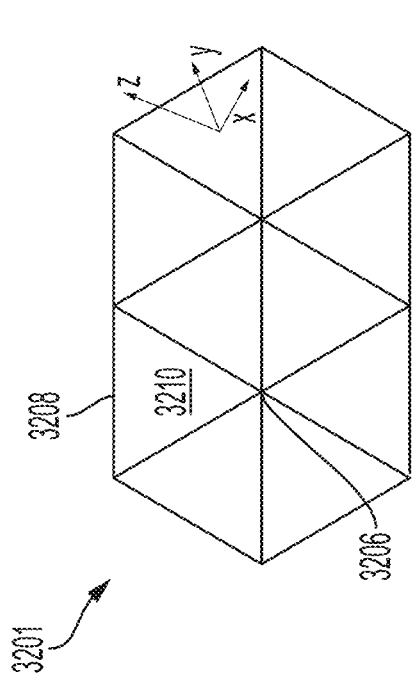
Figure 32C:
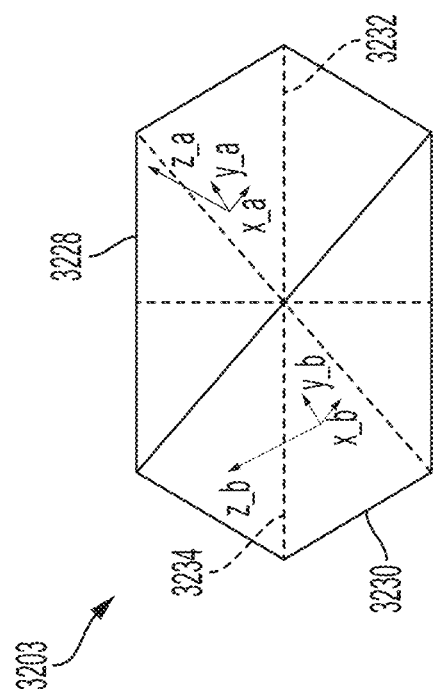

FIG. 31 illustrates an example of segmenting a mesh representation 3100 of an environment into mesh blocks, according to some embodiments. The mesh representation 3100 may be segmented into four mesh blocks: mesh blocks A-D. In some embodiments, mesh blocks may correspond to regions with the same volume in a physical world that belongs to the environment. In some embodiments, mesh blocks may correspond to regions with different volumes in the physical world that belongs to the environment. For example, when the physical world is an office room, the office room may be divided into regions, each of which may be one cubic foot. One block may include a 3D representation of one region of the office room.

Although the mesh representation 3100 of an environment is illustrated in two dimensions (2D), it should be appreciated that an environment may be three-dimensional, correspondingly, represented by a 3D mesh representation. Although the mesh representation 3100 of an environment is illustrated as a combination of four mesh blocks, it should be appreciated that an environment may be represented by any suitable number of mesh blocks, for example, two, three, five, six or more.

Representation 3100 may be segmented into four parts: parts 3102, 3104, 3106, and 3108, for example, illustrated by solid lines 3110. In some embodiments, parts 3102, 3104, 3106, and 3108 may be designated as mesh blocks A-D respectively.

When a mesh block is updated, it may continue to interface with an adjacent block that was not updated. As a result, discontinuities at the boundaries between the mesh blocks may arise. If regions represented by the adjacent blocks have discontinuities, the fused mesh may be interpreted, in subsequent processing, as indicating that there are cracks between the adjacent blocks. In some embodiments, such cracks in the representation of the physical world space may be interpreted as space with infinite depth. As such, a space may be an artifact of the representation of the physical world, rather than actually a feature. Any application using such a fused mesh to generate a representation of objects in the physical world may not generate output correctly. For example, an application rendering a virtual character on surfaces within the physical world may render that character to appear as if it fell through the crack, which would not create the desired appearance of the object.

To reduce the appearance of such cracks, in some embodiments, a portion of adjacent blocks may represent a same region of the physical world. For example, interface regions between the adjacent blocks may be represented by a portion of each of the adjacent blocks, which may enable easy independent updating and/or rendering that accounts for level of detail (LOD) (e.g., decreasing the complexity of a 3D reconstruction of a portion of the physical world as the portion moves out the user's field of view). Even if one block is updated, and its adjacent block is not, the fused mesh may be represented by combining data representing the interface region from both block. As a specific example, when fusing the updated block with the adjacent blocks, a physics engine may determine an overlapping region of the adjacent blocks based on, for example, which one of the adjacent blocks should be observable in their overlapping region. A block-based data structure may be adopted with skirts, zippers, or any other suitable methods to represent interface regions between adjacent blocks so that when a block is updated, it will continue to interface with adjacent blocks that were not updated. Such an approach may have the appearance of "papering over" cracks between adjacent blocks. Therefore, blocks may be updated independently of adjacent blocks.

In the illustrated example in FIG. 31, regions at the boundaries of parts 3102, 3104, 3106, and 3108 may be designated as skirts, illustrated by dashed lines 3112. In some embodiments, each of mesh blocks A-D may include one of parts 3102, 3104, 3106, and 3108, and a corresponding skirt. For example, mesh block B may include the part 3104 and a skirt 3114 that overlaps with boundary parts of mesh block B's neighboring mesh blocks A, C, and D such that cracks between the mesh blocks may be papered over when the blocks are connected into a single mesh. Mesh blocks A, C, and D may also include corresponding skirts. Accordingly, before returning a single connected 3D mesh representation to an application, a processor may paper over any cracks between the mesh blocks.

In some embodiments, block meshes that include skirts may be sent directly to an application, without being combined to a topographically-connected global mesh. The application may have a global mesh comprised of block meshes, which is visually seamless although topologically disconnected.

FIGS. 32A-32D illustrate a mesh evolution of an exemplary mesh block 3201 during a multi-stage simplification, according to some embodiments. Mesh block 3201 may include vertices 3206, edges 3208, and faces 3210. Each face may has a normal, which may be represented by multiple coordinates, shown for example as x, y, z in FIG. 32A.

A pre-simplification operation may be performed on mesh block 3201 to generate mesh block 3202. An edge collapse transformation may be used. In the illustrated example, mesh block 3202 reduces the number of faces of mesh block 3201 from ten to eight. The resulting faces of mesh block 3202 may each have a set of corresponding normals (e.g., $x1, y1, z1; x2, y2, z2; \ldots x8, y8, z8$).

A planarization operation may be performed on mesh block 3202 to generate mesh block 3203. The planarization operation may include detecting planar areas in mesh 3202 based on, for example, the plane (or primitive) normals of the faces. Values of plane normals $x1, y1, z1$ of a first face 3212 and plane normals $x2, y2, z2$ of a second face 3214 may be compared. The comparison result of the plane normals of the first and second faces may indicate angles between the plane normals (e.g., angles between $x1$ and $x2$). When the comparison result is within a threshold value, it may be determined that the first and second planes are on a same planar area. In the illustrated example, planes 3212, 3214, 3216, and 3218 may be determined as on a first planar area corresponding to plane 3228; planes 3220, 3222, 3224, and 3226 may be determined as on a second same planar area corresponding to plane 3230.

The planarization operation may also include projecting triangles formed by edges of planes 3212, 3214, 3216, and 3218 to plane 3228 as illustrated by dashed lines 3232, and projecting triangles formed by edges of planes 3220, 3222, 3224, and 3226 to plane 3230 as illustrated by dashed lines 3234. The planarization operation may also include adjusting plane normals for planes 3212, 3214, 3216, and 3218 to be the same as plane normals for plane 3228 (x_a, y_a, z_a), and adjusting plane normals for planes 3220, 3222, 3224, and 3226 to be the same as plane normals for plane 3230 (x_b, y_b, z_b).

A post-simplification operation may be performed on mesh block 3203 to generate mesh block 3204. In the illustrated example, mesh block 3204 reduces the number of faces of mesh block 3203 from eight to four.

FIGS. 33A and 33B-36A and 36B illustrate the effect of simplification, showing side-by-side the same portion of a physical world with and without a simplification applied. These figures provide a graphical illustration that simplification is able to provide usable information to operate an AR system, while providing less data that needs to be processed.

FIGS. 33A and 33B show representations of the same environment without simplification and with simplification through triangle reduction, respectively. Such processing is an example of processing that may be performed at the pre-simplification and post-simplification blocks 3012 and 3016 in FIG. 30.

FIGS. 34A and 34B show close-up representations of the same environment without simplification through triangle reduction and with simplification, respectively.

35A and 35B show representations of the same environment without planarization and with planarization, respectively. Such processing is an example of processing that may be performed at the planarization block 3014 in FIG. 30.

36A and 36B show representations of the same environment without simplification and with simplification through removal of disconnected components, respectively. Such processing is an example of an alternative embodiment of region-based operation that may be performed at block 3014 in FIG. 30.

Caching and Updating of Dense 3D Reconstruction Data

In some embodiments, 3D reconstruction data may be captured, persisted and updated in blocks, which may allow local update while maintaining neighbor consistency. The block-based 3D reconstruction data representation may be used in connection with a multi-layer caching mechanism that retrieves, prefetches, and stores 3D data efficiently for AR and MR applications, including both single-device and multi-device applications. For example, volumetric information 162a and/or meshes 162c (FIG. 6) may be stored in blocks. Use components 164 may receive information about the physical world using this block-based representation. Similarly, perception component 160 may store and retrieve such information in blocks.

These techniques expand the capabilities of portable devices, with limited computational resources, to present AR and MR content with high realism. Such techniques, for example, may be used to efficiently update and manage the output of real-time or offline reconstruction and scanning in a mobile device having limited resource and connection to the Internet (continuous or noncontinuous). The techniques make available to a wide variety of mobile AR and MR applications up-to-date, accurate, and comprehensive 3D reconstruction data, in either single-device applications or multi-device applications sharing and updating the same 3D reconstruction data. These 3D reconstruction data may be in any suitable formats including meshes, point clouds, voxels, and the like.

Some AR and MR systems have attempted to simplify presentation of MR and AR scenes by limiting the amount of 3D reconstruction data being processed at any time. Sensors used to capture 3D information may have a maximum reconstruction range that may limit a bounding volume around a field of view of a sensor. To reduce the amount of 3D reconstruction data, some reconstruction systems only hold areas near the field of view of the sensors in an active working memory and store other data in secondary storage. For example, areas near the field of view of the sensors are stored in CPU memory while other data are persisted to a local cache (e.g., disk) or over a network to remote storage (e.g. in the cloud).

The computational cost of generating the information stored in CPU memory, even though limited, may still relatively high. Some AR and MR systems continually recompute a global representation of the environment that the reconstruction system has ever seen in order to select information to store in CPU memory, which may be prohibitively expensive for interactive applications. Other AR and MR systems compute just a local update to a connected representation using some approaches may be similarly expensive, particularly for simplified mesh, as it requires breaking apart the existing mesh, calculating another mesh with the identical boundaries, and re-connecting the mesh parts.

In some embodiments, 3D reconstruction data may be segmented into blocks. The 3D reconstruction data may be transmitted among storage mediums on the basis of blocks. For example, a block may be paged out of an active memory and persisted to a local or remote cache. The system may implement a paging algorithm in which active memory associated with a wearable device (e.g., head-mounted display device) stores blocks representative of a portion of a 3D reconstruction of the physical world in a field of view of a user of the wearable device. The wearable device may capture data about portions of the physical world commensurate with the field of view of the user of the wearable device. As the physical world changes in the field of view of the user, blocks representing that region of the physical world may be in an active memory from which they can be readily updated. As the user's field of view changes, blocks representing regions of the physical world that move out of the user's field of view may be moved to a cache such that blocks representing regions of the physical world coming into the user's field of view may be loaded into an active memory.

In some embodiments, a coordinate frame may be created for a portion of a physical world that is to be 3D reconstructed. Each block in a 3D representation of the portion of the physical world may correspond to different regions of a physical world that is identifiable using the coordinate frame.

In some embodiments, when a block is updated, the updated block may continue to interface with adjacent blocks that may not have been updated. If regions represented by the adjacent blocks do not overlap, there may be cracks in the fused mesh of the adjacent blocks. In some embodiments, such cracks in the representation of the physical world space may be interpreted as space with infinite depth. As such, a space may be an artifact of the representation of the physical world, rather than actually a feature. Any application using such a fused mesh to generate a representation of objects in the physical world may not generate output correctly. For example, an application rendering a virtual character on surfaces within the physical world may render that character to appear as if it fell through the crack, which would not create the desired appearance of the object. Therefore, in some embodiments, a portion of adjacent blocks may represent a same region of the physical world, for example, interfaces between the adjacent blocks, which may enable easy independent updating and/or rendering that accounts for level of detail (LOD) (e.g., decreasing the complexity of a 3D reconstruction of a portion of the physical world as the portion moves out the user's field of view). For example, when a block is updated, its adjacent blocks may not be updated. When fusing the updated block with the adjacent blocks, a physics engine may determine an overlapping region of the adjacent blocks based on, for example, which one of the adjacent blocks should be observable in their overlapping region. A block-based data structure may be adopted with skirts, zippers, or any other suitable methods to represent interfaces between adjacent blocks so that when a block is updated, it will continue to interface with adjacent blocks that were not updated. Such an approach may have the appearance of "papering over" cracks between adjacent blocks. Therefore, blocks that have changed may be updated independently of adjacent blocks.

In some embodiments, these techniques may be used in an AR and/or a MR "platform," which receives and processes data from sensors worn by one or more users. This sensor data may be used to create and update 3D reconstruction data, representative of portions of the physical world encountered by the user(s). A reconstruction service may continually reconstruct a 3D representation of the physical world when the sensors are capturing and updating data. One or more techniques may be used to determine the blocks impacted by changes in the physical world and those blocks may be updated. This 3D reconstruction data may then be provided to applications that use the 3D reconstruction data to render scenes to depict virtual reality objects positioned in or interacting with objects in the physical world. This data may be provided to applications through an application programming interface (API). The API may be a push or pull interface, either pushing data to the application when relevant portions change or responding to a request from the application for up-to-date information.

In the example of a pull interface, when applications request 3D reconstruction data of the physical world, a reconstruction service may determine an appropriate version of each block that needs to be provided to the application, enabling the reconstruction service to start with the most up-to-date blocks. The reconstruction service, for example, may search for blocks that were previously persisted. A single device system may enable a single device to contribute 3D reconstruction data about the physical world. In the single device system, if the region of the physical world requested is or extends outside an active area (e.g., an area in a current field of view of the device), persisted blocks may be used directly as the most up-to-date blocks, because the persisted blocks would not have been updated since they were persisted when that area moved out a field of view of the device. On the other hand, a multi-device system may enable multiple devices to contribute 3D reconstruction data about the physical world, such as with cloud persistence or peer-to-peer local cache sharing of blocks. Each device may update a region within its active area, which may be persisted. A multi-device system may create a coordinate frame such that blocks generated by different devices are identifiable using the coordinate frame. Therefore, blocks requested by the applications generating data for a first device may be based on updates from other devices, if those updates were made after any version made by the first device. Blocks built using data from first device and other devices may be merged by using the coordinate frame.

The selected blocks may be used to provide 3D reconstruction data about the physical world in any suitable format, but a mesh is used as an example of a suitable representation herein. A mesh may be created by processing image data to identify points of interest in the environment, such as edges of objects. These points may be connected, forming the mesh. Groups of points, conventionally three points, in the mesh that are associated with the same object, or portion thereof, define surfaces of the object, or portions thereof. Information stored in conjunction with the groups of points describe the surfaces in the environment. This information may then be used in varied ways to render and/or display information with respect to the environment. The selected blocks may be used to provide 3D reconstruction data in any suitable way. In some embodiments, the most up-to-date block may be supplied. In some embodiments, the most up-to-date block may be used to determine whether an update of the block is required.

For example, in some embodiments, in a multi-device system, when blocks requested by an application have been identified, a reconstruction service may check blocks persisted by other devices to determine if there have been any significant updates (e.g., via geometry change magnitude thresholds or timestamps), re-run meshing on the blocks that have changed, and then persist these updated mesh blocks.

In some embodiments, when a set of blocks requested by an application has been identified, if the application requested a connected mesh, the set of blocks may be processed into a global mesh, which may be may be topologically-connected, or visually seamless although topologically-disconnected using any suitable techniques such as skirts and zippers.

In some embodiments, an application (e.g., graphics/game engine) may update its internal block (e.g., block stored in active memory and/or local cache) when a block change occurs. A reconstruction service may know which blocks the application has, and can therefore calculate which other (e.g., neighboring) blocks need to be updated in the engine to maintain correct overlap with the skirt/zipper as the in-view blocks update.

In some embodiments, an AR and/or MR platform may be implemented to support execution of AR and/or MR applications, for example, on a mobile device. An application executing on or generating data for presentation through a user interface may request 3D reconstruction data representative of the physical world. That 3D reconstruction data may be supplied from active memory on the device, which may be updated with 3D reconstruction data representative of the physical world in a field of view of the device as the user changes their field of view. The 3D reconstruction data in active memory may represent an active area for the mobile device. In some embodiments, 3D reconstruction data outside an active area of the device may be stored in other memory, such as in a local cache on the device or coupled to the device with a low latency connection. In some embodiments, 3D reconstruction data outside an active area of the device may also be stored in a remote cache, such as in the cloud, which is accessible to the device over a higher latency connection. As the user changes their field of view, the platform may access/load 3D reconstruction data from the cache to add to the active memory to represent regions that move into the user's field of view. The platform may move other data, representing regions that move out of the user's field of view, to cache.

Prediction of the device's movements, which may result in regions moving into the device's field of view, and other regions moving out of the device's field of view, may be used to initiate transfer of 3D reconstruction data between the active memory and cache. Prediction of movement may, for example, be used to select 3D reconstruction data for transfer into and/or out of the active memory. In some embodiments, predicted movement may be used to transfer 3D reconstruction data into and/or out of the local cache by retrieving from or transferring 3D reconstruction data to the remote cache. Exchanging 3D reconstruction data between the local cache and remote cache based on a user's predicted movements may ensure that 3D reconstruction data is available with low latency to move into the active memory.

In embodiments in which regions of the physical world are represented with blocks, initiating transfer of blocks may entail pre-requesting blocks representing areas predicted to come into the user's field of view. For example, if the platform, based on sensor or other data, determines that the user is walking in a particular direction at a particular speed, it may identify regions that are likely to come into the user's field of view and transfer blocks representing these areas to the local cache on the mobile device. If the mobile device is a wearable device, such as a set of glasses, predicting motion may entail receiving sensor data indicating location, direction, and/or rotation of the user's head.

Figure 37:
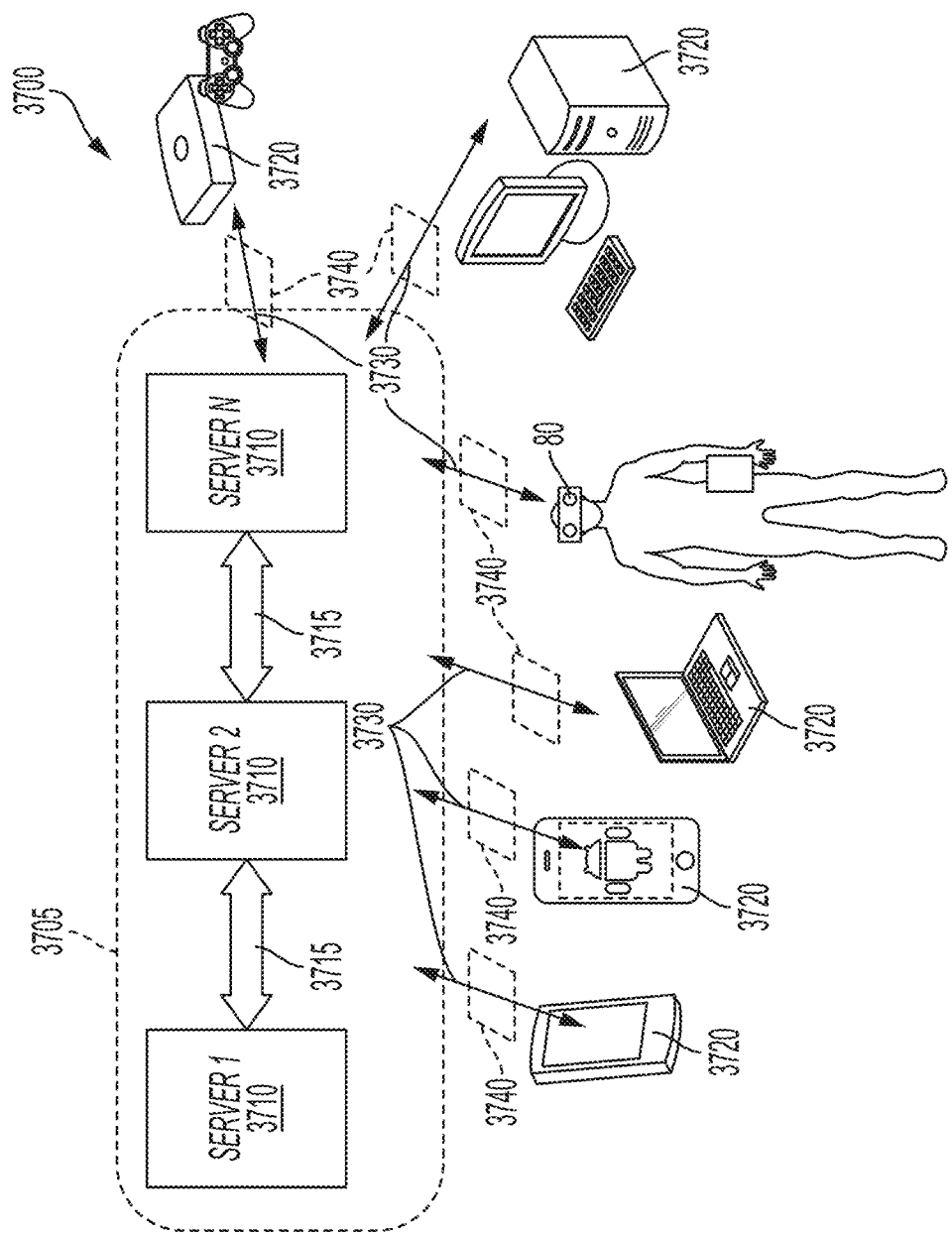
FIG. 37 is a schematic diagram illustrating an electronic system that enables interactive X reality environments for multiple users, according to some embodiments.

FIG. 37 illustrates a system 3700 that enables interactive X reality environments for multiple users, according to some embodiments. The system 3700 may include a computing network 3705 included of one or more computer servers 3710 connected through one or more high bandwidth interfaces 3715. The servers in the computing network need not be co-located. The one or more servers 3710 may each include one or more processors for executing program instructions. The servers also include memory for storing the program instructions and data that is used and/or generated by processes being carried out by the servers under direction of the program instructions. The system 3700 may include one or more devices 3720 including, for example, AR display systems 80 (e.g., viewing optics assembly 48 in FIG. 3B).

The computing network 3705 communicates data between the servers 3710 and between the servers and the devices 3720 over one or more data network connections 3730. Examples of such data networks include, without limitation, any and all types of public and private data networks, both mobile and wired, including for example the interconnection of many of such networks commonly referred to as the Internet. No particular media, topology or protocol is intended to be implied by the figure.

In some embodiments, the devices may be configured for communicating directly with computing network 3705, or any of the servers 3710. In some embodiments, the devices 3720 may communicate with the remote servers 3710 and, optionally, with other devices and AR display systems locally, through a local gateway 3740 for processing data and/or for communicating data between the network 3705 and one or more devices 3720.

As illustrated, gateway 3740 is implemented as a separate hardware component, which includes a processor for executing software instructions and memory for storing software instructions and data. The gateway has its own wired and/or wireless connection to data networks for communicating with the servers 3710 comprising computing network 3705. In some embodiments, gateway 3740 can be integrated with the device 3720, which is worn or carried by a user. For example, the gateway 3740 may be implemented as a downloadable software application installed and running on a processor included in the device 3720. The gateway 3740 provides, in one embodiment, one or more users access to the computing network 3705 via the data network 3730. In some embodiments, gateway 3740 may include communication links 76 and 78.

Servers 3710 each include, for example, working memory and storage for storing data and software programs, microprocessors for executing program instructions, graphics processors and other special processors for rendering and generating graphics, images, video, audio and multi-media files. Computing network 3705 may also include devices for storing data that is accessed, used or created by the servers 3710. In some embodiments, computing network 3705 may include remote processing module 72 and remote data repository 74.

Software programs running on the servers and optionally the devices 3720 and gateways 3740, are used to generate digital worlds (also referred to herein as virtual worlds) with which users interact with the devices 3720. A digital world is represented by data and processes that describe and/or define virtual, non-existent entities, environments, and conditions that can be presented to a user through the device 3720 for users to experience and interact with. For example, some type of object, entity or item that will appear to be physically present when instantiated in a scene being viewed or experienced by a user may include a description of its appearance, its behavior, how a user is permitted to interact with it, and other characteristics. Data used to create an environment of a virtual world (including virtual objects) may include, for example, atmospheric data, terrain data, weather data, temperature data, location data, and other data used to define and/or describe a virtual environment. Additionally, data defining various conditions that govern the operation of a virtual world may include, for example, laws of physics, time, spatial relationships and other data that may be used to define and/or create various conditions that govern the operation of a virtual world (including virtual objects).

The entity, object, condition, characteristic, behavior or other feature of a digital world will be generically referred to herein, unless the context indicates otherwise, as an object (e.g., digital object, virtual object, rendered physical object, etc.). Objects may be any type of animate or inanimate object, including but not limited to, buildings, plants, vehicles, people, animals, creatures, machines, data, video, text, pictures, and other users. Objects may also be defined in a digital world for storing information about items, behaviors, or conditions actually present in the physical world. The data that describes or defines the entity, object or item, or that stores its current state, is generally referred to herein as object data. This data is processed by the servers 3710 or, depending on the implementation, by a gateway 3740 or the device 3720, to instantiate an instance of the object and render the object in an appropriate manner for the user to experience through the device 3720.

Programmers who develop and/or curate a digital world create or define objects, and the conditions under which they are instantiated. However, a digital world can allow for others to create or modify objects. Once an object is instantiated, the state of the object may be permitted to be altered, controlled or manipulated by one or more users experiencing a digital world.

For example, in one embodiment, development, production, and administration of a digital world is generally provided by one or more system administrative programmers. In some embodiments, this may include development, design, and/or execution of story lines, themes, and events in the digital worlds as well as distribution of narratives through various forms of events and media such as, for example, film, digital, network, mobile, augmented reality, and live entertainment. The system administrative programmers may also handle technical administration, moderation, and curation of the digital worlds and user communities associated therewith, as well as other tasks typically performed by network administrative personnel.

Users interact with one or more digital worlds using some type of a local computing device, which is generally designated as the device 3720. Examples of such devices include, but are not limited to, a smartphone, tablet device, heads-up display (HUD), gaming console, or any other device capable of communicating data and providing an interface or display to the user, as well as combinations of such devices. In some embodiments, the device 3720 may include, or communicate with, local peripheral or input/output components such as, for example, a keyboard, mouse, joystick, gaming controller, haptic interface device, motion capture controller, audio equipment, voice equipment, projector system, 3D display, and holographic 3D contact lens.

Figure 38:
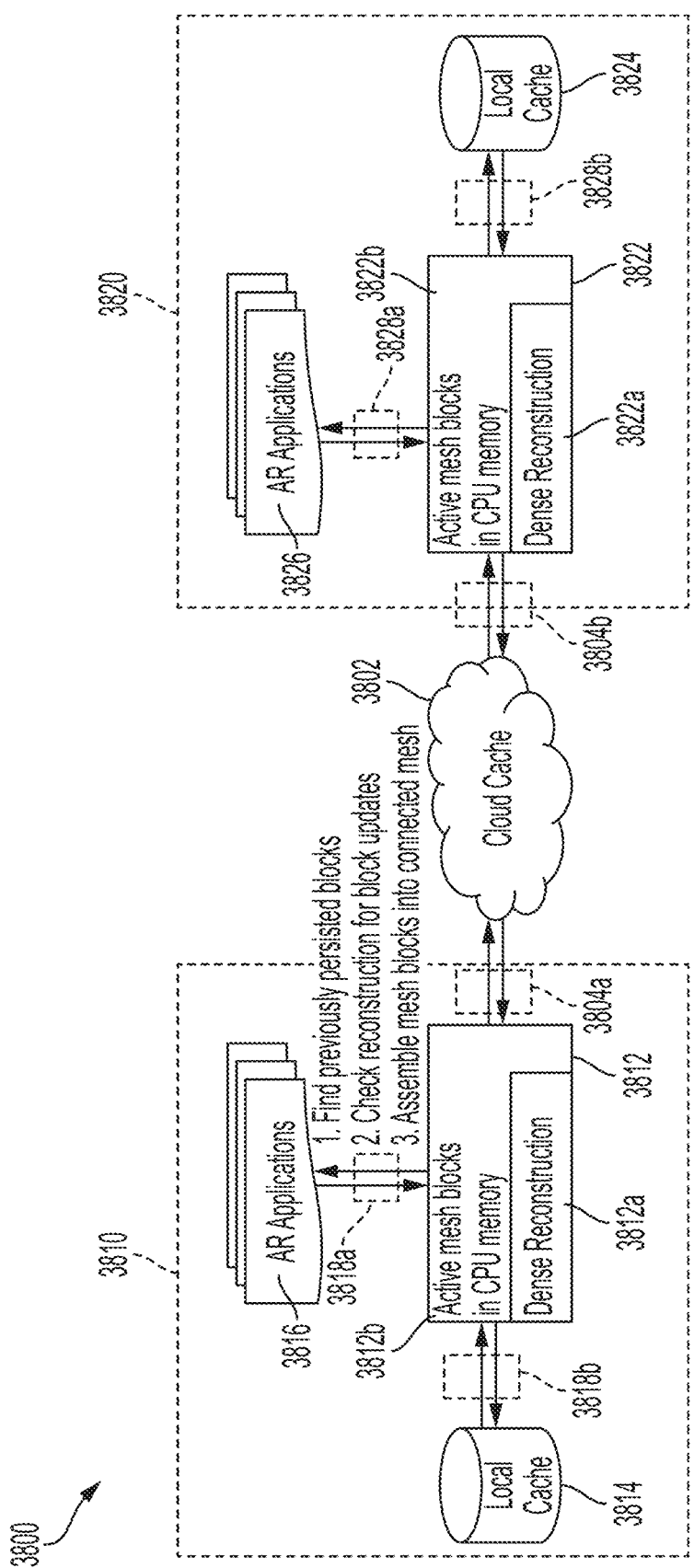
FIG. 38 is a schematic diagram, illustrating interaction of components of the electronic system in FIG. 37, according to some embodiments.

FIG. 38 is a schematic diagram, illustrating an electronic system 3800, according to some embodiments. In some embodiments, the system 3800 may be a part of the system 3700 of FIG. 37. The system 3800 may include a first device 3810 (e.g., a first portable device of a first user) and a second device 3820 (e.g., a second portable device of a second user). The devices 3810 and 3820, for example, may be the devices 3720 and AR display system 80 of FIG. 37. The devices 3810 and 3820 may communicate with a cloud cache 3802 through networks 3804a and 3804b, respectively. In some embodiments, the cloud cache 3802 may be implemented in a memory of one or more servers 3710 of FIG. 37. The networks 3804a and 3804b may be an example of data network 3730 and/or local gateway 3740 of FIG. 37.

The devices 3810 and 3820 may be individual AR systems (e.g., the devices 3720). In some embodiments, the devices 3810 and 3820 may include AR display systems worn by their respective users. In some embodiments, one of the devices 3810 and 3820 may be an AR display system worn by a user; the other may be a smartphone held by a user. Although two devices 3810 and 3820 are illustrated in the example, it should be appreciated that system 3800 may include one or more devices, and the one or more devices may be operating the same type of AR systems or different types of AR systems.

The devices 3810 and 3820 may be portable computing devices. The first device 3810, for example, may include a processor 3812, a local cache 3814, and one or more AR applications 3816. The processor 3812 may include a computing portion 3812a configured to execute computer executable instructions to provide a 3D representation (e.g., 3D reconstruction data) of a portion of a physical world based at least in part on data collected with one or more sensors (e.g., depth sensor 51, world camera 52, and/or inertial measurement units 57 of FIG. 3B).

The computing portion 3812a may represent the physical world as one or more blocks. Each block may represent objects in a different region of the physical world. Each region may have a corresponding volume. In some embodiments, the blocks may represent regions with a same volume. In some embodiments, the blocks may represent regions with different volumes. For example, when the physical world is an office room, the office room may be divided into cubes, each of which may be one cubic foot. One block may include a 3D representation (e.g., 3D reconstruction data) of one cube of the office room. In some embodiments, the office room may be divided into regions with various volumes, and each volume may include a similar amount of 3D information (e.g., 3D reconstruction data) such that the data size of a 3D representation of each region may be similar. That representation may be formatted in such a way as to facilitate further processing, such as occlusion processing, to determine whether a virtual object is occluded by a physical object or physics processing, to determine how a virtual object should move or deform when interacting with physical objects in the physical world. The blocks, for example, may be formatted as mesh blocks, in which features of objects in the physical world, such as corners, become points in the mesh block, or are used as points to create a mesh block. Connections between points in the mesh may indicate groups of points on the same surface of a physical object.

Each block may have one or more versions, with each version containing data (e.g., volumetric 3D reconstruction data such as voxels, and/or mesh that may represent surfaces in a region represented by a respective block) representing its corresponding region based on data from a point in time. The computing portion 3812a may create new versions of a block as additional data becomes available, such as data indicating that objects in the physical world have changed or additional data from which a more accurate representation of the physical world may be created. Additional data may come from sensors on the device (e.g., the device 3810 and/or 3820). In some embodiments, additional data may come from remote sensors, and may be obtained, for example, over a network connection.

The processor 3812 may also include an active memory 3812b, which may be configured to store blocks that are in a device's field of view. In some embodiments, the active memory 3812b may store blocks that are outside a device's field of view. In some embodiments, the active memory 3812b may store blocks adjacent to the blocks that are in the device's field of view. In some embodiments, the active memory 3812b may store blocks that are predicted to be in the device's field of view. In some embodiments, the processor 3812 maintains a block in active memory 3812b if it is within the device's field of view at the time. The field of view may be determined by the imaging area of one or more of the sensors. In some embodiments, the field of view may be determined by the amount of the physical world being presented to a user of the device or that an average user may perceive, without using an AR system. Field of view, therefore, may depend on a location of the user within the physical world as well as the orientation of the wearable components of the device.

The processor 3812 may treat a block as inactive if the block becomes outside the field of view of the device 3810 as the user moves. Inactive blocks may be paged out of active memory to a cache. The cache may be a local cache or a remote cache. In the embodiment of FIG. 38, blocks are first paged out to local cache 3814 through a local gateway 3818b. In some embodiments, the local cache 3814 may be the only cache available.

In some embodiments, there may be a remote cache, accessible over a network. In the illustrated embodiment, the cloud cache (e.g., remote cache) 3802, accessed through the network 3804a, is an example of a remote cache. The processor 3812 may manage when blocks are moved between the local cache 3814 and the cloud cache 3802. For example, when the local cache 3814 is full, the processor 3812 may page out blocks to the cloud cache 3802 through the network 3804a. As blocks in the local cache 3814 are accessible for rendering a scene with lower latency than blocks in a cloud cache, the processor 3812 may select blocks to be paged out of the local cache 3814 using an algorithm intended to keep in the local cache 3814 blocks most likely to become active. Such an algorithm may be based on time of access. In some embodiments, the algorithm may be based on a prediction of motion of the device that will change the field of view of the device.

Applications (e.g., computer games) that render scenes may obtain information representing the portions of the physical world that impact the scene to be rendered. An application 3816 may obtain active blocks from the active memory 3812b through a local gateway 3818a. In some embodiments, the local gateway 3818a may be implemented as an application programming interface (API), such that the processor 3812 implements a "service" for the application 3816. In embodiments in which data of the physical world is represented as a mesh, that service may be a "meshing service." The API may be implemented as a push or a pull interface, or may have attributes of both. In a pull interface, for example, the application 3816 may indicate portions of the physical world for which it requires data and the service may supply data of those portions. In a push system, for example, the service may supply data about portions of the physical world when such data changes or becomes available.

The portions of the physical world about which data is supplied may be limited to portions that an application 3816 has indicated are relevant, such as data within the field of view of the device or data representing portions of the physical world that is within a threshold distance of the field of view of the device. In a pull/push system, the application 3816 may request data for a portion of the physical world and the service may supply data on the requested portion plus any adjacent portions in which data has changed. To limit information to that which has changed, the service may, in addition to maintaining the blocks that described the physical world, track which versions of the blocks were provided to each of the applications 3816. The operations to determine which portion of a representation of a physical world is to be updated and where that update occurs may be partitioned between applications 3816 and a service in any suitable way. Similarly, where updated data is incorporated into a representation of the physical world can be partitioned in any suitable ways.

In some embodiments, a reconstruction service may continually reconstruct a 3D representation of the physical world when the sensors are capturing and updating data. This data may then be provided to applications 3816 that use the 3D reconstruction data to render scenes to depict both the physical world and virtual reality objects positioned in or interacting with objects in the physical world. This data may be provided to applications 3816 through APIs, which may be implemented as a push interface that pushes data to the application 3816 when relevant portions change, or a pull interface that responds to a request from the application 3816 for up-to-date information, or both.

For example, an application 3816 may operate on a mesh representation of a portion of the physical world constituting a 45 degree viewing angle for a distance of 10 meters relative to an origin defined by a current location of a device and a direction in which the device is facing. As this region changes or data indicates physical changes within this region becomes available, a mesh may be computed to represent this area. That mesh may be computed in the application 3816 based on data supplied by the service or may be computed in the service and provided to the application 3816. In either case, the service may store information in the physical world simplifying computation of the mesh. Blocks with zippers, skirts or implemented with other techniques to facilitate "papering over" cracks between adjacent blocks, as described herein, may be used so as to enable processing of only changed portions of the representation of the physical world. The changed portions of the representation of the physical world may then replace corresponding portions in a previous representation of the physical world.

Efficiently accessing representations of the portions of the physical world that are used to generate a mesh to be used by an application 3816 to render a scene to a user may reduce computer resources, making XR systems more readily implemented on portable devices or other devices with limited computing resources and may yield a more realistic user experience, as the XR scene better matches the physical world. Accordingly, instead of or in addition to using blocks with skirts, zippers or other techniques to facilitated papering over cracks between blocks, as described elsewhere herein, an algorithm used to page blocks in and out of the active memory and/or the local cache may be selected to reduce access time to blocks needed to compute a mesh at any given time.

In the exemplary embodiment of FIG. 38, gateway 3818a is a pull interface. When an AR application 3816 requests information about a region of the physical world, but blocks representing that region are not in the active memory 3812b, the processor 3812 may search blocks persisted in the local cache 3814. If the processor 3812 cannot find a block in both the active memory 3812b and the local cache 3814, the processor 3812 may search blocks persisted in the cloud cache 3802. As access to the active memory 3812b is lower latency than access to data in the local cache 3814, which is lower latency than access to data in the cloud cache 3802, overall speed in generating a mesh may be increased by the service implementing a paging algorithms that loads blocks into active memory before they are requested or that moves them from the cloud cache 3802 to local cache 3814 before they are requested.

Similar to the first device 3810, the second device 3820 may include a processor 3822 having a computing portion 3822a and an active memory 3822b, a local cache 3824, and one or more AR applications 3826. The AR applications 3826 may communicate with processor 3822 through a local gateway 3828a. Local cache 3824 may communication with processor 3822 through a local gateway 3828b.

Accordingly, cloud cache 3802 may persist blocks transmitted from both devices 3810 and 3820. The first device 3810 may access blocks captured and transmitted from the second device 3820 in the cloud cache 3802; likewise, the second device 3820 may access blocks captured and transmitted from the first device 3810 in the cloud cache 3802.

The devices 3801 and 3802 are provided as examples of portable AR devices. Any suitable devices, for example, smartphones, may be used and perform similarly.

Figure 39:
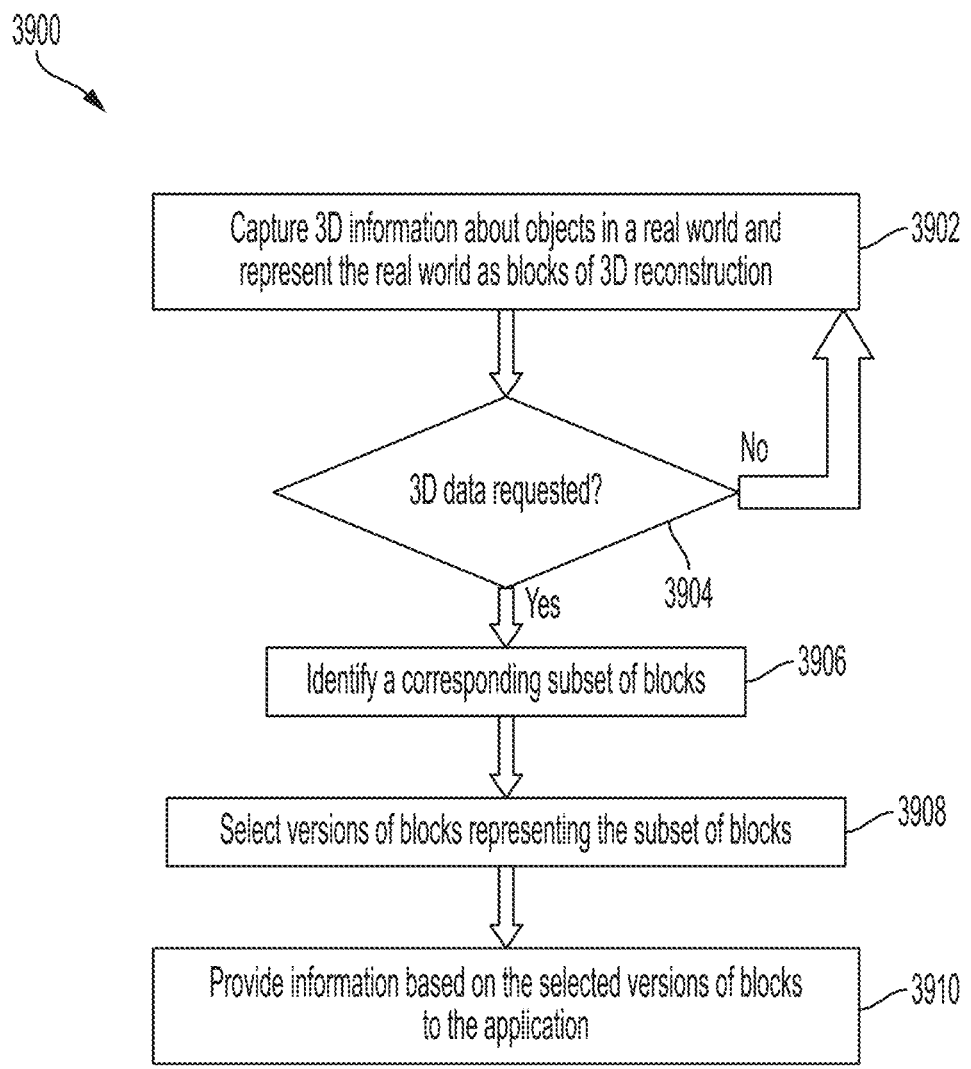
FIG. 39 is a flow chart, illustrating a method of operating the electronic system in FIG. 37, according to some embodiments.

FIG. 39 is a flow chart, illustrating a method 3900 of operating a system (e.g., the system 3700), according to some embodiments. At act 3902, a device may capture 3D information about a physical world including objects in the physical world and represent the physical world as blocks including 3D reconstruction data. In some embodiments, the 3D reconstruction data may be captured by a single system and used to render information on only that system. In some embodiments, the 3D reconstruction data may be captured by multiple systems and may be used to rendering information on any one of the multiple systems or on any other systems. In these embodiments, the 3D reconstruction data from the multiple systems may be combined and made accessible to the multiple systems or any other systems.

For example, several users, each wearing an AR system, may set their devices into the augmented mode while exploring a warehouse. The sensor of each device may be capturing 3D information (e.g., 3D reconstruction data including depth maps, images, and the like) of the warehouse that are in the sensor's file of view including objects in the warehouse (e.g., tables, windows, doors, floors, ceilings, walls). Each device may segment the warehouse into regions having corresponding volumes, and represent individual regions as blocks. The blocks may have versions. Each version of the blocks may have values representing objects in a region of the physical world at a point in time.

When an application requires information about the physical world, versions of blocks to represent that portion of the physical world may be selected and used to generate that information. Though such selection processing may be performed by any suitable processor or distributed across any suitable processors, in accordance with some embodiments that processing may be done locally at the device on which the application requesting the data is executing.

Accordingly, at act 3904, a processor (e.g., processor 3812 or 3822) may respond to a request from an application (e.g., AR application 3816 or 3826) for 3D reconstruction data. In some embodiments, regardless of whether an application requests 3D reconstruction data, the device(s) may continue capturing 3D information including 3D reconstruction data about the physical world and represent the physical world as blocks of 3D reconstruction data. That 3D reconstruction data may be used to create new versions of the blocks.

If an application requests 3D reconstruction data, processing may proceed to act 3906, where the processor may identify a subset of blocks corresponding to a portion of the physical world required to deliver 3D reconstruction data in accordance with the request. The identification of blocks may be based on, for example, data collected by a sensor (e.g., depth sensor 51, world camera 52, inertial measurement units 57, global positioning system, and/or the like). A multi-device system may create a common coordinate frame such that blocks generated by different devices associated with corresponding portions of the physical world may be created using the common coordinate frame without regard to which device provided the 3D reconstruction data to reconstruct the portion of the physical world represented by that block. As one example of how a common coordinate frame may be created, data from devices in the same general vicinity may be routed to the same server or one or more servers for processing. There, data from each device may be initially represented in a device-specific coordinate frame. Once sufficient data from each of the devices has been gathered to identify features in a common portion of the physical world, those features may be correlated, providing the transformation from one device-specific coordinate frame to the others. One of these device-specific coordinate frames may be designated as the common coordinate frame and the transformations between the other coordinate frames, and that coordinate frame may be used to convert data from the device-specific coordinate frames to the coordinate frame designated as the common coordinate frame. Further examples of creating tracking maps and localizing against it are provided in U.S. Patent Application No. 62/928,833, which is hereby incorporated by reference.

Regardless of the specific mechanism by which a common coordinate frame is created, once it is created, 3D reconstruction data requested by the applications generating data for a first device may be based on updates from other devices, if those updates were made after any version made by the first device. Blocks from both the first device and other devices may be merged by using, for example, the common coordinate frame.

The specific processing in act 3906 may depend on the nature of the request. In some embodiments, if the application requesting the 3D reconstruction data maintains its own information about blocks and requests specific blocks, the request for 3D reconstruction data at act 3904 may include reference to specific subsets of blocks and identifying the subset of blocks at act 3906 may include determining a subset of blocks that correspond to the specific subset of blocks. In some embodiments, the request for 3D reconstruction data at act 3904 may include a reference to a field of view of the device the application is executing on and identifying the subset of blocks at act 3906 may include determining a subset of blocks that correspond to the referenced field of view of the device.

Regardless of the manner in which blocks are identified/determined, at act 3908, the processor may select versions of blocks of the subset of blocks. This selection may be based on one or more criteria. The criteria may be based, for example, on the most recent version of the block from the available sources. In the embodiment illustrated, versions of the block may be stored in active memory, a local cache or a remote cache. Act 3908, for example, may include selecting the version in active memory, if it is available, or, if not, selecting the version in local cache, if it is available, or selecting the version from the remote cache, if it is available. If no version of the block is available, then selection may entail generating the block, such as for example, from the data (e.g., 3D reconstruction data) collected with a sensor (e.g., depth sensor 51, world camera 52, and/or inertial measurement units 57). Such an algorithm for block selection may be used in a system that manages, such as a background process, block versions stored in each of the possible locations. An exemplary management process is described below in connection with FIG. 41.

At act 3910, the processor may provide information based on the selected versions of blocks to the application. Processing at act 3910 may entail simply providing the blocks to the application, which may be appropriate when the application uses blocks directly. Where the application receives a mesh, processing at act 3910 may entail generating a mesh from the blocks and/or the subset of blocks, and providing the mesh, or any suitable portion of the mesh, to the application.

Figure 40:
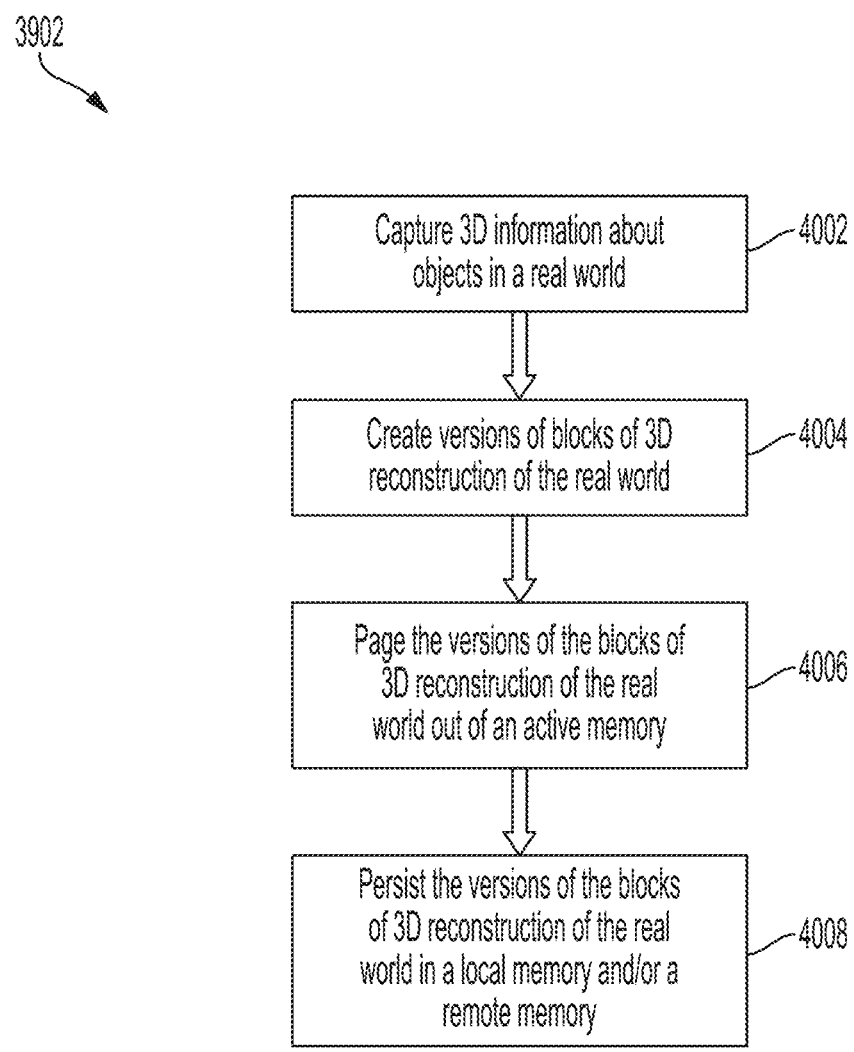
FIG. 40 is a flow chart, illustrating a method of capturing 3D information about objects in a physical world and representing the physical world as blocks of 3D reconstruction in FIG. 39, according to some embodiments.

FIG. 40 is a flow chart, illustrating details capturing 3D information about objects in a physical world and representing the physical world as blocks of 3D reconstruction data, according to some embodiments. In some embodiments, FIG. 40 is a flow chart illustrating details of act 3902 of FIG. 39. At act 4002, one or more sensors (e.g., depth sensor 51, world camera 52, inertial measurement units 57, and/or the like) of a system (e.g., system 3700) capture 3D information about objects in a physical world including objects in the physical world.

At act 4004, a processor (e.g., processor 3812 or 3822) of the system may create versions of blocks including 3D reconstruction data of the physical world based on the 3D information captured by the one or more sensors. In some embodiments, each block may be formatted as one or more portions of a mesh. In some embodiments, other representations of the physical world may be used.

The blocks may have versions, such that each time information about a region of the physical world is captured by any device, a new version of the block may be stored. Each version of the block may have 3D reconstruction data including values representing objects in a region of the physical world at a point in time. In some embodiments, such processing may be performed locally on the device, resulting in new versions of blocks being stored in active memory. In some embodiments, in a multi-device system, similar processing may be performed in a server (e.g., server 3710 of FIG. 37), which may manage versions of the blocks such that the most recent version of each block available in its remote cache is supplied when requested by any device.

Because the blocks represent a physical world, much of which will be unchanging, a new version of a block may not necessarily be created when new 3D reconstruction data representing the corresponding region of the physical world is available. Rather, managing versions of the blocks may entail processing of the 3D reconstruction data representing the physical world to determine whether there have been sufficient changes since the last version of the blocks representing those regions of the physical world to warrant changes. In some embodiments, sufficient changes may be indicated by a magnitude of a block metric becoming above a threshold value since the last version has been stored.

In some embodiments, other criteria may be applied to determine which version of a block is supplied as the current version when a block is requested, such as the version that has the lowest value of a metric indicating completeness or accuracy of the data in the block. Similar processing may be performed on each device, resulting in versions of blocks stored in the local cache on the devices.

One or more techniques may be used to manage the versions of a block available to a service on each device. If, for example, there is an acceptable version of the block already computed, rather than create a new version of the block from the sensor data, a processor may access a previously stored block. Such access may be performed efficiently by managing the storage of versions of the blocks. At act 4006, the processor of the device may page the versions of the blocks of 3D reconstruction data of the physical world out of an active memory (e.g., active memory 3812b or 3822b). The paging may include the processor accessing sensor data so as to continuously update the blocks in active memory/local cache/cloud cache, for example, as a function of the field of view of that device. When the field of view of the device changes, blocks corresponding to the new field of view may be transferred (e.g., paged) from the local cache and/or the cloud cache into the active memory, and blocks corresponding to areas just outside the new field of view (e.g., blocks adjacent to the blocks in the new field of view) may be transferred (e.g., paged) from the active memory and/or the cloud cache to the local cache. For example, at act 4008, the versions of the blocks paged out by the processor may be persisted in a local memory (e.g., local cache 3814 or 3824) and/or a remote memory (e.g., cloud cache 3802). In some embodiments, as each new version of a block is created, for example, on a device, that version may be sent to remote memory such that other users can access it.

Figure 41:
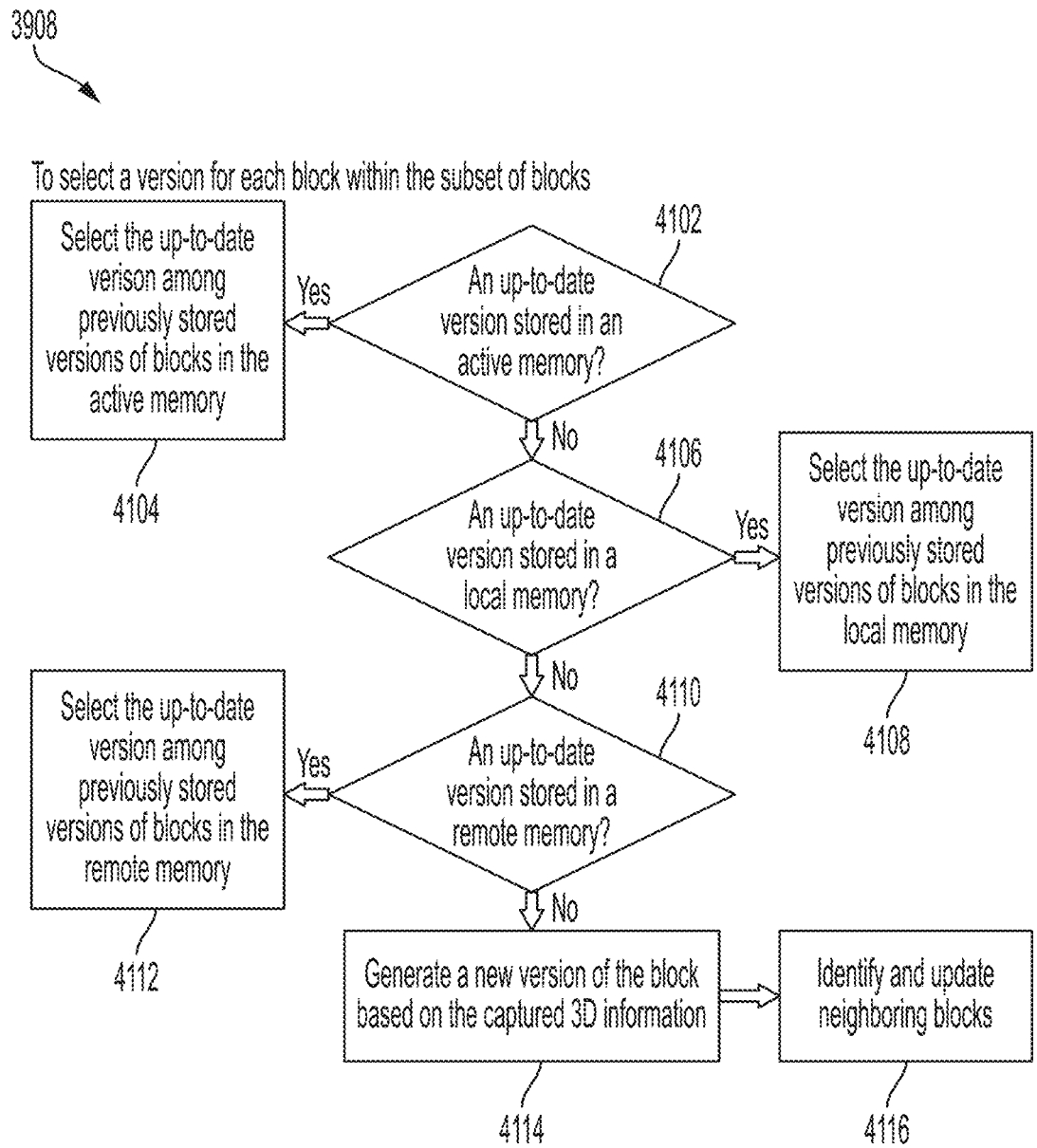
FIG. 41 is a flow chart, illustrating a method of selecting versions of blocks representing the subset of blocks in FIG. 39, according to some embodiments.

FIG. 41 is a flow chart illustrating an exemplary process for performing selecting versions of blocks representing a subset of blocks, according to some embodiments. In some embodiments, FIG. 41 is a flow chart illustrating details of act 3908 of FIG. 39. For selecting a version of each block within the subset of blocks, at act 4102, a processor (e.g., processor 3812 or 3822) may query whether an up-to-date version is stored in active memory (e.g., active memory 3812b or 3822b). In some embodiments, whether a version is up-to-date may be determined by comparing a value attached to the version (e.g., a geometry change magnitude, a timestamp, and the like) with data collected with a sensor (e.g., depth sensor 51, world camera 52, and/or inertial measurement units 57). In some embodiments, a comparison between current sensor data and the version of the block stored in active memory may be made. Based on a degree of difference, which may represent a changes in the physical world or quality of the version in active memory, for example, the version in active memory may be deemed up-to-date.

If an up-to-date version is stored in the active memory, processing proceeds to act 4104, where the up-to-date version is selected. If no up-to-date version is stored in the active memory, processing proceeds to act 4106, where the processor may query whether an up-to-date version is stored in a local memory (e.g., local cache 3814 or 3824). That query may be performed using criteria described above as in connection with act 4102, or any other suitable criteria. If an up-to-date version is stored in the local memory, at act 4108, the up-to-date version is selected.

If no up-to-date version is stored in the local memory, at act 4110, the processor may query whether an up-to-date version is stored in a remote memory (e.g., cloud cache 3802). That query also may be performed using criteria described above as in connection with act 4102, or any other suitable criteria. If an up-to-date version is stored in the remote memory, at act 4112, the up-to-date version is selected.

If no up-to-date version is stored in the remote memory, processing may proceed to act 4114 where the processor of the device may generate a new version of the block based on 3D information (e.g., the 3D reconstruction data) captured by the sensors. In some embodiments, at act 4116, the processor may identify neighboring blocks of the block with a new version, and update the identified neighboring blocks according to the new version of the block.

Figure 42:
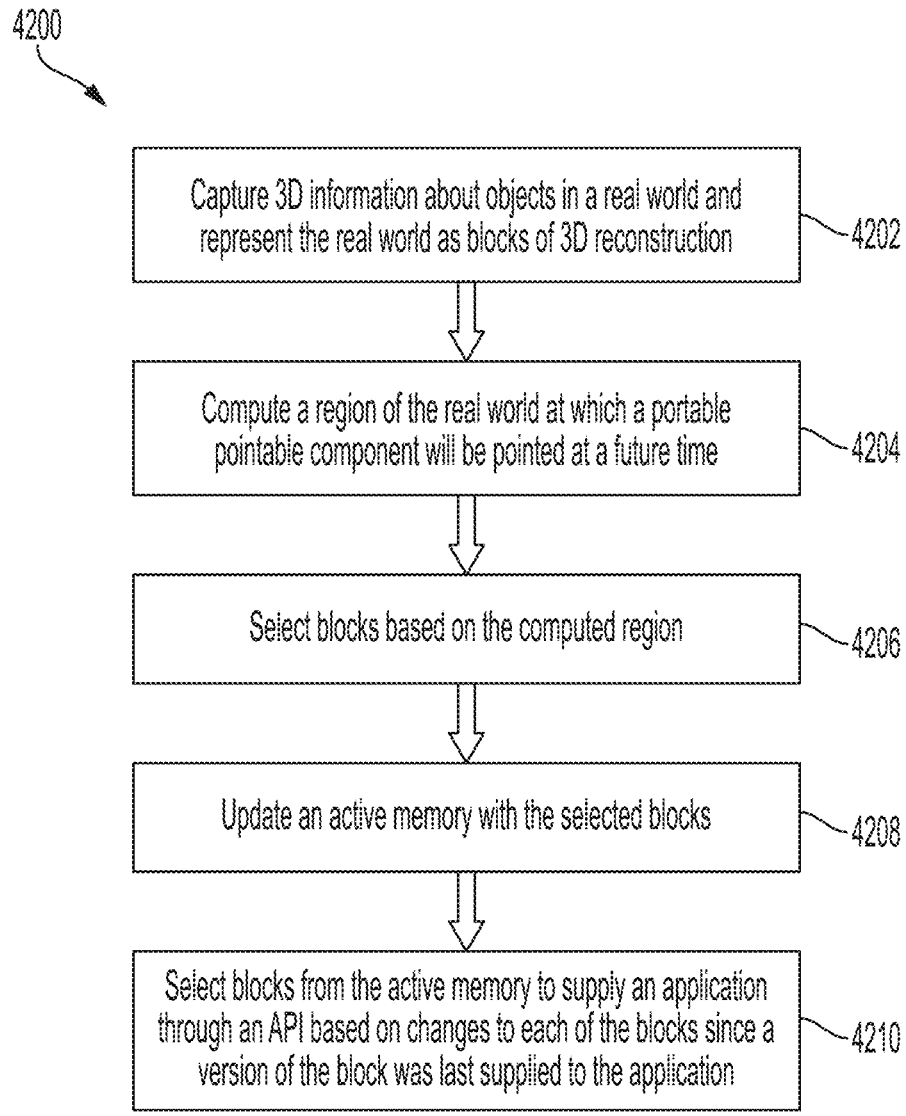
FIG. 42 is a flow chart, illustrating a method of operating the electronic system in FIG. 37, according to some embodiments.

FIG. 42 is a flow chart, illustrating a method 4200 of operating a system, according to some embodiments. In the method 4200, rather than pulling blocks into active memory and/or local cache when the device requires those blocks, paging may be managed based on projections of the field of view of the device based on device motion.

Similar to act 3902, at act 4202, sensors on a device may capture 3D information about a physical world including objects in the physical world and represent the physical world as blocks including 3D reconstruction data.

At act 4204, a processor (e.g., processor 3812 or 3822) may compute, based at least in part on an output of the sensor, a region of the physical world at which a portable pointable component (e.g., depth sensor 51, world camera 52, and/or inertial measurement units 57) will be pointed at a future time. In some embodiments, the processor may compute based on motion data from inertial sensors or analysis results of captured images. In a simple calculation, for example, to get a fast result, the processor may compute based on translation and rotation of the head of a user. In applying more comprehensive algorithms, the processor may compute based on objects in the scene. For example, the algorithms may consider a user walking towards a wall or table is unlikely to walk through the wall or table.

At act 4206, the processor may select blocks based on the computed region. At act 4208, the processor may update an active memory (e.g., active memory 3812b or 3822b) with the selected blocks. In some embodiments, the processor may select blocks based on the flow chart of FIG. 41. At act 4210, the processor may select blocks from the active memory to supply an application (e.g., application 3816 or 3826), for example, through an API, based on changes to each of the blocks since a version of the block was last supplied to the application.

In some embodiments, at act 4206, the processor may request the selected blocks from a remote memory (e.g., cloud cache 3802), and update information stored in a local cache (e.g., 3814 or 3824) such that the local cache stores the selected blocks. Act 4206 may be similar to act 3908 described in FIG. 39.

In some embodiments, blocks may persist across shutdown/startup cycles, sleep/wake cycles, and various other scenarios. Blocks may be persisted by, upon transition to an inactive operation status of a portable user device used in an XR system, ensuring that the blocks are stored in a memory that will retain the blocks until a user starts a new session for the device. When a new session starts and the device transitions to an active operation status, the persisted information may be selectively used. For example, blocks persisted in the various memories (e.g., active memory, local memory, remote memory) at shutdown/sleep time (e.g., a time at which a device including the active memory/the local memory is shutdown/powered-down/put to sleep) may remain in the respective memories and thus be available at startup/wake time (e.g., a time at which the device including the active memory/the local memory is started-up/powered-up/woken). Such an approach may be used, for example, where the memories storing blocks are non-volatile and/or remain powered on sufficiently to retain information after an event that stops or pauses operation of the device. Alternatively or additionally, memory storing blocks may be copied to such a memory as part of a transition to a state in which device operation is stopped or paused and then copied back as part of the transition back to an operational state.

Persisting blocks across events that stop or pause operation of a device enables, for example, blocks persisted at an end of a previous session to be available at a beginning of a current session. In some embodiments, persisted blocks from a prior session may be made available for rapid use in a new session even if not retained in or returned to the same memory in which they were used in the prior session. For example, at shutdown time, blocks in active memory may be transferred to local memory and/or remote memory where they are persisted, and blocks in local memory may be transferred to remote memory where they are persisted. After a new session starts, blocks may be selectively moved to active memory from either local or remote memory. Likewise, blocks may be selectively moved to local memory. For example, techniques as described herein may be used to determine which blocks are moved to active memory or local memory from remote memory based on the current or projected field of view of a user of a device.

One or more techniques may be used to determine whether persisted blocks are used in a new session. In some embodiments, for example, blocks may have metadata associated with them that may be used in determining whether a block is used. As described above, a device may track its location with respect to the physical world, which may enable the device to localize with respect to a coordinate system shared by multiple devices. Blocks may have associated metadata, including location information that may be compared with location of the device upon starting a new session. Persisted blocks that represent portions of the physical world in the vicinity of the device may be used in that new session.

Other metadata, such as a version of the block, may be used to determine whether the block is still current. In some embodiments, a device may communicate with a cloud service that shares blocks with multiple devices to determine the latest version of a block representing a portion of the physical world. If the device has persisted the latest version of the block, it may continue to use it. Alternatively or additionally, a time stamp, reflecting the time of creation of the block, may be used. For example, a persisted block may be used when its time stamp is less than a threshold amount of time prior to the current time.

In some embodiments, a device may determine whether to use a persisted block based on a comparison between the persisted block and current sensor data about the physical world. For example, at startup time, blocks persisted in the various memories may be used only after the real world is recognized. For example, sensors on a device may capture 3D information about a physical world including objects in the physical world and represent the physical world as block including 3D reconstruction data. The device may compare the captured block with blocks persisted in active memory, local memory, and/or remote memory, and, responsive to a match, retrieve matched blocks from active memory, local memory, and/or remote memory for use.

Alternatively or additionally, persisted blocks may be compared to the physical world around the device upon startup without creating a mesh. For example, a surface in the physical world may be detected with a sensor, such as a depth sensor, and compared to a surface indicated by a mesh in a block corresponding to the location in the physical world at which the surface is detected. A persisted block may be used if the error between the sensed locations of one or more surfaces and surfaces indicated by a mesh of the persisted block.

Blocks persisted on a device that are determined to be not suitable for use in a new session may be deleted or otherwise processed so that they are not used.

Block-based processing as described above may be based on blocks that allow portions of a 3D representation to be processed separately and then combined with other blocks. In accordance with some embodiments, the blocks may be formatted such that, when a block is changed, the changed representation largely or wholly maintains the values of the block at the interfaces to other blocks. Such processing enables the changed version of a block to be used with versions of adjacent blocks that were not changed, without creating unacceptable artifacts in a scene rendered based on changed and unchanged blocks. FIGS. 43A-48 illustrate such blocks.

A 3D representation of a physical world may be provided by a volumetric 3D reconstruction, which may create a 3D reconstruction data hierarchy of 3D information of the physical world captured by a sensor. For example, the sensor may be a depth camera, which may capture 3D information of the physical world, for example, a stream of depth images with respective poses of the depth camera (i.e. camera poses). The 3D information of the physical world may be processed into a voxel grid. Each voxel may contain one or more signed distance functions (SDFs) that describe whether the voxel lies inside or outside the geometries of objects in the physical world. The voxels may be grouped into "bricks." Each brick may include multiple voxels, for example, in cubic volumes such as $8^3$ voxels. The bricks may be further grouped into "tiles." Each tile may include multiple bricks.

In some embodiments, the voxel grid may be mapped to conform to a memory structure. A tile may correspond to a memory page of a storage medium. The size of a tile may be variable, for example, depending on the size of a memory page of a storage medium in use. Accordingly, the 3D reconstruction data may be transmitted among storage mediums (e.g., an active memory and/or local memory of a device, and/or a remote memory in a cloud), on the basis of tiles. In some embodiments, one or more tiles may be processed to generate a block. A block may be updated, for example, when at least one voxel in the one or more tiles changes.

A block may not necessarily be limited to corresponding to tiles. In some embodiments, a block may be generated from one or more bricks, one or more voxels, or one or more SDF samples, and the like. A block may be any suitable partition of a physical world. A block may not necessarily limited to be in the format of a mesh. A block may be in any suitable format of 3D reconstruction data.

FIG. 43A-D illustrate an exemplary physical world 4300 represented by mesh blocks 4302. Each mesh block 4302 may be extracted from voxels 4304 corresponding to a predetermined volume of a mesh block. In the illustrated example, each block may be the output of a cubed region (e.g., 1 m$^3$) of voxels in the low level reconstruction model. Each mesh block 4302 may contain a part of the world mesh and may be treated independently. This may enable scalability with fast local updates as a result of some blocks changed when exploring new areas or things moved in the environment. In the illustrated example, there are no changes to the mesh blocks except for a mesh block 4306, which has a new object 4308 placed in front of the existing surface 4310. In this case, the AR system needs update only the mesh block 4306, which could save significant computing power compared to arbitrarily update the whole mesh for a world.

Figure 43A:
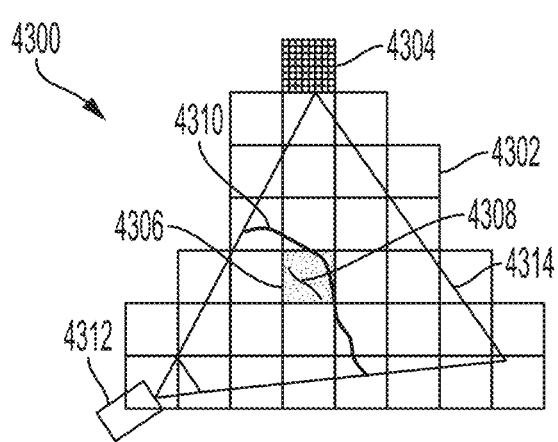
FIG. 43A is a simplified schematic diagram illustrating an update being detected in a portion of a physical world represented by mesh blocks, according to some embodiments.
Figure 43B:
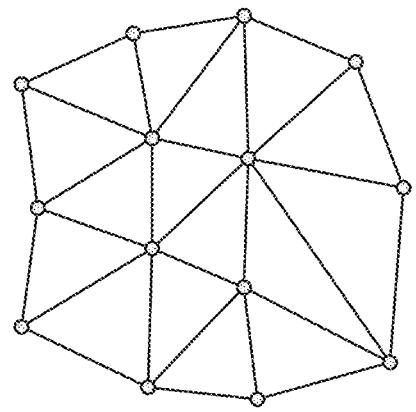
FIG. 43B is a simplified schematic diagram illustrating a mesh block, according to some embodiments.

FIG. 43B is a simplified schematic diagram illustrating a mesh block, according to some embodiments. In the illustrated example, a mesh block internally may have a fully connected mesh, which means that vertices are shared by multiple triangles.

Figure 43C:
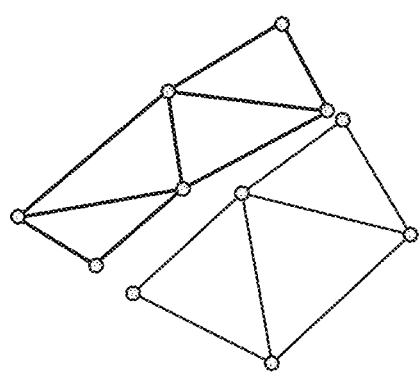
FIG. 43C is a simplified schematic diagram illustrating a crack at edges of two adjacent mesh blocks, according to some embodiments.
Figure 43D:
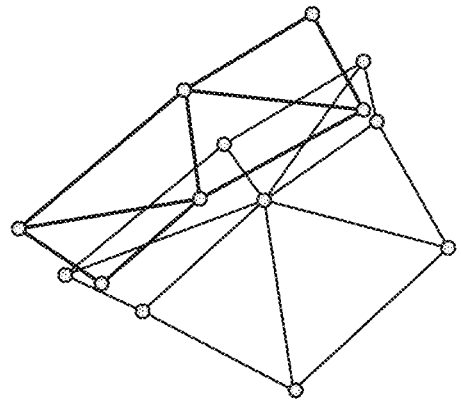
FIG. 43D is a simplified schematic diagram illustrating the crack in FIG. 43C being papered over by implementing mesh skirts that overlap an adjacent mesh blocks, according to some embodiments.

On the other hand, individual mesh blocks may be independent meshes, which are not connected. FIG. 43C is a simplified schematic diagram illustrating a crack, which may exist at edges of two adjacent mesh blocks, according to some embodiments. FIG. 44D is a simplified schematic diagram illustrating the crack in FIG. 43C being papered over by implementing mesh skirts that overlap an adjacent mesh blocks, according to some embodiments.

Figure 44:
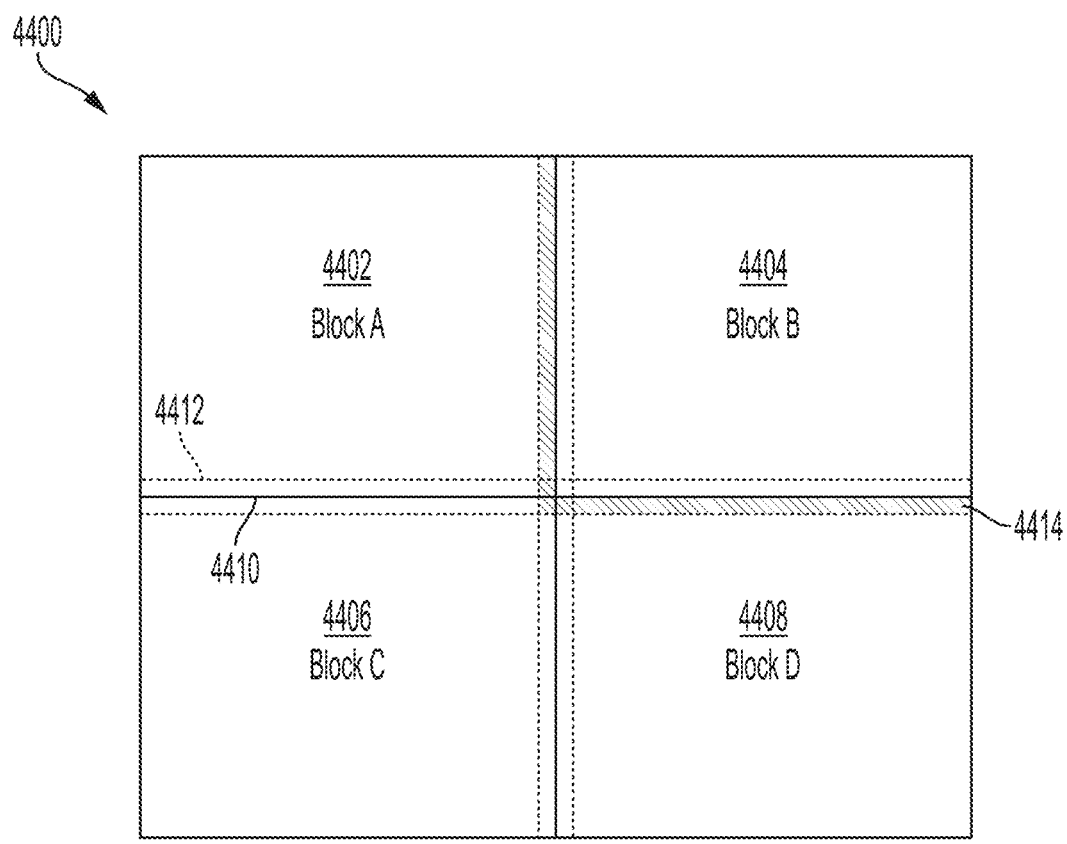
FIG. 44 is a schematic diagram, illustrating a 2D representation of a portion of a physical world by four blocks, according to some embodiments.

FIG. 44 is a schematic diagram, illustrating in 2D segmenting a representation 4400 of a portion of a physical world, according to some embodiments. The 2D representation 4400 may be obtained by connecting a set of four blocks: Blocks A-D. The representation 4400 may be segmented into four blocks: Blocks 4402, 4404, 4406, and 4408, for example, illustrated by solid lines 4410. In some embodiments, Blocks 4402, 4404, 4406, and 4408 may be designated as Blocks A-D respectively. Applications may desire 3D reconstruction data in the format of meshes for further processing such as occlusion testing, and generating physical effects in physical engines. In some embodiments, the set of blocks may be in the format of meshes, which may be generated by a device (e.g., the devices 3810, 3820), a network (e.g., a cloud that includes cloud cache 3802), or a discrete application (e.g., the applications 3816, 3826).

In some embodiments, regions at the boundaries of Blocks 4402, 4404, 4406, and 4408 may be skirts, for example, illustrated by dashed lines 4412. In some embodiments, each of Blocks A-D may include a block and a corresponding skirt. For example, Block B may include Block 4404 and a skirt 4414 that overlaps with boundary parts of Block B's neighboring blocks A, C, and D such that cracks between the blocks may be papered over when the blocks are connected into a global mesh. Blocks A, C, and D may also include corresponding skirts. Accordingly before returning blocks including 3D reconstruction data to an application, a processor may paper over any cracks between the blocks.

In some embodiments, the global mesh may be a topologically-connected global mesh. For example, adjacent blocks in the set of blocks may share mesh vertices at block boundaries such as lines 4410. In some embodiments, the global mesh may be visually seamless although topologically-disconnected using any suitable techniques such as skirts and zippers.

Although a method employing skirts is illustrated, other method may be used to enable a changed block to be combined with an unchanged adjacent block, such as zippers. Although in the illustrated example, a portion of a physical world is represented by four 2D blocks, it should be appreciated that a portion of a physical world may be represented by any suitable number of 2D and/or 3D blocks, for example, two, three, five, six or more. Each block may correspond to a space in the physical world. In some embodiments, blocks in a 2D and/or 3D representation of a portion of a physical world may correspond to spaces of the same size (e.g., area/volume) in the physical world. In some embodiments, blocks in a 2D and/or 3D representation of a portion of a physical world may correspond to spaces of different sizes in the physical world.

Figure 45:
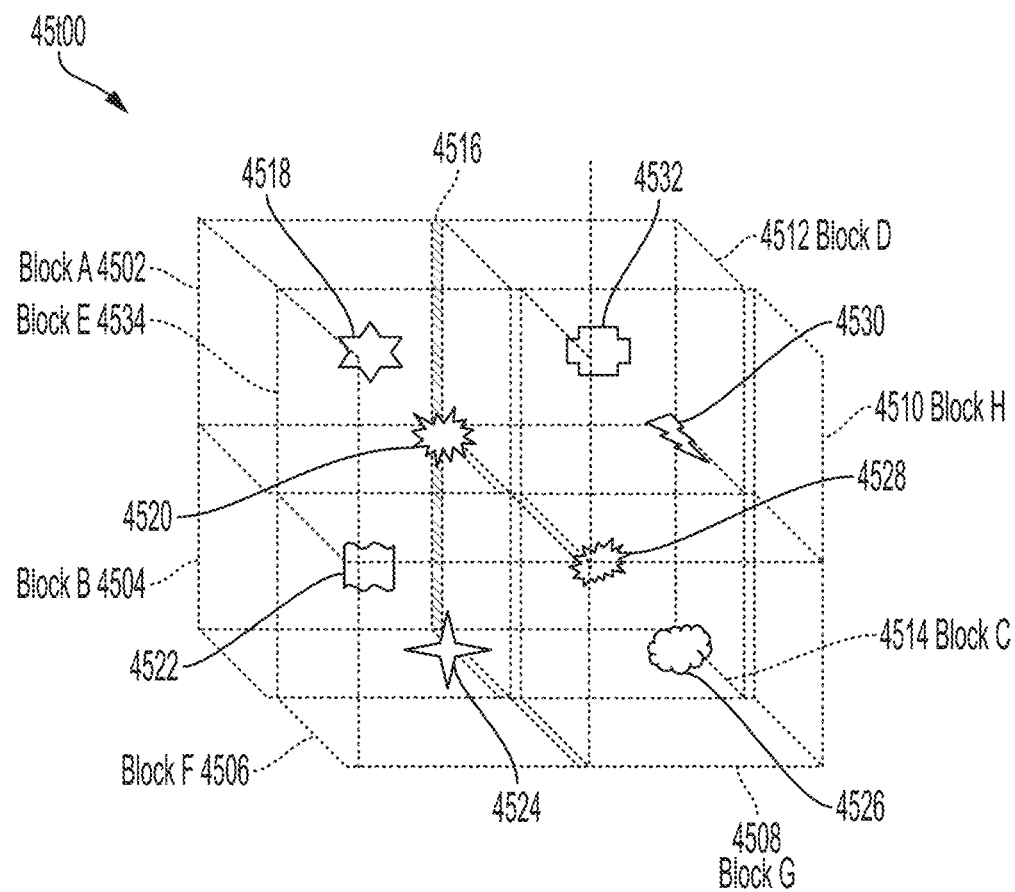
FIG. 45 is a schematic diagram, illustrating a 3D representation of a portion of a physical world by eight blocks, according to some embodiments.

FIG. 45 is a schematic diagram, illustrating a 3D representation 4500 of a portion of a physical world, according to some embodiments. Similar to the 2D representation 4400, 3D representation 4500 may be obtained by connecting eight blocks: Blocks A-H. In some embodiments, Blocks A-H may be exclusive to each other, for example, having no overlapped region. In some embodiments, Blocks A-H may have regions overlapping a neighboring block (e.g., skirts 4516). In some embodiments, each of Blocks A-H may have versions. Each version of a block may have values representing objects in a region of the physical world at a point in time. In the illustrated example, 3D representation 4500 includes versions of Blocks A-H: version 4502 of Block A, version 4504 of Block B, version 4514 of Block C, version 4512 of Block D, version 4534 of Block E, version 4506 of Block F, version 4508 of Block G, and version 4510 of Block H. Version 4502 of Block A may include value 4518; version 4504 of Block B may include value 4522; version 4514 of Block C may include value 4528; version 4512 of Block D may include value 4532; version 4534 of Block E may include value 4520; version 4506 may include value 4524; version 4508 may include value 4526; and version 4510 may include value 4530.

Figure 46:
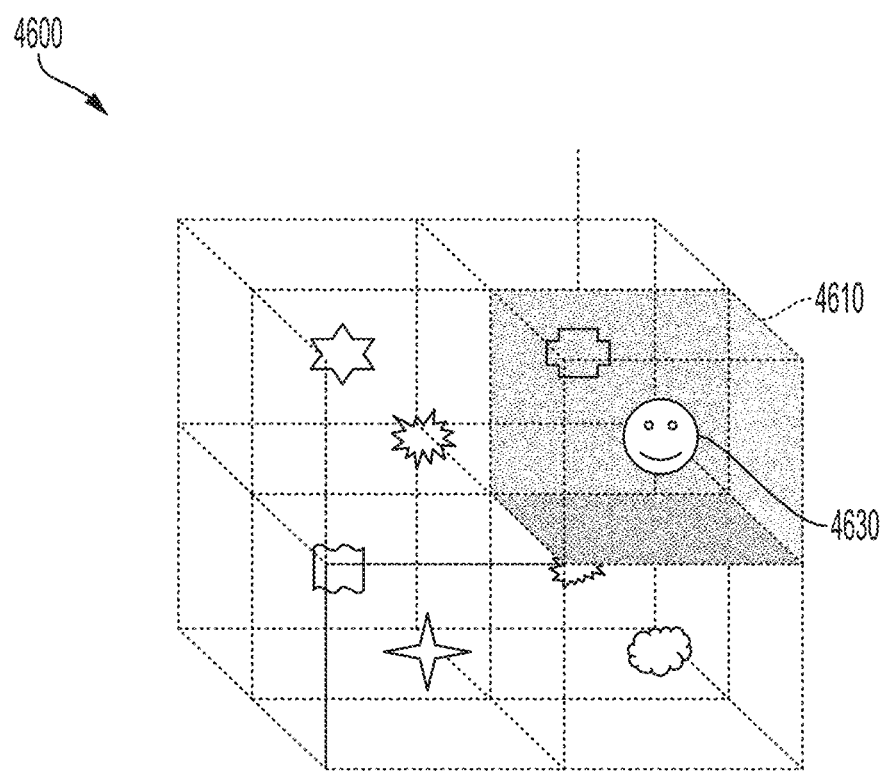
FIG. 46 is a schematic diagram, illustrating a 3D representation of a portion of a physical world obtained by updating the 3D representation in FIG. 45, according to some embodiments.

FIG. 46 is a schematic diagram, illustrating a 3D representation 4600 of a portion of a physical world obtained by updating the 3D representation 4500, according to some embodiments. Compared to 3D representation 4500, 3D representation 4600 may have a new version 4610 of Block H that includes information 4630. Information 4630 may be different from information 4530. For example, a first device may persist version 4510 of Block H in a remote memory. Version 4510 of Block H may include information 4530 corresponding to a table with an empty surface. After the first device leaves the area (e.g., the field of view of the first device no longer includes Block H), a second device may place a virtual and/or physical box on the table's surface and then persist version 4610 of Block H in the remote memory. Version 4610 of Block H may include information 4630 corresponding to the table with the virtual and/or physical box. If the first device returns, the first device may be capable of selecting version 4610 of Block H to view from available versions of Block H including version 4610 and version 4510 of Block H.

Figure 47:
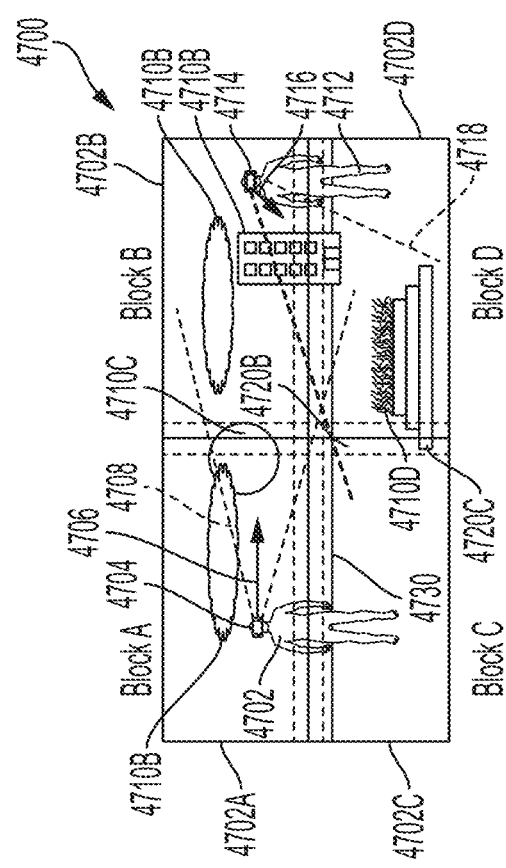
FIG. 47 is a schematic diagram, illustrating an example of an augmented world viewable by first and second users wearing AR display systems, according to some embodiments.

FIG. 47 is a schematic diagram, illustrating an augmented world 4700 viewable by a first device 4702 (e.g., device 3810) and a second device 4712 (e.g., device 3820). First and second devices may include AR display systems 4704 and 4714 (e.g., AR display system 80) operating in an augmented mode. An augmented world 4700 may be obtained by connecting four blocks: Blocks A-D. In the illustrated example, the augmented world 4700 includes versions of Blocks A-D: version 4702A of Block A, version 4702B of Block B, version 4702C of Block C, and version 4702D of Block D. The first device 4702 may be looking at a first direction 4706 and have a first field of view (FOV) 4708. In the illustrated example, the first FOV includes version 4702B of Block B and version 4702D of Block D. A processor (e.g., 3812) of the second device 4704 may include computer-executable instructions for identifying Blocks B and D corresponding to the first FOV and selecting version 4702B of Block B and version 4702D of Block D. The second device 4714 may be looking at a second direction 4716 and have a second FOV 4718. In the illustrated example, the second FOV includes version 4702C of Block C and version 4702D of Block D. A processor (e.g., 3822) of the second device 4714 may include computer-executable instructions for identifying Blocks C and D corresponding to the second FOV and selecting version 4702C of Block C and version 4702D of Block D.

Figure 48:
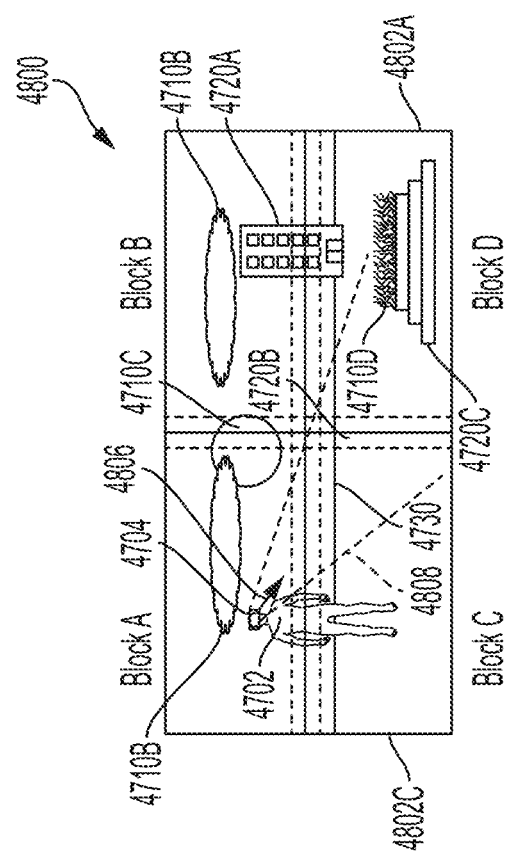
FIG. 48 is a schematic diagram, illustrating an example of an augmented world obtained by updating the augmented world of FIG. 47 with new versions of blocks, according to some embodiments.

FIG. 48 is a schematic diagram, illustrating an augmented world 4800 obtained by updating augmented world 4700 with new versions of blocks, according to some embodiments. Compared to the augmented world 4700, the augmented world 4800 may include version 4802C of Block C different from version 4702C, and version 4802D of Block D different from version 4702D. The first device 4702 may be looking at a third direction 4806 and have a third FOV 4808. In the illustrated example, the third FOV includes version 4802C of Block C and version 4802D of Block D. The processor of the first device 4702 may include computer-executable instructions for determining which of versions 4702C, 4802C, 4702D, and 4802D to provide to an application based on, for example, the change of FOV and/or information collected with a sensor of the first device 4702. In some embodiments, the processor of the first device 4702 may include computer executable instructions for generating version 4802C of Block C and version 4802D of Block D when there are no corresponding up-to-date versions of Blocks C and D in a local memory (e.g., local cache 3814, 3824) or a remote memory (e.g., cloud cache 3802). In some embodiments, the first device 4702 may be capable of estimating changes in its FOV (e.g., from the first FOV 4708 to the third FOV 4808, selecting Block C based on the estimation, and storing versions of Block C to a memory closer to the processor (e.g., moving versions of Block C from a remote memory to a local cache, or from a local cache to an active memory).

Method of Occlusion Rendering Using Raycast and Live Depth

The realism with which AR and MR scenes are presented to a user may be enhanced by providing occlusion data to applications generating such scenes, where the occlusion data is derived from a combination of one or more depth data sources. The occlusion data may represent surfaces of physical objects in the scene and may be formatted in any suitable way, such as by depth data indicating a distance from a point of view from which the scene is to be rendered and a surface. For example, use components 164 may receive occlusion data from perception module 160 (FIG. 6).

However, in some embodiments, one data source may be one or more depth cameras that directly sense and capture position between the depth cameras and real objects in a physical world. Data from depth cameras may be provided directly to use components 164 or may be provided indirectly, such as through perception module 160. The one or more depth cameras may provide an immediate view of the physical world at frame rate that is sufficiently high to capture changes in the physical world, but low enough not to burden processing. In some embodiments, the frame rate may be 5 frames per second, 10 frames per second, 12 frames per second, 15 frames per second, 20 frames per second, 24 frames per second, 30 frames per second, and the like. In some embodiments, the frame rate may be less than 5 frames per second. In some embodiments, the frame rate may be more than 30 frames per second. Accordingly, in some embodiments, the frame rate may be in the range of 1-5 frames per second, 5-10 frames per second, 10-15 frames per second, 15-20 frames per second, or 20-30 frames per second, and the like.

A second source of data may be stereoscopic visual cameras that may capture visual representations of the physical world. Depth data from the depth camera and/or image data from the visual camera may be processed to extract points representing the real objects in the physical world. Images from the visual camera, such as a stereoscopic camera, may be processed to compute a three-dimensional (3D) reconstruction of the physical world. In some embodiments, depth data may be generated from the images from the visual cameras, for example, using deep learning techniques. Some or all of the 3D reconstruction may be computed before occlusion data and may be stored in memory. In some embodiments, the 3D reconstruction may be maintained in computer memory by a process independent of any process that generates depth information for occlusion processing, which may access that stored 3D reconstruction as needed. In some embodiments, the 3D reconstruction may be maintained in memory, and portions of it may be updated in response to an indication, for example, computed based on depth information, that there was a change in the physical world corresponding to the portion of the 3D reconstruction. In some embodiments, a second data source may be implemented by a raycast into the 3D reconstruction of the physical world to obtain low-level 3D reconstruction data (e.g., a raycast point cloud). With a raycast, the data from the second data source may be selected to fill any holes in the occlusion data, enabling the data from the two (or more) sources to be integrated.

In accordance with some embodiments, the depth data and/or the image data and/or the low-level data of the 3D reconstruction may be oriented with respect to a user of an AR or MR system. Such an orientation may be achieved, for example, by using data from sensors worn by the user. The sensors may be worn, for example, on a head-mounted display device/unit.

In a system in which the occlusion data may be generated from more than one depth data source, the system may include a filter that identifies which portions of a 3D region are represented by data from each of multiple depth data sources. The filter may apply one or more criteria to identify portions of the region, for which data from a second data source is to be collected. These criteria may be indications of the reliability of the depth data. Another criteria may be changes detected in the portion of the region since depth data was collected.

Selecting between multiple depth data sources to provide data for different portions of a representation of a 3D region may reduce processing time. For example, when less processing is required to derive occlusion data from data collected with the first data source than with a second data source, the selection may favor data from the first data source, but use data from the second source when data from the first source is not available or acceptable. As a specific example, the first data source may be a depth camera and the second data source may be a stereoscopic visual camera. The data from the stereoscopic camera may be formatted as a 3D reconstruction of the physical world. In some embodiments, the 3D reconstruction may be computed before occlusion data is required. Alternatively, or additionally, the 3D reconstruction may be re-computed when occlusion data is required. In some embodiments, criteria may be applied to determine whether the 3D reconstruction should be recomputed.

In some embodiments, this occlusion data is computed by a service, providing occlusion data through an application programming interface (API) to applications executing on a computing device that will render XR scenes. The service may execute on the same computing device as the applications or may execute on a remote computer. The service may include one or more of the components discussed herein, such as the filter for data from a first data source, and/or an engine to selectively fetch data from a second data source based on the filtered data from the first data source. The service may also include a component to combine the filtered data from the first data source and the selected data from the second data source to generate occlusion data.

The occlusion data may be formatted in any suitable way that represents surfaces in the physical world. For example, the occlusion data may be formatted as depth buffers of surfaces, storing data identifying locations of the surfaces in the physical world. This occlusion data may then be used in any suitable way. In some embodiments, the occlusion data may be provided to one or more applications wanting to have virtual objects occluded by real objects. In some embodiments, the occlusion data may be formatted as a depth filter created by the system for an application requesting an occlusion service for occlusion data for rendering virtual objects at one or more locations. The depth filter may identify locations for which the application should not render image information for the virtual object because virtual objects in those locations would be occluded by surfaces in the physical world. It should be appreciated that "occlusion data" may be in a suitable format to provide information about surfaces in the physical world and need not be used for occlusion processing. In some embodiments, occlusion data may be used in any application performing processing based on a representation of surfaces in a scene of the physical world.

Approaches as described herein provide occlusion data with less latency and/or using lower computing resources than in a conventional AR and MR system in which an application uses mesh data to perform occlusion processing. The mesh data may be obtained by processing geometrical data extracted by an image sensor with multiple time or cost intensive steps including, marching cube algorithms, mesh simplification, and applying triangle count limits. The mesh data may take from hundreds of milliseconds to seconds to calculate, and a delay in having an up-to-date mesh may lead to visible artifacts when the environment is dynamically changing and an application renders a scene using an outdated mesh. These artifacts manifest, for example, as virtual content appearing superimposed on top of real objects when the virtual content is supposed to be rendered behind the real object, which breaks the perception/feeling of immersion for the user of such an application and provides the user with incorrect cues for 3D depth perception.

For an application using a mesh for occlusion processing to have an up-to-date mesh, the application has to either continuously query for meshes (causing significant continuous processing to occur) or make use of a mechanism to determine if there have been changes and then query for a new mesh (which would reduce the overall processing, but still have high latency between changes in the physical world and when a mesh reflecting those changes arrived at the application).

By making use of low-level data of 3D reconstruction data (e.g., point clouds) and live depth data directly for occlusion instead of a mesh, it is possible to decrease the latency between change occurring in the environment and being reflected in occlusion data, maintaining a closer synchronization with the physical world and hence higher perceived visual quality.

In some embodiments, real-time depth maps of a physical environment may be obtained from depth sensors (e.g., depth cameras). Each pixel in a depth map may correspond to a discrete distance measurement captured from a 3D point in the environment. In some embodiments, these depth cameras may provide depth maps including a set of points at real-time rates. However, depth maps may have holes, which may result from the depth camera being unable to acquire sensor data representing a region or acquiring incorrect or unreliable data representing a region. In some embodiments, if the depth sensor uses infrared (IR) light, the holes may result, for example, from materials or structures in the physical environment that do not reflect IR light very well or at all. In some embodiments, the holes may result, for example, from very thin structures or surfaces at glancing incidence angles that do not reflect light toward the depth sensor. The depth sensor may also experience motion blur when moving fast, which may also lead to missing data. Further, "holes" in the depth map represent regions of the depth map that for any other reason are not suitable for use in occlusion processing. Such holes may be detected using any suitable processing, such as processing the depth map to detect lack of connectivity between points or regions in the depth map. As another example, holes may be detected using processing that computes quality metrics for regions of the depth map and processing regions with low quality metrics as holes. One such metric may be image to image variation for pixels in a depth map representing the same location in the physical world. Pixels with such a variation exceeding a threshold may be classified as a hole. In some embodiments, holes may be identified by pixels meeting predefined statistical criteria for a cluster of pixels in which the quality metric(s) is below a threshold.

In some embodiments, a depth map may first be "filtered" to identify holes. Then rays from the point of view from which the scene will be rendered to the holes may be determined. Those rays may be "cast" into a 3D representation of the physical world, created using sensors other than the depth sensor alone, to identify data representing the regions of the holes. The 3D representation of the physical world, for example, may be a 3D reconstruction created from data from a stereoscopic visual camera. The data from the 3D reconstruction identified by such ray casting may be added to the depth map, thereby filling the holes.

The 3D reconstruction may be computed from image sensor data when holes are identified. Alternatively, some or all of the 3D reconstruction may be computed in advance and stored in memory. The 3D reconstruction, for example, may be maintained in computer memory by a process independent of any process that generates depth information for occlusion processing, which may access that stored 3D reconstruction as needed. As a further alternative, the 3D reconstruction may be maintained in memory, but portions of it may be updated in response to an indication, computed based on depth information, that there was a change in the physical world corresponding to the portion of the 3D reconstruction.

In an XR system, the rays may have a same pose an eye gaze of a user. In exemplary systems as described below, the depth map may similarly be acquired with the same eye gaze of the user, because the depth sensor may be worn by the user, and it may be mounted on the user's head near the eyes. A visual camera used to form the 3D reconstruction data may similarly be worn by a user such that the images, and data derived from those images, may be related to a coordinate system that enables rays, defined with respect to the depth map, to be cast into the 3D reconstruction computed from the visual images. An inertial measurement unit and/or other sensors, similarly worn by the user and/or associated with the sensors, may provide data to perform coordinate transformations to add data to the 3D representation regardless of the pose of the visual camera and to relate rays, defined with respect to the depth map, to the 3D reconstruction.

In some embodiments, a user's focus or related virtual content placement information may guide raycast to make it adaptive in the image space by casting more dense rays at depth discontinuities to obtain high quality occlusion at the object boundaries, and sparse rays in the center of objects in view to decrease processing requirements. Raycast may additionally give local 3D surface information such as normal and position, which may be used to enable improved timewarp processing with the depth information and to alleviate missing visible pixels that need to be rendered or raytraced in typical rendering engines. Timewarp is a technique in XR that modifies a rendered image before sending it to a display to correct for a head movement that is computed to occur between rendering and displaying. In some embodiments, timewarping may be used to synchronize the data from the depth map and the 3D representation of the physical world that may be used to generate data to fill holes in the depth map. Data from both data sources may be timewarped to represent the computed pose at the time of displaying. In some embodiments, the data from the 3D representation may be timewarped to represent the computed pose at the time data is captured with the depth map.

In some embodiments, advanced features such as timewarp may utilize the 3D local surface information from raycast. When the content frame is rendered without physical world occlusion or with eroded depth imaging, timewarp may fill all the missing visible pixels that were previously occluded. Therefore, there may be no need for a rendering engine to fill the pixels, enabling more loosely decoupled rendering applications (or more independent timewarp).

Processing as described above may be performed in hardware processors of many suitable forms on data acquired with many suitable sensors and presented on many suitable interfaces. Examples of suitable systems, including sensors, processing and user interfaces, are presented below. In the illustrated embodiment, a "service" may be implemented as part of an XR system with computer executable instructions. Execution of those instructions may control one or more processors to access to sensor data and then generate and supply depth information to applications executing on the XR system. Those instructions may be executed on the same processor or same device that executes the application presenting XR scenes to a user or may be on a remote device, accessed by the user device over a computer network.

Figure 49:
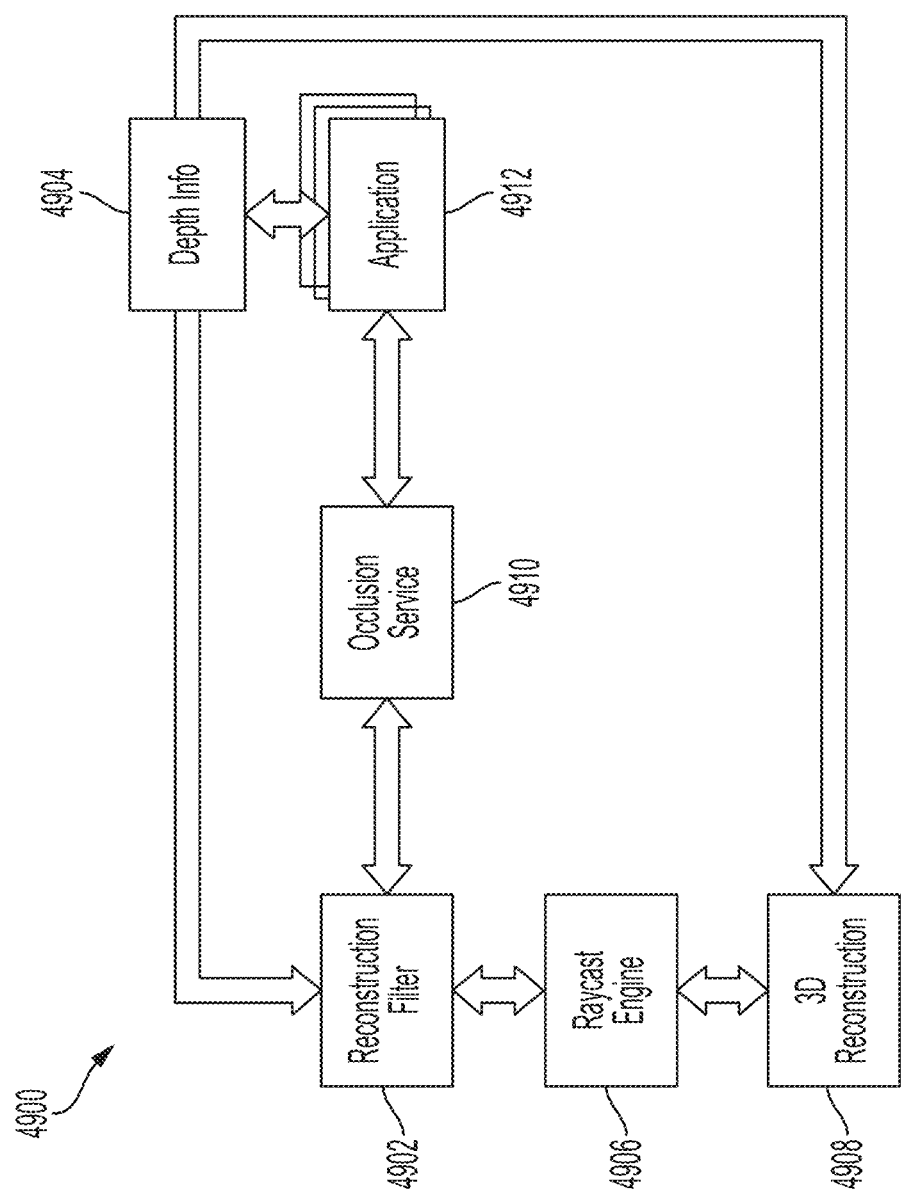
FIG. 49 is a schematic diagram illustrating an occlusion rendering system, according to some embodiments.
Figure 50:
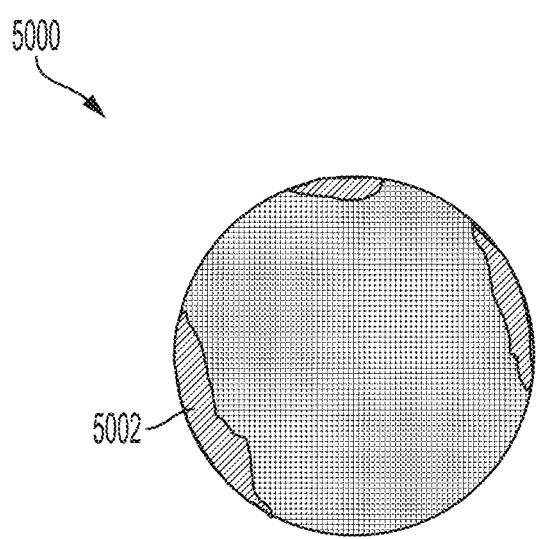
FIG. 50 is a schematic diagram illustrating a depth image with holes.

FIG. 49 illustrates an occlusion rendering system 4900, according to some embodiments. The occlusion rendering system 4900 may include a reconstruction filter 4902. The reconstruction filter 4902 may receive depth information 4904. In some embodiments, the depth information 4904 may be a sequence of depth images captured by a depth camera. In some embodiments, the depth information 4904 may be derived from a sequence of images captured by visual cameras, for example, using structure from motion based on a single camera and/or using stereo computation based on two cameras. FIG. 50 illustrates a depth image 5000, according to some embodiments. In some embodiments, surface information may be generated from the depth information. The surface information may indicate distance to the physical object in a field of view (FOV) of a head-mounted display device comprising a depth camera and/or visual cameras. The surface information may be updated in real time as a scene and FOV changes.

A second source of depth information is illustrated as 3D reconstruction 4908. The 3D reconstruction 4908 may include a 3D representation of the physical world. The 3D representation of the physical world may be created and/or maintained in computer memory. In some embodiments, the 3D representation may be generated from images captured by visual cameras, for example, using structure from motion based on a single camera and/or using stereo computation based on two cameras. In some embodiments, the 3D representation may be generated from depth images captured by a depth camera. For example, the 3D reconstruction 4908 may be created and/or updated using the depth information 4904 in combination with a pose of the depth camera with respect to a world origin. That representation may be built up, and modified over time, for example as a user, wearing the camera looks around the physical world. In some embodiments, the depth information 4904 also may be used to generate a 3D representation of a physical world. The 3D reconstruction 4908 may be a volumetric reconstruction that includes 3D voxels. In some embodiments, each 3D voxel may represent a cube of space (e.g., 0.5 meters by 0.5 meters by 0.5 meters) and each 3D voxel may include data related to and/or describing surfaces in the real-world in that cube of space.

The 3D reconstruction 4908 of the world may be stored in any suitable way. In some embodiments, the 3D reconstruction 4908 may be stored as a "cloud" of points representing features of objects in the physical world. In some embodiments, the 3D reconstruction 408 may be stored as a mesh, with groups of points defining vertices of triangles that represent surfaces. In some embodiments, the 3D reconstruction 4908 may be generated using other techniques such as room layout detection system, and/or object detection. In some embodiments, a number of techniques may be used together to generate the 3D reconstruction 4908. For example, object detection may be used for known physical objects in the physical world, 3D modeling may be used for unknown physical objects in the physical world, and room layout detection system may also be used to identify the boundaries in the physical world such as walls and floors.

The reconstruction filter 4902 may include computer executable instructions for producing a depth map based on the depth information 4904. The depth map may include one or more pixels. Each pixel may indicate a distance to a point of a surface in a physical world. In some embodiments, the reconstruction filter 4902 may composite depth information 4904 and data from the raycast engine 4906. In some embodiments, the reconstruction filter 4902 may reduce or remove noise from the depth information 4904 based, at least in part, on the data from the raycast engine 4902 and/or from the composite of the depth information 4904 and the data from the raycast engine 4906. In some embodiments, the reconstruction filter 4902 may up-sample the depth information 4904 using deep-learning techniques.

The reconstruction filter 4902 may identify regions of the depth map based on a quality metric. For example, when the quality metric of a pixel is above a threshold, the pixel may be determined as incorrect or noisy. Regions of the depth map containing the incorrect or noisy pixels may be referred to as holes (e.g., holes 5002).

Figure 54B:
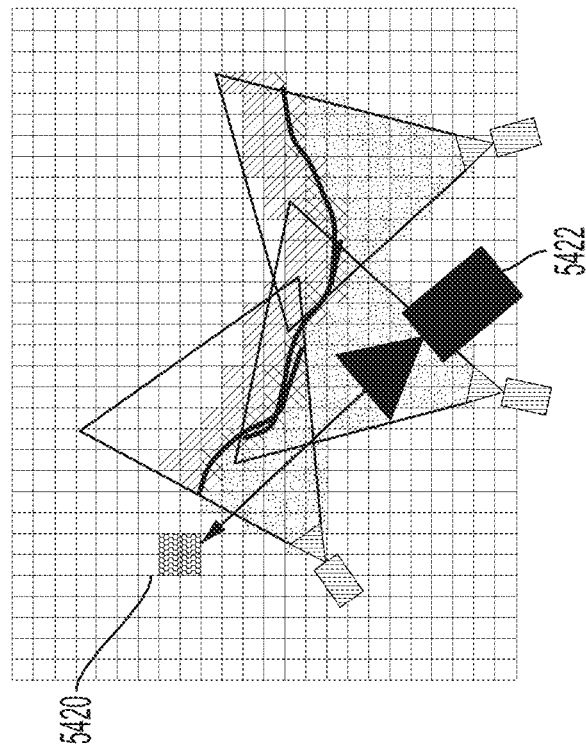
FIG. 54B is a sketch of a region being imaged with a depth camera from multiple points of view to identify voxels that are occupied by a surface and are empty, and indicating a "hole", for which no volumetric information is available, as a result of voxels in the region of the "hole" not having been imaged with the depth camera.
Figure 54A:
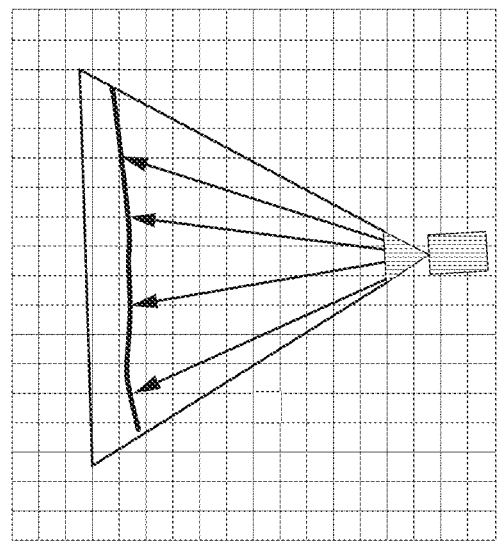
FIG. 54A is a sketch of a region being imaged with a depth camera from a first point of view to identify voxels that are occupied by a surface and those that are empty.

FIGS. 54A and 54B provide an alternative example of how holes might result in a depth map, in embodiments in which the depth map is constructed from multiple depth images. FIG. 54A is a sketch of a region being imaged with a depth camera from a first point of view to identify voxels that are occupied by a surface and voxels that are empty. FIG. 54B is a sketch of a region being imaged with a depth camera from multiple points of view to identify voxels that are occupied by a surface and are empty. FIG. 54B illustrates multiple voxels determined to be occupied by a surface or empty by fusing data from multiple camera images. However, voxels in region 5420 have not been imaged. Region 5420 could have been imaged with the depth camera in position 5422, but the camera has not moved to that location. Accordingly, region 5420 is an observed space, for which no volumetric information is available. The AR system may guide the user wearing it to scan the observed space.

Referring back to FIG. 49, the reconstruction filter 4902 may inform a raycast engine 4906 about locations of the holes. The raycast engine 4906 may generate a view of the physical world given a user's pose, and may remove the holes out of the depth map. The data may represent portions of a user's current view of the physical world at a current time, or, where time warping is used, at a time to which the data is to be time warped. The raycast engine 4906 may generate one or more 2D images, for example, one image per eye. In some embodiments, the reconstruction filter 4902 may remove regions of the depth map that are spaced from a location of a virtual object beyond a threshold distance because these regions may not be relevant to an occlusion test for the virtual object.

The raycast engine 4906, which generates the view of the physical world given the user's pose, may be implemented by any suitable techniques. In some embodiments, the raycast engine 4906 may implement ray-casting algorithm on the 3D reconstruction 4908 to extract data from it. The ray-casting algorithm may take the user's pose as input. The raycast engine 4906 may cast rays from a virtual camera to the 3D reconstruction 4908 of the physical world to obtain surface information that is missing from the depth map (e.g., holes). The raycast engine 4906 may cast dense rays at boundaries of physical objects in the physical world to obtain high quality occlusion at the object boundaries, and sparse rays in center regions of the physical objects to decrease processing requirements. The raycast engine 4906 may then provide the raycast point clouds to the reconstruction filter 4902. The raycast engine 4906 is illustrated as an example. In some embodiments, the raycast engine 4906 may be a meshing engine. The meshing engine may implement a meshing algorithm on the 3D reconstruction 4908 to extract data from it, for example, including triangles and connectivity of the triangles. The meshing algorithm may take the user's pose as input.

The reconstruction filter 4902 may composite the depth information 4904 and data from the raycast engine 4906, compensating for the holes in the depth map from the depth information 4904 with the data from the raycast point clouds from the raycast engine 4906. In some embodiments, the resolution of the depth map may be improved. This method may be used to generate a high resolution depth image from sparse or low resolution depth image.

The reconstruction filter 4902 may provide the updated depth map to an occlusion service 4910. The occlusion service 4910 may compute occlusion data based on the updated depth map and information about a location of a virtual object in the scene. The occlusion data may be depth buffers of surfaces in the physical world. The depth buffers may store depths of pixels. In some embodiments, the occlusion service 4910 may be an interface with applications 4912. In some embodiments, the occlusion service 4910 may interface with a graphics system. In these embodiments, the graphics system may expose a depth buffer to the applications 4912, where the depth buffer is pre-filled with the occlusion data.

The occlusion service 4910 may provide the occlusion data to one or more applications 4912. In some embodiments, the occlusion data may correspond to the user's pose. In some embodiments, the occlusion data may be a pixel-wise representation. In some embodiments, the occlusion data may be a mesh representation. The applications 4912 may be configured to execute computer executable instructions to render virtual objects in scenes based on the occlusion data. In some embodiments, occlusion rendering may be conducted by a separate graphic system instead of the applications 4912. The separate graphic system may use timewarp techniques.

In some embodiments, the reconstruction filter 4902, raycast engine 4906, and occlusion service 4910 may be a remote service, for example, remote processing module 72; the 3D reconstruction 4908 may be stored in a remote memory, for example, remote data repository 74; and the applications 4912 may be on an AR display system 80.

Figure 51:
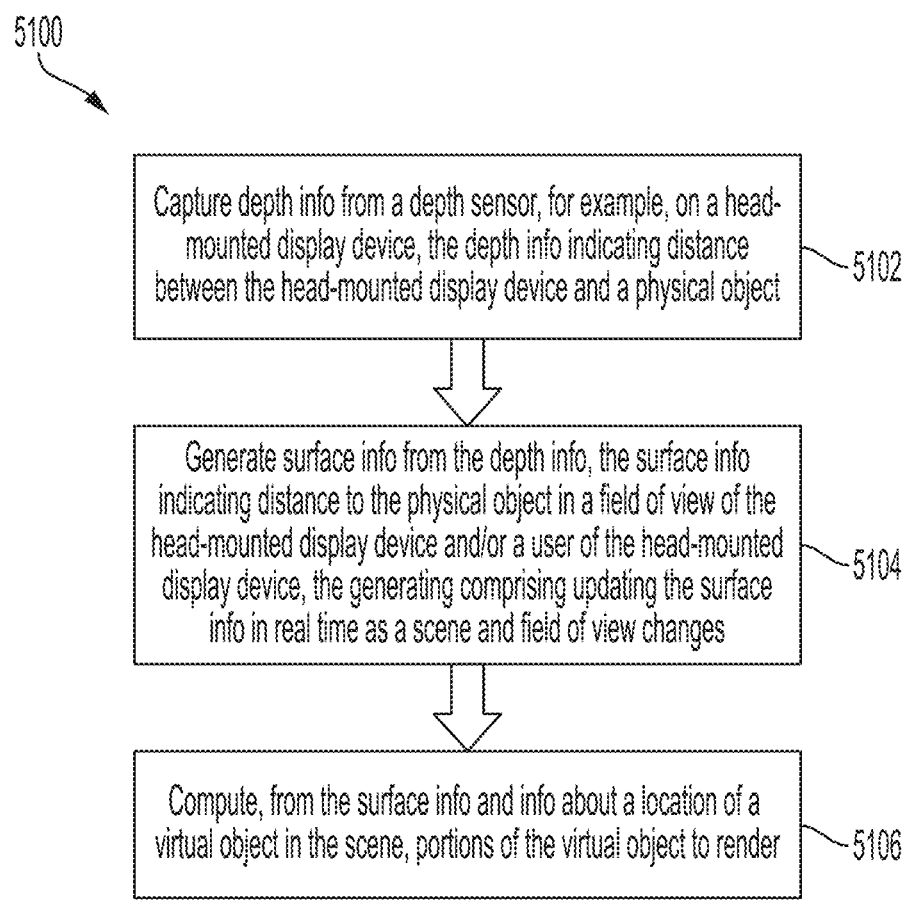
FIG. 51 is a flow chart illustrating a method of occlusion rendering in an augmented reality environment, according to some embodiments.

FIG. 51 illustrates a method 5100 of occlusion rendering in an augmented reality (AR) environment, according to some embodiments. At act 5102, depth information may be captured from a depth sensor (e.g., depth sensor 51), for example, on a head-mounted display device. The depth information may indicate distance between the head-mounted display device and a physical object. At act 5104, surface information may be generated from the depth information. The surface information may indicate distance to the physical object in a field of view (FOV) of the head-mounted display device and/or a user of the head-mounted display device. The surface information may be updated in real time as a scene and FOV changes. At act 5106, portions of a virtual object to render may be computed from the surface information and information about a location of the virtual object in the scene.

Figure 52:
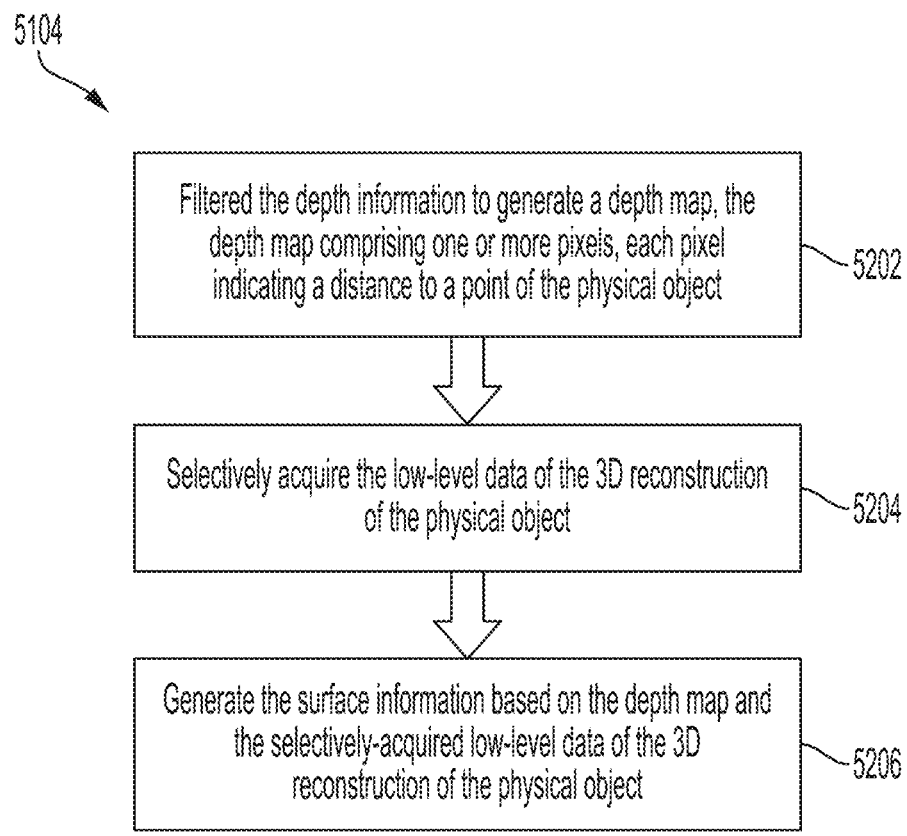
FIG. 52 is a flow chart illustrating details of generating surface information from depth information captured by a depth sensor worn by a user in FIG. 51, according to some embodiments.

FIG. 52 illustrates details of act 5104, according to some embodiments. At act 5202, the depth information may be filtered to generate a depth map. The depth map may include one or more pixels. Each pixel may indicate a distance to a point of the physical object. At act 5204, low-level data of a 3D reconstruction of the physical object may be selectively acquired from, for example, 3D reconstruction 4908. At act 5206, the surface information may be generated based on the depth map and the selectively-acquired low-level data of the 3D reconstruction of the physical object.

Figure 53:
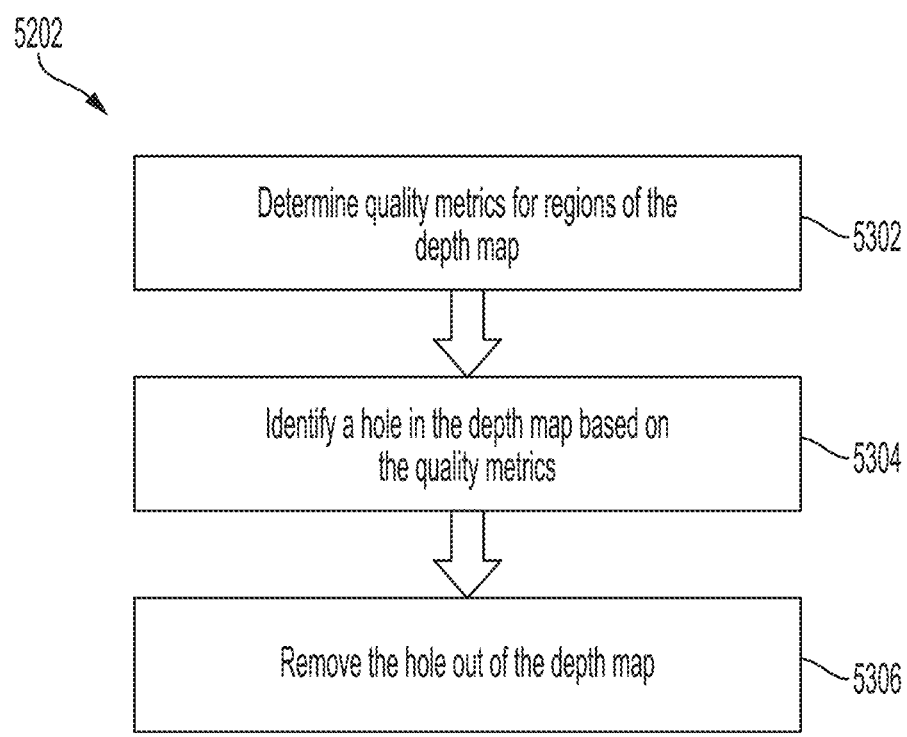
FIG. 53 is a flow chart illustrating details of filtering the depth information to generate a depth map in FIG. 52, according to some embodiments.

FIG. 53 illustrates details of act 5202, according to some embodiments. At act 5302, quality metrics for regions of the depth map may be determined. The quality metrics may indicate whether regions of the depth map are incorrect or noisy. At act 5304, holes in the depth map may be identified based on the quality metrics by, for example, comparing to a threshold value. At act 5306, the identified holes may be removed out of the depth map.

Conclusion

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic system comprising:
    a sensor configured to capture three-dimensional (3D) information about objects in a physical world;
    an active memory;
    a local memory;
    a transceiver configured for communication over a computer network with remote memory; and
    a processor communicatively coupled to the sensor, the active memory, the local memory, and the transceiver, and configured to execute computer executable instructions to provide a 3D representation of a portion of the physical world based at least in part on the 3D information about the objects in the physical world, the portion of the physical world being within a field of view of a user of the portable electronic system, wherein:
        the 3D representation of the portion of the physical world comprises a plurality of blocks, each block having values representing objects in a region of the portion of the physical world at a point in time and comprising a volumetric representation of the region of the portion of the physical world at the point in time; and
        the computer executable instructions comprise instructions for:
            persisting blocks of the plurality of blocks in at least one of the active memory and the local memory when the portable electronic system changes to an inactive operation status.

2. The portable electronic system of claim 1, wherein the inactive operation status is shutdown or sleep and persisting the blocks comprises copying the blocks to a non-volatile memory.

3. The portable electronic system of claim 2, wherein persisting the plurality of blocks in at least one of the active memory, the local memory and the remote memory comprises,
    when the inactive operation status is sleep, persisting the plurality of blocks in respective memories in which the plurality of blocks currently exist such that the plurality of blocks are accessible by the portable electronic system upon waking of the portable electronic system.

4. The portable electronic system of claim 2, wherein persisting the plurality of blocks in at least one of the active memory, the local memory and the remote memory comprises,
    when the inactive operation status is shutdown, persisting at least a portion of blocks in the local memory by copying the blocks to the remote memory, and persisting blocks in the active memory by copying the blocks to the local memory and/or the remote memory.

5. The portable electronic system of claim 1, wherein the computer executable instructions comprise instructions for:
    computing one or more new blocks based at least in part on incoming 3D information about objects in the physical world, and
    selecting, from the persisted blocks, blocks at least in part overlapping with the one or more new blocks such that persisted blocks around the portable electronic system can be retrieved.

6. The portable electronic system of claim 5, wherein selecting, from the persisted blocks, the blocks at least in part overlapping with the one or more new blocks comprises comparing the one or more new blocks with the persisted blocks.

7. The portable electronic system of claim 5, wherein the computer executable instructions comprise instructions for:
   updating the plurality of blocks with the one or more new blocks.

8. The portable electronic system of claim 6, wherein comparing the one or more new blocks with the persisted blocks comprises
   comparing the one or more new blocks to blocks persisted in the active memory.

9. The portable electronic system of claim 8, wherein comparing the one or more new blocks with the persisted blocks comprises
   when the active memory has no block at least in part overlapping with the one or more new blocks, comparing the one or more new blocks to blocks persisted in the local memory.

10. The portable electronic system of claim 9, wherein comparing the one or more new blocks with the persisted blocks comprises
    when the local memory has no block at least in part overlapping with the one or more new blocks, comparing the one or more new blocks to blocks persisted in the remote memory.

11. A method of operating a portable electronic system in an augmented reality system, the method comprising:
    with at least one processor:
    obtaining a plurality of blocks comprising a three-dimensional (3D) representation of surfaces in a physical world, each block comprising a volumetric representation of a portion of the physical world;
    storing the plurality of blocks in an active memory;
    using blocks from the active memory for rendering virtual content to a user of the portable electronic system;
    upon a transition to an inactive operation status at a first time, selectively persisting the blocks in the active memory; and
    upon a transition to an active operation status at a second time, after the first time, determining whether to use the persisted blocks for rendering virtual content to a user of the portable electronic system.

12. The method of claim 11, wherein the blocks are mesh blocks.

13. The method of claim 11, wherein the plurality of blocks correspond to spaces of a same volume.

14. The method of claim 11, further comprising:
    capturing 3D information with a sensor of the portable electronic system;
    replacing a subset of the plurality of blocks in active memory with modified blocks computed based on the captured 3D information;
    and
    paging blocks between the active memory and a local memory based on current or projected field of view of the user of the portable electronic system.

15. The method of claim 11, wherein using blocks from the active memory for rendering virtual content to the user comprises:
    using the blocks for visual occlusion processing, computing physics-based interactions and/or environmental reasoning.

16. A non-transitory computer-readable medium with instructions stored thereon, that when executed on a processor, perform the acts comprising:
    obtaining a plurality of blocks comprising a three-dimensional (3D) representation of surfaces in a physical world, each block comprising a volumetric representation of a portion of the physical world at a point in time;
    storing the plurality of blocks in an active memory;
    using blocks from the active memory for rendering virtual content to a user of the portable electronic system;
    upon a transition to an inactive operation status at a first time, selectively transferring the blocks in the active memory to a non-volatile memory; and
    upon a transition to an active operation status at a second time, after the first time, determining whether to use the transferred blocks for rendering virtual content to a user of the portable electronic system.

17. The non-transitory computer-readable medium of claim 16, wherein the blocks are mesh blocks.

18. The non-transitory computer-readable medium of claim 16, wherein
    each of the plurality of blocks in the subset:
    represents a respective portion of the physical world at the first time; and
    is replaced by a modified block representing the respective portion of the physical world at the second time.

19. The non-transitory computer-readable medium of claim 16, wherein the acts comprise:
    replacing a subset of the plurality of blocks in the active memory with modified blocks computed based on 3D information captured with a sensor.

20. The non-transitory computer-readable medium of claim 16, wherein using blocks from the active memory for rendering virtual content to the user comprises:
    using the blocks for visual occlusion processing, and
    computing physics-based interactions and/or environmental reasoning.

* * * * *